United States Patent [19]

Clark et al.

[11] Patent Number: 5,513,359
[45] Date of Patent: Apr. 30, 1996

[54] DESKTOP COMPUTER HAVING A SINGLE-SWITCH SUSPEND/RESUME FUNCTION

[75] Inventors: Michael W. Clark; James L. Combs; Dwayne T. Crump; Jerry T. Kozel; Steven T. Pancoast, all of Lexington, Ky.

[73] Assignee: International Business Machines Corporation, Armonk, N.Y.

[21] Appl. No.: 97,334

[22] Filed: Jul. 23, 1993

[51] Int. Cl.⁶ .......................... G06F 15/00; G06F 13/10
[52] U.S. Cl. ........................................ 395/750; 345/212
[58] Field of Search ........................... 395/750; 345/211, 345/212

[56] References Cited

U.S. PATENT DOCUMENTS

| | | | |
|---|---|---|---|
| 4,674,031 | 6/1987 | Siska, Jr. ........................... | 364/184 |
| 4,823,290 | 4/1989 | Fasack et al. ...................... | 364/550 |
| 4,851,987 | 7/1989 | Day . | |
| 4,907,150 | 3/1990 | Arroyo et al. . | |
| 4,933,785 | 6/1990 | Morehouse et al. . | |
| 5,021,983 | 6/1994 | Nguyen et al. ..................... | 364/707 |
| 5,167,024 | 11/1992 | Smith et al. ....................... | 395/375 |
| 5,189,647 | 2/1993 | Suzuki et al. . | |
| 5,218,607 | 6/1993 | Saito et al. . | |
| 5,269,022 | 12/1993 | Shinjo et al. . | |
| 5,276,890 | 1/1994 | Arai . | |
| 5,355,501 | 10/1994 | Gross et al. ....................... | 395/750 |
| 5,410,711 | 4/1995 | Stewart . | |
| 5,410,713 | 4/1995 | White et al. . | |

FOREIGN PATENT DOCUMENTS

| | | |
|---|---|---|
| 2060879 | 8/1992 | Canada . |
| 0415376A2 | 3/1991 | European Pat. Off. . |
| 0518339A2 | 12/1992 | European Pat. Off. . |
| 0518623A2 | 12/1992 | European Pat. Off. . |
| 0516159A2 | 12/1992 | European Pat. Off. . |
| 0518622A1 | 12/1992 | European Pat. Off. . |
| WO92/21081 | 11/1992 | WIPO . |

OTHER PUBLICATIONS

"Total Recall and Instant Recall," Advertisement, *Window Sources*, vol. 1, No. 3, Apr. 1993, p. 40.

*Primary Examiner*—Jack B. Harvey
*Assistant Examiner*—Jeffrey K. Seto
*Attorney, Agent, or Firm*—Daniel E. McConnell; Sean T. Moorhead

[57] ABSTRACT

A computer system having a suspend/resume capability in addition to the normal operating state and the off state. Closure events of single momentary pushbutton switch control changes between the normal operating state, the suspend state, and the off state, depending on the value of a flag. If the flag is set in a certain state, closure events of the switch cause the computer system to change back and forth between the normal operating state and the off state. If the flag is set in a different state, closure events of the switch cause the computer system to change back and forth between the normal operating state and the suspend state. The switch also controls the video subsystem of the computer system such that pressing the switch blanks the video display terminal giving the user instantaneous feedback of the switch press.

16 Claims, 37 Drawing Sheets

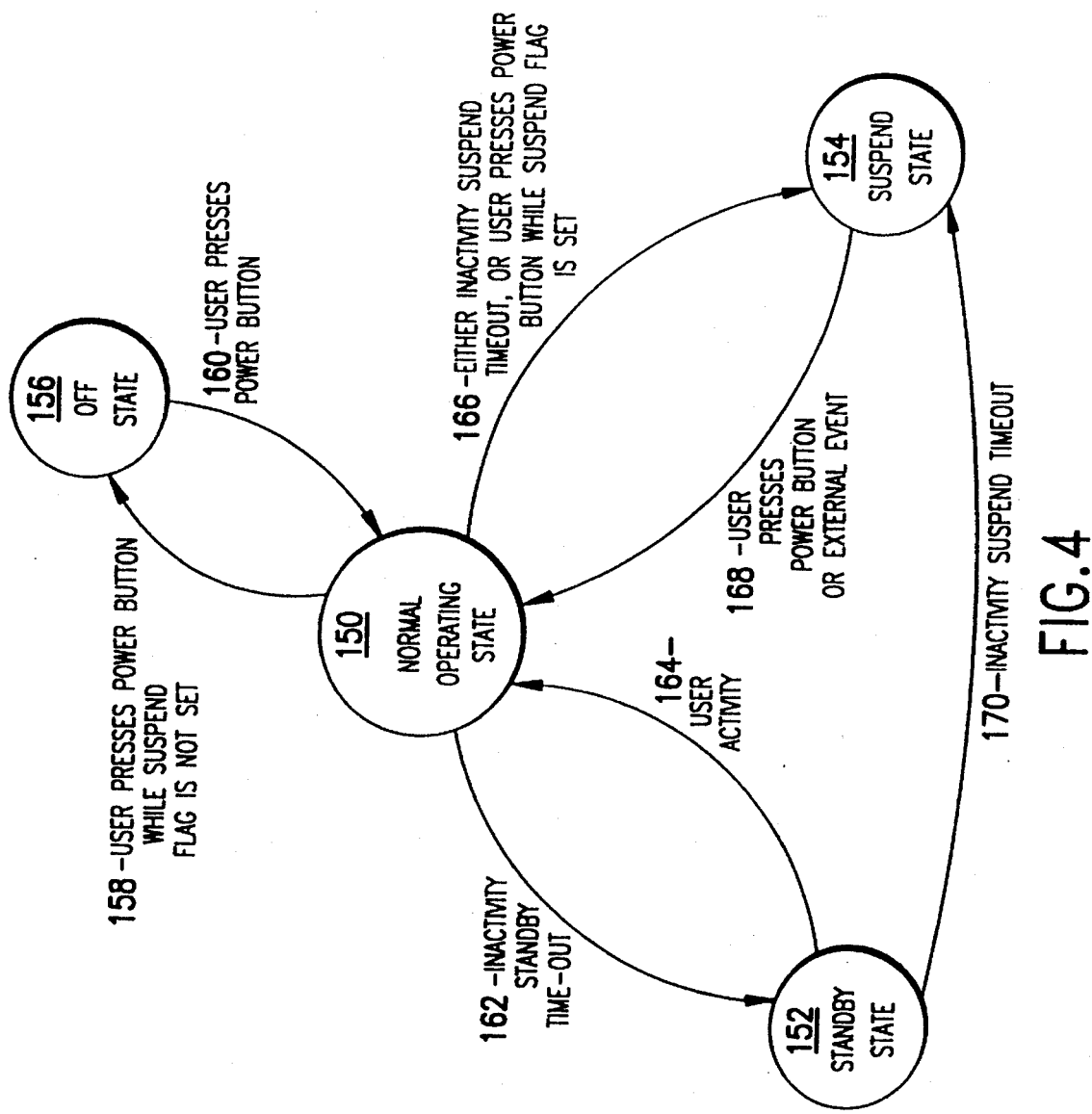

DESKTOP COMPUTER HAVING A SINGLE-SWITCH SUSPEND/RESUME FUNCTION

RELATED APPLICATIONS

The present application is thought to be related to the following pending applications:

application Ser. No. 08/097,250, filed Jul. 26, 1993, and entitled "DESKTOP COMPUTER SYSTEM HAVING ZERO VOLT SYSTEM SUSPEND" (further identified as Attorney Docket No. BC9-93-016 (21322/00161));

application Ser. No. 08/097,246, filed Jul. 23, 1993, and entitled "METHOD OF SAVING AND RESTORING THE STATE OF A CPU EXECUTING CODE IN A PROTECTED MODE" (further identified as Attorney Docket No. BC9-93-017 (21322/00162)); and application Ser. No. 08/097,251, filed Jul. 26, 1993, and entitled "DESKTOP COMPUTER SYSTEM HAVING MULTI-LEVEL POWER MANAGEMENT" (further identified as Attorney Docket No. BC9-93-015 (21322/00163)).

FIELD OF THE INVENTION

The present invention relates generally to computer system architecture and, more specifically, to a desktop computer system having a system suspend/resume capability and a single switch to suspend and resume the system.

BACKGROUND OF THE INVENTION

Personal computer systems are well known in the art. Personal computer systems in general, and IBM Personal Computers in particular, have attained widespread use for providing computer power to many segments of today's modern society. Personal computers can typically be defined as a desktop, floor standing, or portable microcomputer that is comprised of a system unit having a single central processing unit (CPU) and associated volatile and non-volatile memory, including all RAM and BIOS ROM, a system monitor, a keyboard, one or more flexible diskette drives, a fixed disk storage drive (also known as a "hard drive"), a so-called "mouse" pointing device, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/1 (IBM PS/1).

Personal computer systems are typically used to run software to perform such diverse activities as word processing, manipulation of data via spread-sheets, collection and relation of data in databases, displays of graphics, design of electrical or mechanical systems using system-design software, etc.

IBM PS/1s and PS/2s are desktop computers designed to be used at a single location. For example, in today's society many individuals have desktop computers at their desks or in rooms dedicated to computer-aided tasks. Desktop computers are typically set up at a location and used by one or many users without ever moving the computer.

Desktop systems may be classified into networked and non-networked computer systems. Networked computer systems are part of a larger computer system and are connected to other computers or servers via local area networks (LANs) or wide area networks (WANs). Such networks, using special interfaces and protocols, allow computers to share data and programs in an efficient way. Desktop computer systems used in businesses are typically networked computer systems. Non-networked computers, on the other hand, are not connected to any other computers. Data transfer from one computer to another is accomplished by writing data to flexible diskettes with a computer in one location and reading the data with a computer at another location. Desktop computers used in homes are typically non-networked computers.

Unlike desktop computers, which are designed to remain at a single site, portable computers, also known as "laptop computers" or "notebook computers" depending on their size, such as IBM's PS/2 L40 Think Pad, are designed to be taken with the user and used at any number of sites. For example, a salesperson might use a notebook computer at the salesperson's desk to generate a report on projected sales. If the salesman is called from the salesperson's desk to a meeting, the salesperson could suspend the current task, pick up the notebook computer, and take it to the meeting. Once at the meeting, the salesperson could take out the computer, resume the software execution, and take notes or call up information during the meeting. As another example, a student might be writing a term paper at home until class-time, at which time the student could take the notebook computer to class to take notes.

Portable computers are typically non-networked computers, although some users will connect their portable computers to an office LAN when the computer is to be used in the office.

Portable computers differ from desktop computers in a number of respects. Portable computers are typically powered by rechargeable batteries. The user will charge the batteries using electricity from a wall-plug, use the computer until the batteries need recharging, and then recharge the batteries. While the batteries are recharging, the portable computer may not be moved; the computer movement is limited by the length of the power cord. Thus, a computer having its batteries charged in effect loses its portability until the batteries are sufficiently charged. Like a flashlight, or other battery-powered device, the more power the portable computer consumes, the shorter period of time the user will be able to use the portable computer before the batteries need recharging. Thus, power consumption is a factor users consider when purchasing a portable computer and, not surprisingly, a major issue in the portable computer industry. Therefore, the computer industry has spent much time and money designing portable computers that use less and less electrical power.

However, there is a trade off; the low-powered computers use more expensive low-power components, which cannot execute computer commands as quickly as the faster, high-power components. Moreover, in addition to making use of more expensive components, portable systems typically use more complex designs, thereby adding to the cost of portable computer systems.

Desktop computers, by comparison, are usually powered using electricity from a wall-plug; desktop computers have no batteries to run low (with the exception of a very small battery used to back up the real time clock, which can last for years without recharging). Consequently, desktop computers may make use of the faster, high-power, and less expensive components. In short, the portable computers use less electrical power and are typically not as computationally powerful as desktop computers, which use more electrical power.

In today's energy-conscious society, simple alternatives exist to leaving desktop computer powered on all day. One alternative is a technology found in portable computers. If a portable computer is idle for a certain period of time, usually a number of minutes, the computer will automatically stop spinning the fixed disk within the fixed disk storage unit and stop generating the computer's display. Both of these acts conserve power.

Portable computers also have other more complicated ways of conserving battery-power. If the system is idle for a given period of time, some portable computer designs start turning components off in such a way that they may be restored with no data loss. To keep the memory from being lost, the portable computer has a special battery circuit to keep the power to the memory without power to the CPU and the other circuitry. The special battery circuit increases the cost and complexity of the printed circuit board and increases the number of components of the system. Another way to implement the suspend/resume function is to use a CPU that is a member of a special family of processors called the "SL" family. SL CPUs are designed differently and have special commands to allow designers to easily implement battery-power saving functions. However, the SL family is more expensive and processors from the SL family are typically not as computationally powerful as the standard processors. In addition, portable systems typically have expensive "shadow" registers to save the several write-only registers found in typical computer systems. Such special features add complexity and cost to the printed circuit board design and increase the number of components in the computer system. Moreover, it is generally believed that it is impossible to save the state of a non-SL 80386 or 80486.

Because of the many differences between portable computers and desktop computers, consumers expect laptop and notebook computers to be priced higher than desktop computers. Consumers expect desktop computers to be very computationally powerful, yet very inexpensive. Thus, a desktop computer implementing a suspend/resume scheme using the expensive and complex techniques used in portable computers would be too expensive to sell in the desktop market. Therefore, any power conservation implementations in desktop designs typically make use of existing components or make use of newer components that are at least as powerful as standard components used in desktop systems.

Moreover, networked and non-networked desktop systems have different requirements. Some LAN protocols require LAN hardware in a computer system to remain powered or the network might fail. Non-networked desktop systems obviously have no LAN hardware, so LAN failure is not a problem with non-networked systems.

It is, therefore, believed desirable to provide a desktop computer system with power management features similar or superior to portable systems.

It is also believed desirable to provide desktop systems with power management capability without using the more complex designs and expensive components used in portable computer systems with similar features.

It is also believed desirable to save the state of a non-SL 80386 or 80486 without using the more complex designs and expensive components used in portable computer systems with similar features.

The EPA has promulgated guidelines for energy-efficient computers. The EPA set EPA Energy Star requirements for computer systems desiring to be considered "Green," that is, energy efficient. A computer may be labeled with the "EPA Energy Star" label if it has a mode in which it consumes less than thirty watts of power, or the monitor consumes less than thirty watts of power, or if both the computer and the monitor each consume less than thirty watts of power. The EPA "Memorandums of Understanding" with individual manufacturers set out the power requirements. Desktop computers typically are not designed with these capabilities.

It is therefore desirable to provide a desktop computer that meets the "green" standard.

It is also desirable to take into account whether a computer system is a networked or a non-networked desktop computer in fashioning an energy-conservation system.

When computers are turned on, they typically go through a "booting" process. When a computer "boots" it first performs a power-on self-test (POST), which involves running various tests to ensure that the computer is functioning correctly. After performing the POST, the computer typically loads the operating system (OS), such as IBM's PC-DOS. After the OS is loaded, many computers load a graphic user interface (GUI), such as Microsoft's Windows. Then, the user must open application software and load working files. This entire process can take quite a bit of time—up to several minutes in some cases.

Although several minutes does not seem like much time, to a user waiting for a computer system to boot, load the OS, load the GUI, and load the applications, that time is unproductive and annoying and effectively prevents users from conserving power by making it very inconvenient to save power by turning off their computers. That is, such usability penalties make manual power management schemes impractical.

It is therefore desirable to provide a desktop computer system with power management capabilities without significant usability penalties. That is, it is desirable to provide a computer system that has a power-conservation mode and can later be resumed in an acceptable amount of time and in any event less than the amount of time it would take to restart the computer system.

Occasionally, a user might leave the desktop computer idle while an application is executing on the computer. For example, if the user is using a word processing program and a spreadsheet program simultaneously to prepare a sales report and the phone rings or the user is called away from the desk, the computer would still be executing the applications. Any effective power management implementation should be able to conserve power and at the same time prevent the user from losing data, which would occur if, for example, the computer powered itself off in the middle of an application. Moreover, current software applications do not automatically save their states in such a way that they may be resumed where they were interrupted.

It is, therefore, desirable to provide a computer system that can enter a power-conservation mode while applications are executing on the system. It is further desirable to make such a power conservation mode transparent to the application software.

Sometimes a user of a desktop computer might know if the computer will not be needed for a while. It is desirable to allow the user to be able to cause the computer to enter a power-conserving mode manually to save the power the computer would use while deciding that it has been idle long enough to warrant entering a power-saving mode.

It is, therefore, desirable to allow the user to manually cause the desktop computer to enter a power conservation mode, without first having to exit applications, and be able to resume using the applications as though the computer was not turned off.

Typical portable computers have a switch to control the power to the computer and a different switch to implement the suspend/resume function. This can cause user confusion and increases the cost and complexity of portable computers. Thus, it is desirable to provide a desktop computer system with the above power-conservation capability without using a plurality of buttons.

SUMMARY OF THE INVENTION

According to the present invention, one switch is used to control the on/off and suspend/resume functions of the computer system. The computer system is designed with four states: a normal operating state, a standby state, a suspend state, and an off state. One switch is used to change between the off state, the normal operating state, and the suspend state.

The normal operating state of the computer system of the present invention is virtually identical to the normal operating state of any typical desktop computer. Users may use applications and basically treat the computer as any other. One difference is the presence of a power management driver, which runs in the background (in the BIOS and the operating system), transparent to the user. The portion of the power management driver in the operating system (OS) is the Advanced Power Management (APM) advanced programming interface written by Intel and Microsoft, which is now present in most operating systems written to operate on Intel's 80X86 family of processors. The portion of the power management driver in BIOS (APM BIOS) is unique to the present invention and communicates with the APM OS driver. The APM OS driver and the APM BIOS routines together control the computer's transition to and from the other three states.

The second state, the standby state, uses less power than the normal operating state, yet leaves any applications executing as they would otherwise execute. In general, power is conserved in the standby state by placing devices in their respective low-power modes. For example, power is conserved in the standby state by ceasing the revolutions of the fixed disk within the hard drive and by ceasing generating the video signal.

The third state is the suspend state. In the suspend state, computer system consumes an extremely small amount of power. The suspended computer consumes very little power from the wall outlet. The only power consumed is a slight trickle of power to maintain the switch circuitry from a battery inside the computer system (when the system is not plugged into a wall outlet) or a slight trickle of power generated by the power supply (when the system is plugged in).

This small use of power is accomplished by saving the state of the computer system to the fixed disk storage device (the hard drive) before the power supply is turned "off." To enter the suspend state, the computer system interrupts any executing code and transfers control of the computer to the power management driver. The power management driver ascertains the state of the computer system and writes the state of the computer system to the fixed disk storage device. The state of the CPU registers, the CPU cache, the system memory, the system cache, the video registers, the video memory, and the other devices' registers are all written to the fixed disk. The entire state of the system is saved in such a way that it can be restored without the code applications being adversely affected by the interruption. The computer then writes data to the non-volatile CMOS memory indicating that the system was suspended. Lastly, the computer causes the power supply to stop producing power. The entire state of the computer is safely saved to the fixed disk storage device, system power is now "off," and computer is now only receiving a small trickle of regulated power from the power supply to power the switch circuitry.

The fourth and final state is the off state. In this state, the power supply ceases providing regulated power to the computer system, but the state of the computer system has not been saved to the fixed disk. The off state is virtually identical to typical desktop computers being turned off in the usual manner.

Switching from state to state is handled by the power management driver and is typically based on closure events of a single switch, a flag and two timers: the inactivity standby timer and the inactivity suspend timer.

The system has a single power button. This button can be used to turn on the computer system, suspend the state of the system, restore the state of the system, and turn off the system. If the computer is in the normal operating state or the standby state and the user presses the button, the computer will change either to the suspend state or the off state, depending on the value of the flag. If the flag indicates that the system should be suspended when the button is pressed, the system will begin suspending and eventually enter the suspend state. If the flag indicates that the system should merely be turned off when the button is pressed, the computer will merely enter the off state. The flag can be controlled by the user. That is the user can determine whether the system is suspended or turned off when the button is pressed while in the normal operating state. Also, when there is no power management driver on the operating system, the switch will function as a simple on/off switch for the power supply.

If the computer system is in the off state and the power button is pressed, the system will start as it normally would. If the computer system is in the suspend state and the power button is pressed, then the operator is given a choice: either start the system as it normally would, or restore the system to the state it was in when it was suspended. Obviously if the user suspended the system while using applications, the user will probably want to restore the state of the computer system. However, if for some reason the user wants to start the computer anew and lose the suspended system state, the option is present.

The inactivity standby timer and the inactivity suspend timer also effect state changes. Both timers count when there is no user activity, such as keys being pressed on the keyboard, mouse movements, mouse buttons being pressed, or hard file activity. When the inactivity standby timer expires, the system enters the standby state, as outlined above. When the inactivity suspend timer expires, the system enters the suspend state, as outlined above.

Typically, the inactivity suspend timer will be set to a longer period of time than the inactivity standby timer. Therefore, the computer will normally change from the normal operating state to the standby state first. Then after another period of inactivity, the computer system will enter the suspend state. Users of networked systems that cannot tolerate the suspend state can selectively set the inactivity suspend timer to never expire.

Any user activity causes both inactivity timers to reset, thereby preventing the computer from entering either the standby state or the suspend state while the user operates the system.

If the system is in the standby state and user moves the mouse or touches a key on the keyboard, the system leaves the standby state and changes to the normal operating state. In doing so, the video driver begins generating the video signal again and the fixed disk begins spinning again. However, if the system is in the suspend state and the user moves the mouse or touches a key on the keyboard, the system will not automatically change to the normal operating state.

When changing from the suspend state to the normal operating state, the system should restore the state of the computer system in such a way that the applications are unaffected by the interruption. The state of the CPU registers, the CPU cache, the system memory, the system cache, the video registers, and the video memory should all be read from the fixed disk. The entire state of the system should be restored to allow the applications to proceed where they were interrupted.

The use of the suspend/resume allows a great time-savings over merely turning the system off to save power and turning the system back on. Moreover, the single switch simplifies the user interface thereby lessening confusion arising from its use.

These and other advantages of the present invention shall become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to example the principles of this invention.

FIG. 4 is a state diagram of the computer system of the present invention, showing the four system states: normal, standby, suspend, and off;

DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. The present invention deals with the complete design of a computer system, including, but not limited to computer architecture design, digital design, BIOS design, protected mode 80486 code design, application code design, operating system code design, and Advanced Power Management advanced programming interface usage. This application is written for those very familiar with all aspects of computer system design.

Figure 1:
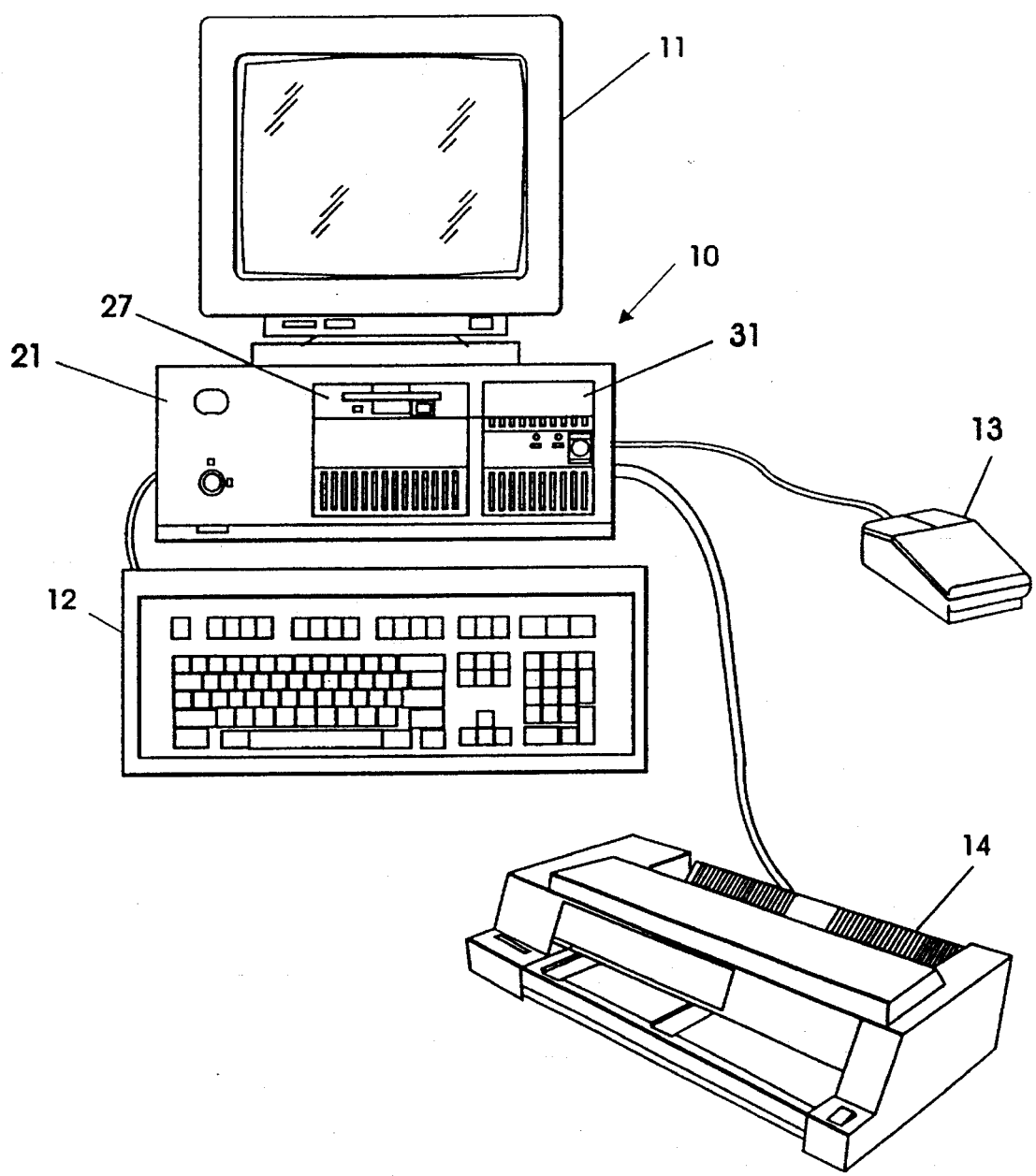
FIG. 1 is a perspective view of a personal computer embodying this invention.

Referring now more particularly to the accompanying drawings, a microcomputer system embodying the present invention is there shown and generally indicated at 10 (FIG. 1). As mentioned hereinabove, the computer 10 may have an associated monitor 11, keyboard 12, mouse 13, and printer or plotter 14. The computer 10 has a cover 15 formed by a decorative outer member 16 (FIG. 2) and an inner shield member 18 which cooperate with a chassis 19 in defining an enclosed, shielded volume for receiving electrically powered data processing and storage components for processing and storing digital data. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory cards or boards, and the like. As pointed out more fully hereinafter, provisions are made in the planar 20 for the passage of input/output signals to and from the operating components of the microcomputer.

Figure 2:
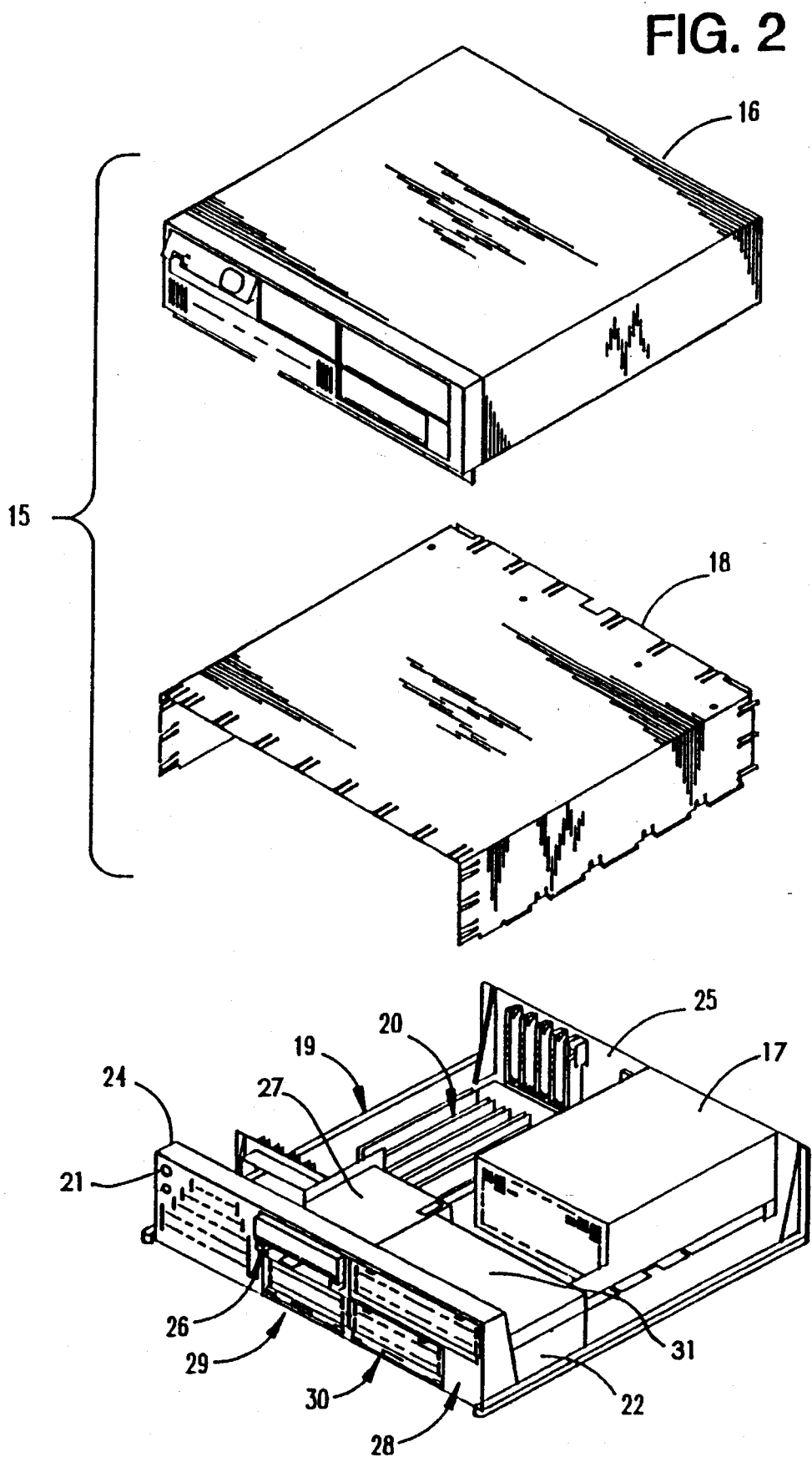
FIG. 2 is an exploded perspective view of certain elements of the personal computer of FIG. 1 including a chassis, a cover, an electromechanical direct access storage device and a planar board and illustrating certain relationships among those elements.

The computer system has a power supply 17 and a power button 21, also hereinafter the switch 21. Unlike in the usual power switch in a typical system, the power button 21 does not switch unregulated line power to and from the power supply 17, as will be explained below. The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a pair of lower bays 29, 30 are provided. One of the upper bays 26 is adapted to receive peripheral drives of a first size (such as those known as 3.5 inch drives) while the other 28 is adapted to receive drives of a selected one of two sizes (such as 3.5 and 5.25 inch) and the lower bays are adapted to receive devices of only one size (3.5 inch). One floppy disk drive is indicated at 27 in FIG. 1, and is a removable medium direct access storage device capable of receiving a diskette inserted thereinto and using the diskette to receive, store and deliver data as is generally known. One hard disk drive is indicated at 31 and is a fixed medium direct access storage device capable of storing and delivering data as is generally known.

Figure 3A:
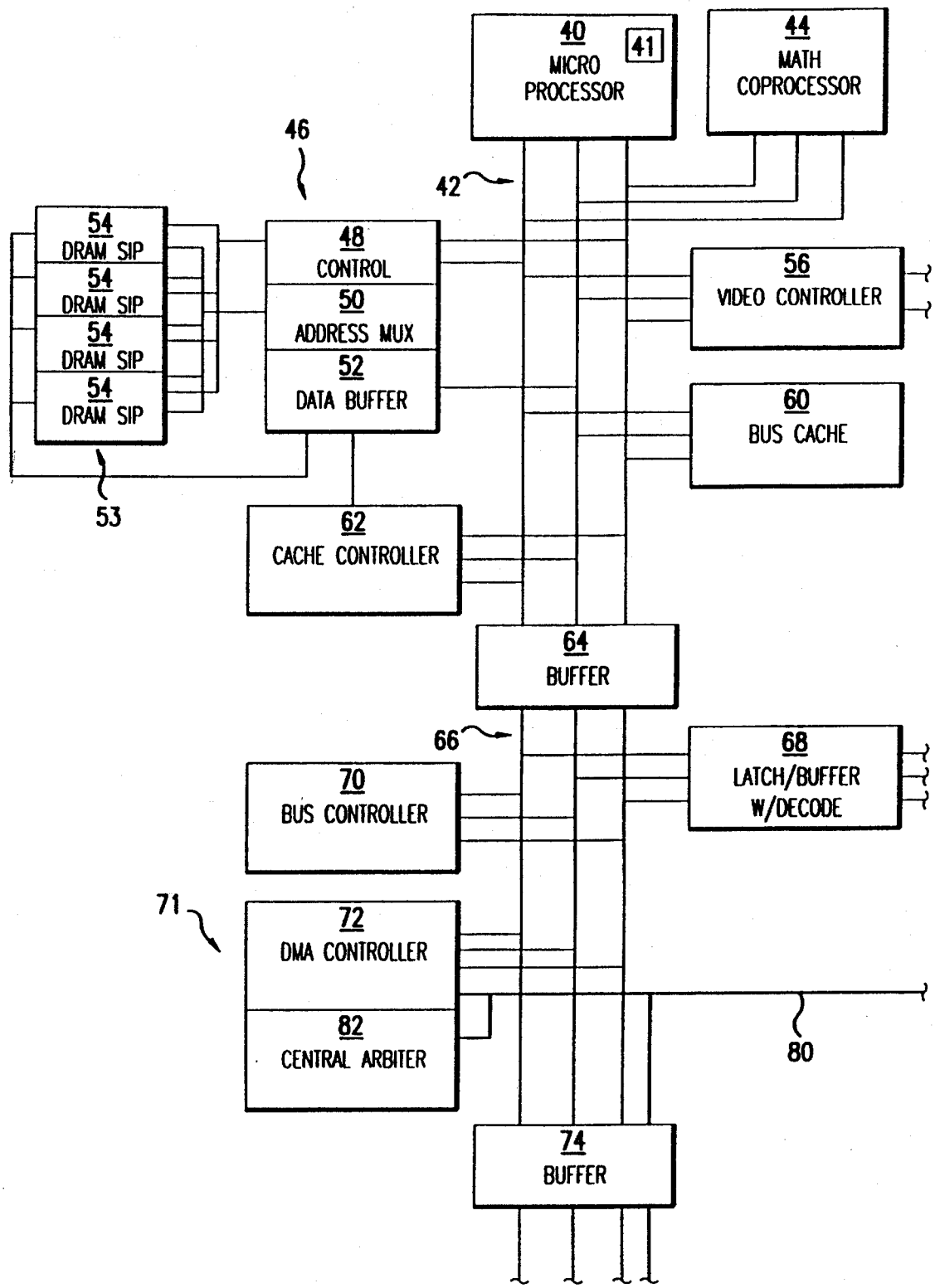
FIG. 3 is a block diagram of certain components of the personal computer of FIGS. 1 and 2.
Figure 3B:
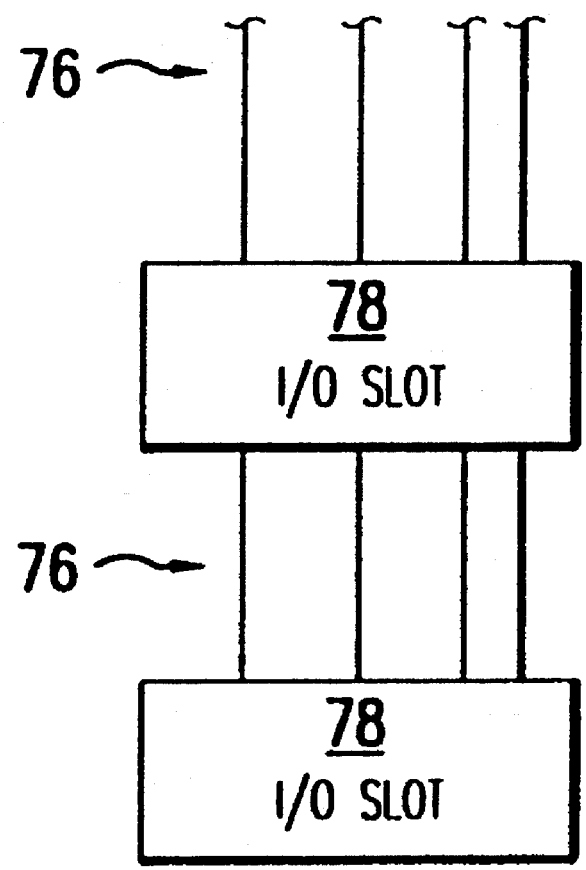
Figure 3C:
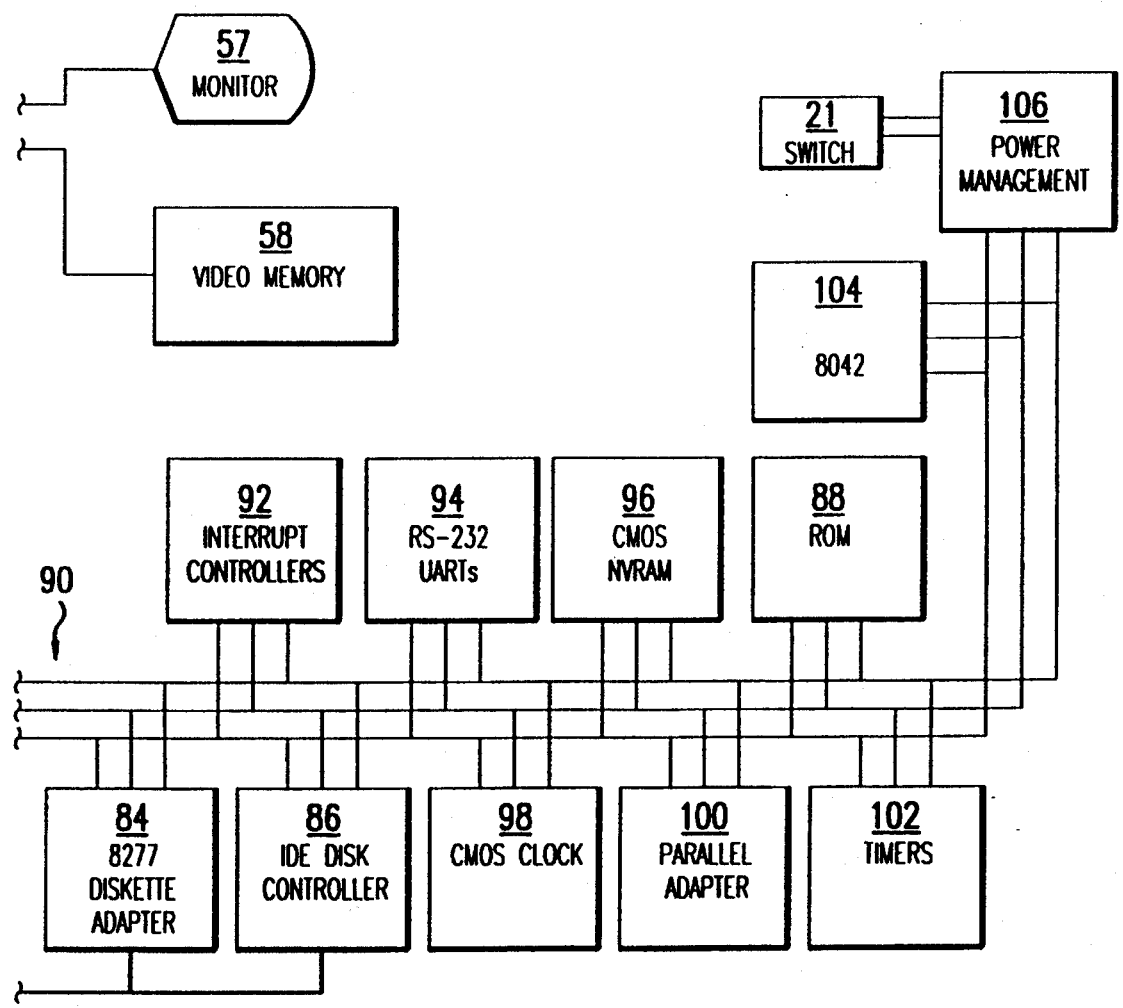

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 40, also herein CPU 40, comprised of a microprocessor, which is connected by a high speed CPU local bus 42 through a memory control unit 46, which is further connected to a volatile random access memory (RAM) 53. The memory control unit 46 is comprised of a memory controller 48, an address multiplexer 50, and a data buffer 52. The memory control unit 46 is further connected to a random access memory 53 as represented by the four RAM modules 54. The memory controller 48 includes the logic for mapping addresses to and from the microprocessor 40 to particular areas of RAM 53. This logic is used to reclaim RAM previously occupied by BIOS. Further generated by memory controller 48 is a ROM select signal (ROMSEL), that is used to enable or disable ROM 88. While any appropriate microprocessor can be used for system processor 40, one suitable microprocessor is the 80486 which is sold by INTEL. The Intel 80486 has an internal cache, therefore, any CPU 40 that is an Intel 80486 will have a CPU cache 41.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor 40 could be an Intel 80286 or 80386 microprocessor. As used herein, reference to an 80286 or 80386 or 80486 generally intends such a microprocessor as obtained from Intel. However, in recent times other manufacturers have developed microprocessors which are capable of executing the instruction set of the Intel X86 architecture, and usage of the terms stated is intended to encompass any microprocessor capable of executing that instruction set. As known to persons skilled in the applicable arts, early personal computers typically used the then popular Intel 8088 or 8086 microprocessor as the system processor. These processors have the ability to address one megabyte of memory. More recently, personal computers typically use the high speed Intel 80286, 80386, and 80486 microprocessors which can operate in a virtual or real mode to emulate the slower speed 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors. Processors in the Intel family described are frequently identified by a three digit reference to only the last three digits of the full type designator, as "486".

Returning now to FIG. 3, the CPU local bus 42 (comprising data, address and control components) provides for the connection of the microprocessor 40, a math coprocessor 44, a video controller 56, a system cache memory 60, and a cache controller 62. The video controller 56 has associated with it a monitor (or video display terminal) 57 and a video memory 58. Also coupled on the CPU local bus 42 is a buffer 64. The buffer 64 is itself connected to a slower speed (compared to the CPU local bus 42) system bus 66, also comprising address, data and control components. The system bus 66 extends between the buffer 64 and a further buffer 68. The system bus 66 is further connected to a bus control and timing unit 70 and a DMA unit 71. The DMA unit 71 is comprised of a central arbiter 82 and a DMA controller 72. An additional buffer 74 provides an interface between the system bus 66 and an optional feature bus such as the Industry Standard Architecture (ISA) bus 76. Connected to the bus 76 are a plurality of I/O slots 78 for receiving ISA adapter cards (not shown). ISA adapter cards are pluggably connected to the I/O slots 78 and may provide additional I/O devices or memory for the system 10.

An arbitration control bus 80 couples the DMA controller 72 and central arbiter 82 to the I/O slots 78, a diskette adapter 84, and an Integrated Drive Electronics (IDE) fixed disk controller 86.

While the microcomputer system 10 is shown with a basic 4 megabyte RAM module 53, it is understood that additional memory can be interconnected as represented in FIG. 3 by the addition of optional higher-density memory modules 54. For purposes of illustration only, the present invention is described with reference to the basic four megabyte memory module.

Figure 6A:
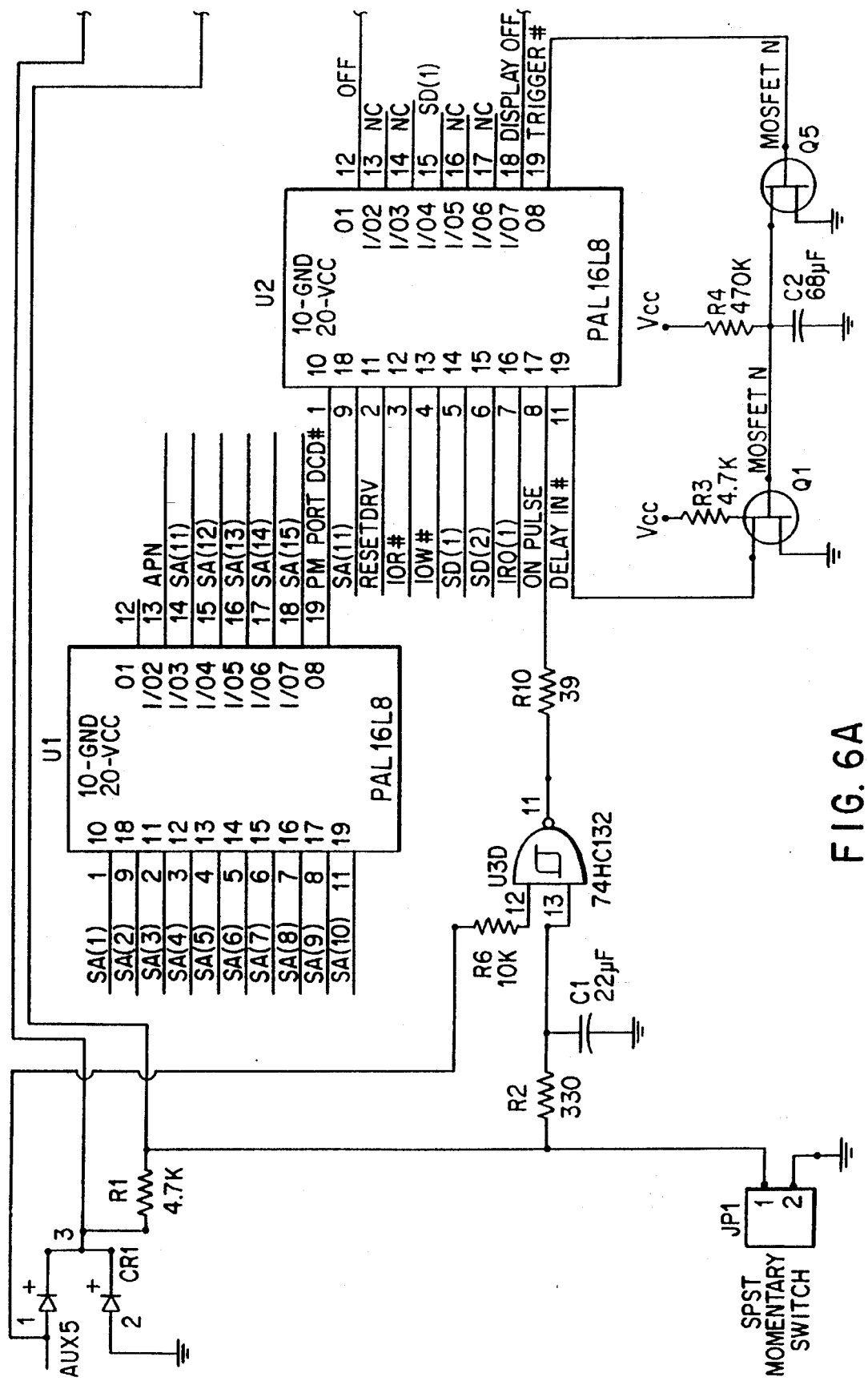
FIG. 6 is an electrical schematic diagram of the hardware needed to accomplish the single switch suspend/resume functions of the present invention, showing the various interfaces to other Figures.
Figure 6B:
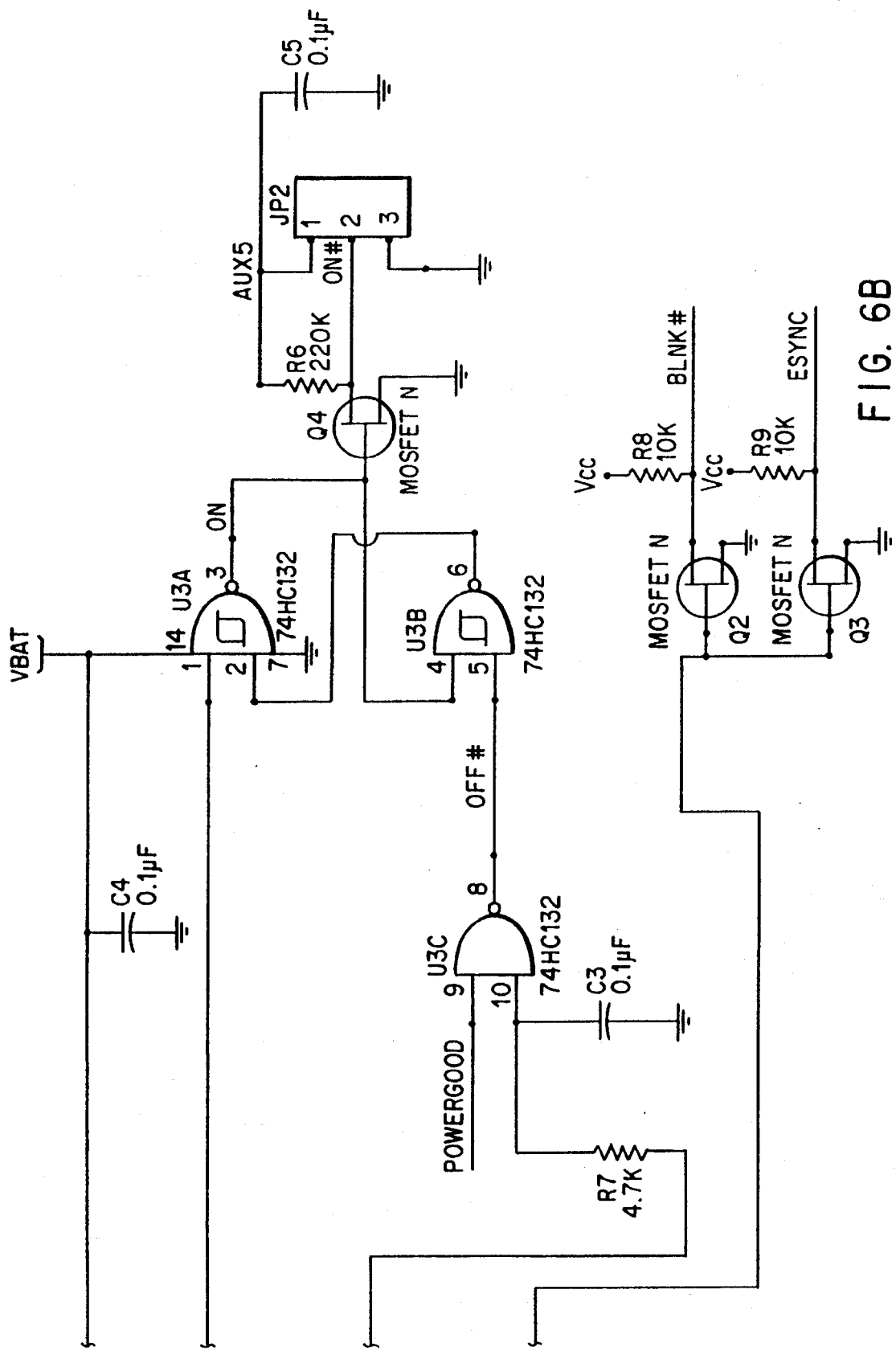

A latch buffer 68 is coupled between the system bus 66 and a planar I/O bus 90. The planar I/O bus 90 includes address, data, and control components respectively. Coupled along the planar I/O bus 90 are a variety of I/O adapters and other components such as the diskette adapter 84, the IDE disk adapter 86, an interrupt controller 92, an RS-232 adapter 94, nonvolatile CMOS RAM 96, also herein referred to as NVRAM, a CMOS real-time clock 98, a parallel adapter 100, a plurality of timers 102, the read only memory (ROM) 88, the 8042 104, and the power management circuitry 106. The 8042, shown at 104, is the slave microprocessor that interfaces with the keyboard 12 and the mouse 13. The power management circuitry 106 is shown in FIG. 6 and is more fully described in the text accompanying FIGS. 6 and 7. The read only memory 88 includes the BIOS that is used to interface between the I/O devices and the operating system of the microprocessor 40. BIOS stored in ROM 88 can be copied into RAM 53 to decrease the execution time of BIOS. ROM 88 is further responsive (via ROMSEL signal) to memory controller 48. If ROM 88 is enabled by memory controller 48, BIOS is executed out of ROM. If ROM 88 is disabled by memory controller 48, ROM is not responsive to address inquiries from the microprocessor 40 (i.e. BIOS is executed out of RAM).

The real-time clock 98 is used for time of day calculations and the NVRAM 96 is used to store system configuration data. That is, the NVRAM 96 will contain values which describe the present configuration of the system. For example, NVRAM 96 contains information describing the capacity of a fixed disk or diskette, the type of display, the amount of memory, time, date, etc. Of particular importance NVRAM will contain data (can be one bit) which is used by memory controller 48 to determine whether BIOS is run out of ROM or RAM and whether to reclaim RAM intended to be used by BIOS RAM. Furthermore, these data are stored in NVRAM whenever a special configuration program, such as SET Configuration, is executed. The purpose of the SET Configuration program is to store values characterizing the configuration of the system to NVRAM.

Nearly all of the above devices comprise volatile registers. To prevent the unnecessary cluttering of the drawings, the registers of a particular device will be referenced to that device. For example, the CPU registers will be referred to as the CPU 40 registers and the video controller registers will be referenced as the video controller 56 registers.

As mentioned hereinabove, the computer has a cover indicated generally at 15 which cooperates with the chassis 19 in forming an enclosed, shielded volume for containing the above identified components of the microcomputer. The cover 15 preferably is formed with an outer decorative cover member 16 which is a unitary molded component made of a moldable synthetic material and a metallic thin sheet liner 18 formed to conform to the configuration of the decorative cover member. However, the cover can be made in other known ways and the utility of this invention is not limited to enclosures of the type described.

States of Operation

Referring now to FIG. 4, a state diagram of the computer system of the present invention is shown. The computer system 10 of the present invention has four states: a normal operating state 150, a standby state 152, a suspend state 154, and an off state 156. The transitions between the states shown in FIG. 4 are meant to be descriptive of the preferred embodiment, but not limiting. Consequently, additional events may alternatively be used to cause state transitions.

The normal operating state 150 of the computer system 10 of the present invention is virtually identical to the normal operating state of any typical desktop computer. Users may use applications and basically treat the computer as any other. One difference, transparent to the user, is the presence of a power management driver in the operating system (the "APM OS driver"), which runs in the background, and various APM BIOS routines. The APM BIOS routines are discussed in the text below and include the Suspend Routine, the Resume Routine, the Boot-Up Routine, the Supervisor Routine, the Save CPU State Routine, and the Restore CPU State Routine. One APM BIOS routine not shown on any of the Figures is the APM BIOS Routing Routine. The APM BIOS Routing Routine essentially accepts commands from the APM OS driver and calls the appropriate APM BIOS routine. For example, when the APM OS driver issues the Suspend Command, the APM BIOS Routing Routine calls the Suspend Routine. As another example, whenever the APM OS driver issues the Get Event command, the APM BIOS Routing Routine calls the Supervisor Routine. These routines are located in BIOS and are shadowed when the BIOS is shadowed. The power management driver in the OS and the APM BIOS routines control the computer's transition between the four states. A reference to the word "APM" by itself generally is a reference to the APM OS driver, although the context may dictate otherwise.

The second state, the standby state 152, uses less electrical power than the normal operating state 150, yet leaves any applications executing as they would otherwise execute. In general power is saved in the standby state 152 by the code placing devices into respective low power modes. In the preferred embodiment, electrical power is conserved in the standby state 152 by ceasing the revolutions of the fixed disk (not shown) within the fixed disk storage device 31 and by ceasing generating the video signal, as will be more fully explained below. However, this is not intended to be limiting and other methods may be used to reduce power consumption, such as slowing or stopping the CPU clock.

In the preferred embodiment, electrical power is conserved in two separate ways. First, in the normal operating state 150, the fixed disk within the fixed disk storage device 31 is constantly spinning at typically 3600 revolutions per minute (RPM). In the standby state 152, the IDE disk controller 86 is given the command to cause the fixed disk storage device 31 to enter a low-power mode (the fixed disk inside the fixed disk storage device 31 ceases spinning), thereby conserving the power the motor (not shown) inside the fixed disk storage device 31 typically consumes while spinning the fixed disk.

Second, in the normal operating state 150, the video controller 56 of the computer system constantly generates a video signal (HSYNC, VSYNC, R, G, B, etc. as is well known in the art) corresponding to the image seen on the video display terminal 57. In the standby state 152 the video controller 56 ceases generating the video signal, thereby conserving the electrical power normally consumed by the video controller 56. HSYNC, VSYNC, R, G, and B are all driven to approximately 0.00 VDC. Using a VESA (Video Electronics Standards Association) compliant monitor allows further power savings because VESA compliant monitors turn themselves off when HSYNC and VSYNC are at approximately 0.00 VDC.

Note that some systems have "screen-savers," which cause the screen 57 to become dark to prevent phosphor burn-in of the front surface of the video display terminal. In most of such systems, the video controller 56 is still generating a video signal; it is merely generating a video signal corresponding to a dark screen or a dynamic display. Thus, a computer system executing a screen-saver still consumes the electrical power necessary to generate the video signal.

The third state is the suspend state 154. In the suspend state 154, computer system consumes an extremely small amount of electrical power. The suspended computer consumes less than 5 watts of electrical power from the wall outlet in the preferred embodiment. The only power consumed is a slight trickle of power used to monitor the switch 21 either from the AUX5 output from the power supply 17, or from a battery 171 inside the computer system, as will be explained more fully below in the text accompanying FIG. 5.

This small use of electrical power is accomplished by saving the state of the computer system to the fixed disk storage device (the hard drive) 31 prior to turning the power supply "off." To enter the suspend state 154, the CPU 40 interrupts any applications and transfers program execution control of the CPU to the power management driver. The power management driver ascertains the state of the computer system 10 and writes the entire state of the computer system to the fixed disk storage device 31. The state of the CPU 40 registers, the CPU cache 41, the system RAM 53, the system cache 60, the video controller 56 registers, the video memory 56, and the remaining volatile registers are all written to the fixed disk drive 31. The entire state of the system 10 is saved in such a way that it can be restored without significant usability penalties. That is, the user need not wait for the system to load the operating system, and load the graphical user interface as it normally would.

The computer then writes data to the non-volatile CMOS memory 96 indicating that the system was suspended. Lastly, the CPU 40 causes the power supply 17 to stop providing regulated power. The computer system 10 is now powered down with the entire state of the computer safely saved to the fixed disk storage device 31.

The word "state" is used throughout this document in two similar, but possibly confusing ways. Devices can be "in" a particular state. The four system states—normal 150, standby 152, suspend 154, and off 156—refer to the general state of the computer system 10 of the present invention. These "states" describe the computer system 10 in a general way. For example, while in the normal operating state 150, the CPU 40 is still executing code and changing a plurality of registers within the system 10. Likewise, similar activity occurs while in the standby state 152. Thus, the memory and register configuration of the computer system 10 is dynamic while the system 10 is in the normal operating state 150 and the standby state 152.

Other devices can also be "in" certain states. The programmable logic array U2 can be in several states, as will be explained in the text accompanying FIG. 7.

Contrast the above with the "state of" a device, for example, the "state of the computer system 10" or the "state of the CPU 40." The "state of" a device refers to the condition of that device at a particular computer cycle. All memory locations and registers will have particular binary values. The "state of" a device is a static binary snapshot of the contents of that device.

The "state of" the computer system 10 refers to operational equivalents and not necessarily exact copies. For example, a computer system in a state A may have certain memory in either CPU cache 41 or system cache 60. It is possible to "flush" the contents of either cache back to the system RAM 53, putting the computer system in a state B. Purely speaking, the state of the computer system in state A is different from the state of the computer system in state B, because the contents of cache and system RAM are different. However, from a software operational perspective, state A and state B are the same, because, aside from a slight decrease in system speed (caused by the program not having the benefit of executing out of cache), the executing programs are not affected. That is, a computer in state A and a computer in state B are software operationally equivalent, even though the computer whose cache was flushed will experience a slight decrease in performance until the cache areas are reloaded with helpful code.

The word "power" is also used in two similar, but possibly confusing ways. "Power" most often refers to electrical power. However, "power" also refers to computational power occasionally. The context should make the intended usage obvious.

A "circuit" is generally a reference to a physical electronic device or a plurality of devices electrically interconnected. However, the term "circuit" also is intended to encompass CPU code equivalents of physical electronic devices. For example, on the one hand, a two-input NAND gate can be implemented via a 74LS00 or, equivalently, in a programmable device. These two devices are physical electronic devices. On the other hand a NAND gate can also be implemented by having the CPU 40 read two inputs from two CPU-readable input ports, generate the NAND result using a CPU command, and output the result via a CPU-writable output port. These CPU-interfacable ports can be simple, such as decoded latches, or their programmable device equivalent, or complex, such as PIAs, which are well-known in the art. "Circuit" is meant to include all three examples of NAND gate implementations. In some cases, "circuit" may refer to merely an electrical pathway. Types of electrical pathways include a wire, a trace or via on a printed circuit board, etc., or any combination of types of electrical pathways that form a single electrically connected pathway.

A "signal" may refer to a single electrical waveform or a plurality of waveforms. For example, the video controller generates a video signal. The video signal is actually a plurality of signals on a plurality of electrical conductors: HSYNC, VSYNC, R, G, B, etc. as is well known in the art.

Returning now to FIG. 4, the fourth and final state is the off state 156. The off state 156 is virtually identical to any typical computer system that has been turned off in the ordinary sense. In this state, the primary/regulation unit 172 of the power supply 17 ceases providing regulated power to the computer system 10, (with the exception of a slight trickle of regulated power through AUX5, as will be more fully explained in the text accompanying FIG. 5) but the state of the computer system 10 has not been saved to the fixed disk 31. The suspend state 154 and the off state 156 are similar in that the power supply 17 no longer generates regulated power. They differ in that in the off state 156, the state of the computer system 10 is not saved to the hard drive 31, as it is in the suspend state 154. Moreover, when leaving the off state 156, the computer 10 "boots" as if it is being turned on. That is, any executing code must be started either by the user or automatically by a means such as the AUTOEXEC.BAT file. However, when leaving the suspend state 154, the computer 10 resumes executing where it was when it was interrupted.

FIG. 4 also shows a general overview of the events that cause transitions between the four states. These events will be further explained in the text accompanying FIGS. 6 through 8; however, a cursory explanation may be helpful. The power button 21, two timers (the inactivity standby timer and the inactivity suspend timer, see FIG. 9 and accompanying text), and an enter suspend flag (see FIGS. 6 and 7 and accompanying text) all of which affect which state the computer enters. In general, the two timers can be either hardware or CPU code timers, executing on the CPU as a program. In the preferred embodiment, they are both CPU code timers, executing from the BIOS data segments. However, the two timers could conceivably be hardware timers, which would be a better solution, in that it would reduce the overhead of the system. The timers are more fully explained in the text accompanying FIG. 9. Both timers are active when the computer 10 is in either the normal operating state 150 or the standby state 152. The timers are in communication with other routines such that the expiration of either timer causes a transition as outlined below. Either or both timers can be configured to expire after a certain period of time, depending on the particular needs of the user. In the preferred embodiment, the inactivity standby timer and the inactivity suspend timer can be set to expire after 15 to 90 minutes. Either or both timers can be stopped, that is, configured to never expire. "Stopping" the timers can take the form of actually ceasing the incremental counting action of the timers or merely ignoring their expiration. In the preferred embodiment, setting a zero value in the timer expiration value causes the timer expiration not to be tested. The user of a networked computer may, for example, not want the computer to enter the suspend state 154 because doing so may cause the LAN to fail with respect to that computer.

In theory, the timers can count up or count down and can be reset to a fixed predetermined state and expected to count to another fixed predetermined state when the timer is started (or restarted) or the present value can be used and a difference or sum calculated as the endpoint expiration trigger. In the preferred embodiment, when the timers are reset, the present value of the minutes variable from the real-time clock 98 is stored. The timers are checked for expiration by subtracting the current minutes value from the saved minutes value and comparing the difference to the values selected by the user.

Both timers are affected by certain system activity. For example, in the preferred embodiment, user activity in the form of keyboard 12 keys being pressed, the mouse 13 being moved, mouse 13 buttons being pressed, or hard drive 31 activity causes each timer to be restarted, as more fully explained in the text accompanying FIG. 9; therefore, while a user is pressing keyboard 12 keys or using the mouse 13, neither timer will expire. In addition other system events might be used to reset the timers. Any of the hardware interrupts might alternatively be monitored for activity. Thus, it might be desirable to have printing prevent the system from entering the suspend state 154.

Figure 7:
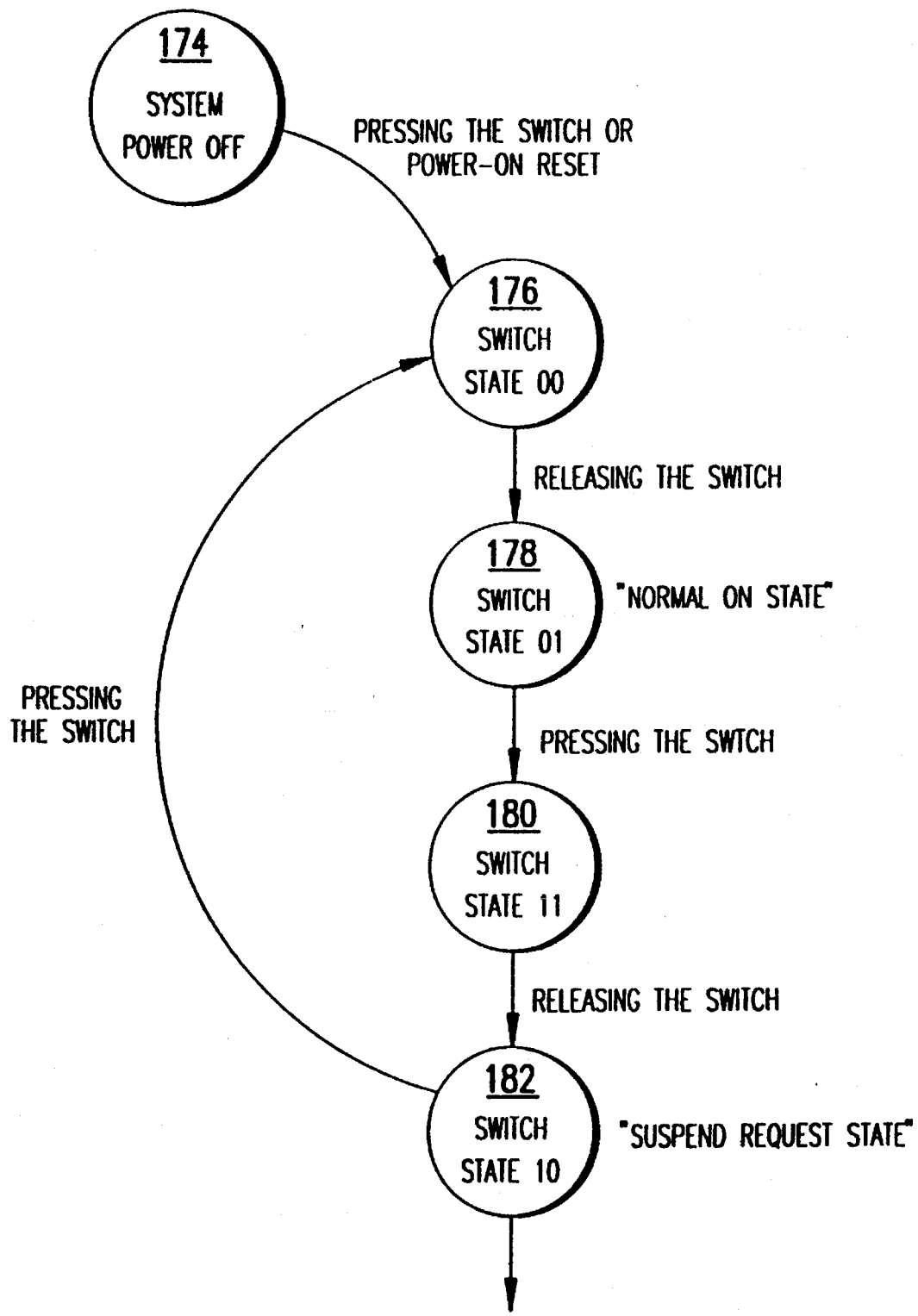
FIG. 7 is a state diagram of one of the state machines of the programmable array logic (PAL) device U2 shown in FIG. 6.

The enter suspend flag is a CPU-manipulable and readable latch within the programmable logic array U2, which will be more fully explained in the text accompanying FIG. 7. In short, putting the programmable logic array U2 in one mode causes a press of the switch 21 to place the system 10 into the off state 156 and putting the programmable logic array U2 into another mode causes a press of the switch 21 to place the system 10 into the suspend state 154. If the computer system 10 is in the normal operating state 150 and the power button 21 is pressed while the enter suspend flag written to the programmable logic array U2 is $00_2$, then the computer system 10 enters the off state 156, as shown at 158. If the computer system 10 is off state 156 and the power button 21 is pressed, then the computer system enters the normal operating state.

If the computer system 10 is in the normal operating state 150, one event can cause the computer to enter the standby state 152: if the inactivity standby timer expires, the computer system 10 will change to the standby state 152, as shown at 162. While in the standby state 152, any system activity of the kind previously described will cause the computer 10 to leave the standby state 152 and re-enter the normal operating state 150, as shown at 164.

If the computer 10 is in the normal operating state 150, two events can cause it to enter the suspend state 154. First, if the inactivity suspend timer expires, the computer system 10 will change to the suspend state 154, as shown at 166. Second, the user can cause the computer 10 to enter the suspend state 154 immediately by pressing the power button 21 while the enter suspend flag written to the programmable logic array U2 is $01_2$, also shown at 166. While in the suspend state 154, the user changes to the normal operating state 150 by pressing the power button 21, as shown at 168.

In addition, several external events alternatively may be used to change the system 10 from the suspend state 154 to the normal operating state 150, at 168. For example, a telephone ring detect circuit could be added to the circuitry of FIG. 6 and configured to cause the system 10 to leave the suspend state 154 and enter the normal operating state 150 when an attached telephone line rings. Such a modification might be useful for a system receiving telefax data or digital data. The system would only consume power when receiving incoming information. Likewise an interface between the real-time clock and FIG. 6 could alternatively allow an alarm-type event to cause the system 10 to leave the suspend state 154 and enter the normal operating state 150. Such a system might be useful in sending telefax or digital data at a certain time of day to take advantage of lower telephone usage rates.

Lastly, if the computer system 10 is in the standby state 152 and the inactivity suspend timer expires, then the computer 10 changes to the suspend state 154 as shown at 170. The computer system 10 cannot change back from the suspend state 154 to the standby state 152, but may only transition to the normal operating state 150 as described in the text accompanying transition 168.

Obviously, the computer system 10 cannot instantaneously change states. In each transition from one of the four states, a certain period of time will be required to make the necessary system changes. The details of each transition period will be explained in the text accompanying FIGS. 6 through 15.

System Hardware

Figure 5:
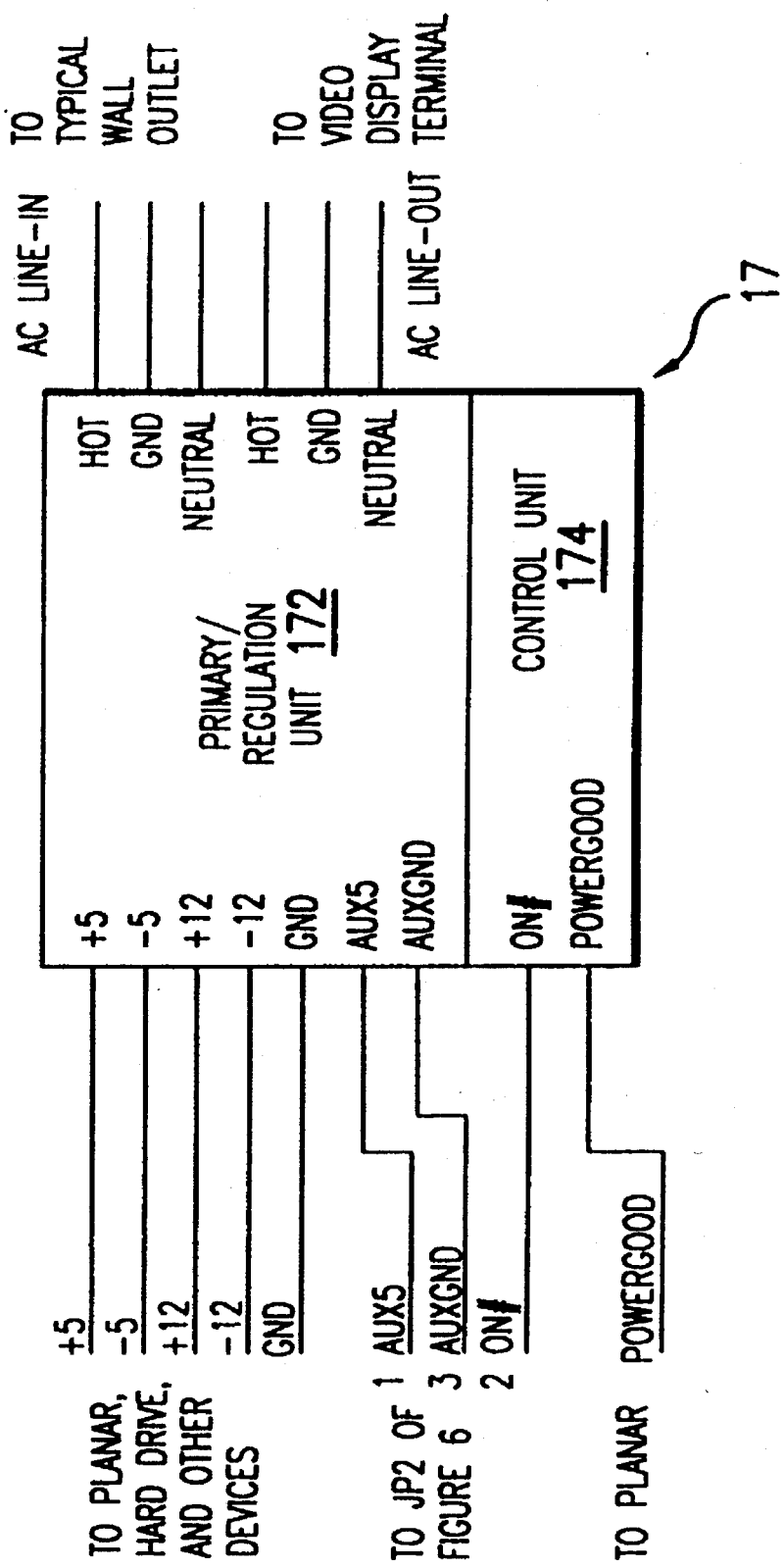
FIG. 5 is a block diagram showing the relevant portions of the power supply.

Before discussing the details of the code executing on the CPU 40, it may be helpful first to discuss the hardware required to achieve the four states. A block diagram of the power supply 17 is shown in FIG. 5. The power supply 17 has two units: a control unit 174 and a primary/regulation unit 172. The power supply 17 has several inputs: Line-In, which accepts 115 VAC from a typical wall outlet, and $\overline{ON}$, which controls the regulation activity of the power supply 17. The power supply 17 has several outputs: AC Line-Out, ±5 VDC, ±12 VDC, AUX5, GND, and POWERGOOD. The AC Line-Out is unregulated 115 VAC that is typically passed to the electrical power input (not shown) of the video display terminal 57. The control unit 174 accepts the $\overline{ON}$ input and generates the POWERGOOD output. The primary/regulation unit 172 selectively regulates the 115 VAC from the Line-In input down to ±5 VDC, ±12 VDC. Whether the primary/regulation unit 172 regulates power depends on the value of $\overline{ON}$, as interfaced by the control unit 174. In the preferred embodiment, the control unit 174 should provide isolation for the circuitry generating the $\overline{ON}$ signal, for example, an appropriate optoisolator.

The Line-In input and the AC Line-Out, ±5 VDC, ±12 VDC, GND, and POWERGOOD outputs are well known in the art. When the power supply 17 is "off," that is, not providing regulated voltages from the Line-In, the POWERGOOD signal is a logical ZERO. When the power supply 17 is "on," the power supply 17 generates the ±5 VDC and ±12 VDC regulated voltages from the 115 VAC Line-In. These four regulated voltages and their associated GND are the "system power" as is commonly known in the art. When the regulated voltages attain levels within acceptable tolerances, the POWERGOOD signal changes to a logical ONE.

The AUX5 output provides an auxiliary +5 VDC to the planar. When the power supply 17 is plugged into a typical wall outlet supplying a nominal 115 VAC, the primary/regulation unit 172 provides regulated +5 VDC at AUX5, whether the power supply is "on" or "off." Thus, while plugged in, the power supply 17 is always providing a nominal +5 VDC at AUX5. The AUX5 output differs from the +5 output in that the primary/regulation unit 172 only generates regulated +5 VDC through the +5 output while the power supply 17 is "on." The AUX5 output further differs from the +5 output in that in the preferred embodiment, the primary/regulation unit 172 supplies several amps of current at +5 VDC through the +5 output, while the primary/regulation unit 172 supplies less than an amp at +5 VDC though the AUX5 output.

Typical prior power supplies use a high-amperage double-throw switch to connect and disconnect the Line-In input to and from the regulation section of the power supply. The power supply 17 in the present invention does not use a high-amperage double-throw switch. Rather, the switch 21 controls circuitry that generates the $\overline{\text{ON}}$ signal. In the preferred embodiment, the switch 21 is a momentary single pole, single throw pushbutton switch; however, those skilled in the art could adapt the circuitry of FIG. 6 to make use of other types of switches such as a single-pole, double throw switch. The AC Line-In is always connected to the primary/regulation unit 172 from the wall outlet. When $\overline{\text{ON}}$ is a logical ONE (approximately AUX5, nominally +5 VDC), the primary/regulation unit 172 does not regulate the 115 VAC Line-In to ±5 VDC or ±12 VDC through the ±5 or ±12 outputs. The primary/regulation unit 172 merely provides a low-amperage nominal +5 VDC at the AUX5 output. On the other hand, when $\overline{\text{ON}}$ is a logical ZERO (approximately GND), the primary/regulation unit 172 does regulate the 115 VAC Line-In to ±5 VDC and ±12 VDC through the four ±5 and ±12 outputs, respectively. Thus, when $\overline{\text{ON}}$ is a ONE, the power supply 17 is "off" and when $\overline{\text{ON}}$ is a ZERO, the power supply 17 is "on."

If specified, power supplies having an AUX5 output and an $\overline{\text{ON}}$ input, like the power supply 17 described above, can be obtained from suppliers of more conventional power supplies.

Referring now to FIG. 6, a schematic drawing of the electronic circuitry of the computer system 10 of the present invention is shown. The circuitry in FIG. 6 is responsible for interfacing between the switch 21, the power supply 17, the video display terminal 57, and code executing on the CPU 40.

The circuitry comprises three (3) integrated circuits: U1, a first preprogrammed PAL16L8; U2, a second preprogrammed PAL16L8; and U3, a 74HC132, which is well known in the art. In general, the PALs U1 and U2 interface between the planar I/O bus 90 of FIG. 3 and the remaining circuitry of FIG. 6. The circuitry further comprises the switch 21, ten resistors R1–R10, five capacitors C1–C5, four N-type MOSFETs Q1–Q4, which are standard low-current NMOS FETs suitable for acting as a logic switch in the preferred embodiment, and a dual diode package CR1, which is a standard low-current dual diode package, all configured and connected as shown in FIG. 6. The resistors R1–R10 are ¼ Watt resistors and are of values shown in FIG. 6, ±5%. The capacitors C1–C2 are electrolytic capacitors of the values shown in FIG. 6, ±10%. The capacitors C3–C5 are 0.1 μF (± 10%) ceramic capacitors.

The first PAL U1 is connected to address lines SA(1) through SA(15) and the AEN (address enable) line. SA(1) through SA(15) and AEN are part of the planar I/O bus 90 shown in FIG. 3. The first PAL U1 is programmed to be merely an address decoder, presenting an active low signal PM_PORT_DCD# when a predetermined address is presented on address lines SA(1) through SA(15) and the AEN (address enable) line is active.

The second PAL U2 is programmed to provide a readable byte and three writable bits in the lower three bits of the I/O port mentioned above, also herein referred to as the "power management port." The second PAL U2 has eight (8) inputs from the planar I/O bus 90: SD (0), SD (1), SD (2), SA (0), IOW#, IOR#, RESETDRV, and IRQ(1). The second PAL U2 is reset to a known initial condition by the active high signal RESETDRV input at pin 2, which is generated by the memory controller 46, as is well known in the art. The second PAL U2 is more fully described in the text accompanying FIG. 7 and Tables I and II.

The third device has two portions, here identified as U3A and U3B, which form an SR latch, also known as a NAND latch, which is well known in the art. The SR latch has pins 1 and 5 of U3 as inputs (pin 1 is the SET input and pin 5 is the RESET input) and pin 3 of U3A as the output. While both inputs are a logical ONE, the output retains its latched output value. If SET is placed to a logical ZERO, the output becomes a logical ONE. If the SET input is returned to a logical ONE, the output is latched at a logical ONE. If the RESET input is placed to a logical ZERO, the output becomes a logical ZERO. If the RESET input is returned to a logical ONE, the output is latched at a logical ZERO.

If the POWERGOOD signal is a logical ONE, which indicates that the regulated voltages are at proper levels, then a third portion of the third device, here identified as U3C, acts as an inverter for the pin 12 output of the second PAL U2. If the POWERGOOD signal is a logical ZERO, indicating that VCC is either floating near ground or ramping up to or ramping down from +5 VDC, then the output at pin 8 of the third portion of the third device U3C remains a logical ONE, preventing any noise from pin 12 of the second PAL U2 from affecting the SR latch created by the first and second portions U3A and U3B of the third device.

The switch 21 connects to the circuitry of FIG. 6 at JP1. A resistor/capacitor subcircuit R2 and C1 debounce a closure event of the switch 21. The fourth portion of the third device U3D is configured as an inverter with pin 12 being pulled to VBAT (approximately +4.3 VDC when AUX5 is a nominal +5 VDC) through R6, which inverts the debounced switch closure. A current-limiting resistor R10 protects pin 11 of the fourth portion of the third device U3D from any current that may flow from pin 8 of the second PAL U2 when that device powers up or down.

The SR latch should never power off. However, if it does, R7 and C3 are designed to place the SR latch into a state on power-up such that the power supply 17 will be in the "off" state when the SR latch is repowered.

Resistors R1, R3, R4, R5, R6, R8 and R9 are pull-up resistors, pulling their respective lines to either VCC, VBAT, or AUX5. Transistors Q1, Q2, Q3, and Q4 are inverters. R4 and C2 form an RC pair causing C2 to charge until it reaches VCC. Transistor Q5 drains transistor C2 when the pin 19 output of the second PAL U2 is a logical ONE. When the voltage stored in C2 is below approximately +2.7 VDC, Q1 does not conduct and R3 pulls the pin 11 input of the second PAL U2 to VCC, making it a logical ONE. If C2 charges to approximately 2.7 VDC or greater, then Q1 conducts, pulling the pin 11 input to GND, making it a logical ZERO.

When the pin 18 output of the second PAL U2 is a logical ZERO, R8 and R9 pull the BLNK# and ESYNC lines, respectively, to VCC. With the ESYNC and BLNK# lines at VCC, the video controller 56 generates a video signal. When the pin 18 output of the second PAL U2 is a logical ONE, transistors Q2 and Q3 conduct, pulling BLNK# and ESYNC, respectively, to GND, causing the video controller 56 to cease generating the video signal.

The electronic circuitry shown in FIG. 6 has three power sources: VCC, AUX5, and VBAT. VCC and AUX5 are generated by the power supply 17 and are nominally +5.0 VDC. VCC and its associated GND return line enter through the main power connector (not shown) on the planar 20 as is well known in the art. AUX5 is connected to the circuitry at pin 1 of JP2. The AUX5 return enters and is connected to the GND line at pin 3 of JP2. VBAT is the power output of the battery 171 and is nominally 3.5 VDC. The battery 171 is a lithium battery and is well known in the art.

The PALs U1 and U2 have their VCC input at pin 20 connected to VCC. In addition, several resistors R3, R4, R8, and R9 are also connected to VCC. The power supply 17 only provides regulated +5 VDC when the power supply is "on" and plugged into a typical wall outlet supplying a nominal 115 VAC, as is well known in the art. Thus, when the power supply is either "off" or unplugged, the PALs U1 and U2 and resistors R3, R4, R8, and R9 are not receiving +5 VDC.

On the other hand, whenever the power supply 17 is plugged into a typical wall outlet supplying a nominal 115 VAC, the power supply 17 provides regulated +5 VDC at AUX5, whether "on" or "off." Thus, those devices connected to AUX5 receive +5 VDC whenever the power supply 17 is plugged in.

Moreover, U3 and the resistors R1, R2, and R6 are always receiving electrical power, because the diodes of CR1 interface VBAT and AUX5 in such a way that devices attached to VBAT are always receiving power. While plugged into a typical wall outlet, the power supply 17 provides +5 VDC at AUX5 and the devices attached to VBAT (U3 and the resistors R1, R2, and R6) receive approximately +4.3 VDC (+5 VDC of AUX5 minus the diode drop of the diode within CR1 between AUX5 and VBAT). When not plugged in, the power supply 17 ceases providing regulated power to the AUX5 line and U3 and the resistors R1, R2, and R6 receive power from VBAT. A typical 74HC132 requires a minimum DC supply voltage of +2.0 VDC. Thus, as long as VBAT retains a sufficient charge to provide +2.0 VDC, U3 is sufficiently powered.

The circuitry of FIG. 6 can have numerous alternative modifications and still come within this invention. For example, the real-time clock 98 can be electrically connected to the FIG. 6 circuitry and configured to be diode ORed to the ON# signal such that at a specific time of day, the computer system 10 is changed from the suspend state 154 to the normal operating state 150. Likewise a telephone ring-detect circuit could alternatively be added to the FIG. 6 circuitry and configured to be diode Ored to the ON# signal such that a ring of an attached telephone line would cause the system 10 to leave the suspend state 154 and enter the normal operating state 150.

Referring back to FIG. 6, the second PAL U2 has two state machines. A state diagram of one of the state machines in the second PAL U2 is shown in FIG. 7. Table I and Table II describe the other state machine and certain miscellaneous aspects of the second PAL U2.

FIG. 7 shows one of the state machines within the second PAL U2. TE1 and TE0 together allow four states: switch state $00_2$ 176, switch state $01_2$ 178, switch state $11_2$ 180, and switch state $10_2$ 182.

TE1 and TE0 are not directly writable to the second PAL U2, rather, states change in response to closure events of the switch 21 and other events, such as resetting of the computer system 10. With system power not being provided by the power supply 17, the second PAL U2 is not being powered and, therefore, its state is meaningless, at 174. A press of the switch 21 and other events (such as a telephone ring detector causing the power supply 17 to provide system power) cause the power supply 17 to begin providing system power, as described in the text accompanying FIG. 6. When the switch 21 pressed or the RESETDRV signal is active, the second PAL U2 enters switch state $00_2$ 176. Releasing the switch 21 or the RESETDRV becoming inactive while the switch 21 is not pressed causes the second PAL U2 to enter switch state $01_2$ 178. Pressing the switch 21 again causes the second PAL U2 to enter switch state $11_2$ 180. Releasing the switch 21 again causes the second PAL U2 to enter switch state $10_2$ 182. Subsequent closures of switch 21 causes the second PAL U2 to cycle through the four states, as shown in FIG. 7. The second PAL U2 is in switch state $01_2$ 178 when the computer system 10 is in the normal operating state 150.

Switch state $01_2$ 178 is the switch state corresponding to the normal on state for the TE1, TE0 state machine. Application programs will execute while in that state. The system 10 may enter and leave the standby state 152 in that state. Switch state $01_2$ 178 also corresponds to a user-generated suspend abort request. Switch state $10_2$ is the switch state corresponding to a suspend request by the user. That is, starting with the system in the off state 156, pressing the switch 21 once places the computer system in the normal operating state 150. Pressing the switch 21 once again generates a suspend request (OFFH at the power management port), which is read by the Supervisor Routine, which is discussed more fully in the text accompanying FIG. 9. Pressing the switch 21 a third time, before the system 10 is in the suspend state 154, generates a suspend abort request (OFEH at the power management port), which is read by the Suspend Routine.

Table I adds several comments to the four states of FIG. 7. While in switch states $00_2$ 176, $01_2$ 178, and $11_2$ 180, the power management port outputs OFFH in response to a read. On the

TABLE I

| TE1 | TE0 | Comments |
|-----|-----|----------|
| 0 | 0 | Clears the display blanking bit |
|   |   | Read of power management port = OFFH |
| 0 | 1 | Display blanking bit controlled by SD(2) |
|   |   | Read of power management port = OFFH |
| 1 | 1 | Display blanking bit controlled by SD(2) |
|   |   | Read of power management port = OFFH |
| 1 | 0 | Sets the display blanking bit |
|   |   | Read of power management port = OFEH | other hand, while in switch state $10_2$ 182, the power management port outputs OFEH in response to a read. A press and release of switch 21 causes the second PAL U2 to leave switch state $01_2$ and enter switch state $10_2$ 182, which signals a hardware suspend request. The Supervisor Routine becomes aware of the hardware suspend request by reading the power management port. A OFEH in response to a read indicates a hardware suspend request.

The TE1, TE0 state machine also affects the video blanking circuitry. While in switch state $00_2$ 176, the display blanking bit is cleared, causing the video controller 56 to generate the video signal. While in switch state $10_2$ 182, the display blanking bit is set, causing the video controller 56 to stop generating the video signal. While in switch states $01_2$ 178 and $11_2$ 180, the display blanking bit is controlled by writes to D2, as explained below.

Table II shows the other state machine of the second PAL U2 and shows how writes to SD2 affect the video signal.

TABLE II

| S2 | S1 | S0 | Comments |
|----|----|----|----------|
| X | 0 | 0 | While in switch state $10_2$, turns "off" the power supply immediately |
| X | 0 | 1 | While in switch state $10_2$, starts |

TABLE II-continued

| S2 | S1 | S0 | Comments |
|---|---|---|---|
|  |  |  | failsafe timer (C2 charges) |
| X | 1 | 0 | Turns "off" power supply immediately |
| X | 1 | 1 | Resets failsafe timer (C2 drained) |
| 0 | X | X | Turns on video signal |
| 1 | X | X | Turns off video signal |

The U2 circuitry within the PAL provides for three bits—SD(0), SD(1), SD(2)—at the power management port. The three bits are labeled S0, S1, and S2 in Table II. SD(2) controls the video blanking by controlling the pin 18 DISPLAY_OFF output of the second PAL U2. Writing a ONE to the SD(2) bit of the power management port turns off the video signal by causing the pin 18 DISPLAY_OFF output to assert a logical ONE, causing transistors Q2 and Q3 to conduct, pulling BLNK# and ESYNC to GND, which causes the video controller 56 to cease generating the video signal. Likewise, writing a ZERO to SD(2) of the power management port causes pin 18 DISPLAY_OFF output to assert a logical ZERO, causing transistors Q2 and Q3 to stop conducting, allowing resistors R8 and R9 to pull BLNK# and ESYNC to VCC, which allows the video controller 56 to generate the video signal.

The IRQ(1) input also controls the video blanking. IRQ(1) is the keyboard hardware interrupt; pressing a key on the keyboard 12 causes IRQ(1) to pulse. A pulse on IRQ(1) while the video signal is off immediately turns the video signal back on by causing the pin 18 DISPLAY_OFF output to assert a logical ZERO, causing transistors Q2 and Q3 to stop conducting, allowing resistors R8 and R9 to pull BLNK# and ESYNC to VCC, which allows the video controller 56 to generate the video signal. Using IRQ(1) in this manner gives the user immediate feedback in the form of a restored video display when returning from the standby state 152 to the normal operating state 154. Without it, the user might not receive feedback until possibly seconds later when the APM checks for user activity, as explained in the text accompanying FIG. 9.

SD(1) and SD(0) work in tandem to provide four operating states: $00_2$, $01_2$, $10_2$, and $11_2$. The second PAL U2 is initialized by the RESETDRV input to the $00_2$ state. In addition, while in any of the four states, writing a XXXXXX$00_2$ to the power management port places the second PAL U2 in the $00_2$ state. In the $00_2$ state, the switch 21 acts like the power switch of typical power supplies, described in the text accompanying FIG. 5. Pressing the switch 21 while in the $00_2$ state turns "off" the power supply 17 by causing the pin 12 output of the second PAL U2 to assert a logical ONE, causing the output pin 3 of the SR latch to latch into a logical ZERO state, allowing $\overline{ON}$ to be pulled HIGH by R6, causing the primary/regulation unit 172 of the power supply 17 to stop providing regulated voltages along the ±5 and ±12 lines. In this state, the APM is disconnected as is more fully explained in the System Software discussion, below. Reading the power management port while in the $00_2$ state causes the circuitry to return OFEH. In the preferred embodiment, this byte is read and tested to ensure that the hardware is present.

While in any of the four states, writing a XXXXXX$01_2$ to the power management port causes the second PAL U2 to enter the $01_2$ state. The $01_2$ state is the normal APM state. Reading the power management port immediately after entering the $01_2$ state, before the switch 21 is pressed, causes the circuitry to return OFFH. Pressing and releasing the switch 21 while in the $01_2$ state causes two events: (1) the value returned from a read of the power management port toggles between OFEH and OFFH and (2) the value asserted at pin 18 toggles, causing the video controller 56 to toggle the video signal on and off with each press. Moreover, the first time the switch 21 is pressed, failsafe timer starts by causing the pin 19 TRIGGER# output to assert a logical ZERO, causing Q5 to stop conducting, allowing the capacitor C2 to start charging. When the voltage stored in C2 is below approximately +2.7 VDC, Q1 does not conduct and R3 pulls the pin 11 input of the second PAL U2 to VCC, making it a logical ONE. If C2 charges to approximately +2.7 VDC or greater, then Q1 conducts, pulling the pin 11 input to GND, making it a logical ZERO. Whenever the pin 11 DELAY_IN# is a logical ZERO, then the second PAL U2 turns "off" the power supply 17 by causing the pin 12 output of the second PAL U2 to assert a logical ONE, causing the output pin 3 of the SR latch to latch into a logical ZERO state, allowing $\overline{ON}$ to be pulled HIGH by R6, causing the primary/regulation unit 172 of the power supply 17 to stop providing regulated voltages along the ±5 and ±12 lines. Repeated switch closures cause the failsafe timer to toggle on and off.

Thus, while in the $01_2$ state, before the switch is pressed, the value returned from a read is OFFH and the video signal is being generated; the first time the switch 21 is pressed, the value returned from a read changes to OFEH and the video signal stops being generated, causing the video display terminal 57 to blank. A second press of the switch 21 causes the value returned from a read to change back to OFFH and the video controller 56 starts generating the video signal again. The toggling nature causes repeated pressing of the switch 21 to behave such that an odd total number of switch presses results in a value of OFEH and a blanked video signal and an even total number of switch presses results in a value of OFFH and a generated video signal.

While in any of the four states, writing a XXXXXX$10_2$ to the power management port causes the second PAL U2 to enter the $10_2$ state. Entering the $10_2$ state turns "off" the power supply 17 immediately by causing the pin 12 output of the second PAL U2 to assert a logical ONE, causing the output pin 3 of the SR latch to latch into a logical ZERO state, allowing $\overline{ON}$ to be pulled HIGH by R6, causing the primary/regulation unit 172 of the power supply 17 to stop providing regulated voltages along the ±5 and ±12 lines. This state gives the system 10 control over the power supply 17.

While in any of the four states, writing a XXXXXX$11_2$ to the power management port causes the second PAL U2 to enter the $11_2$ state. Entering the $11_2$ state resets the failsafe timer by causing the pin 19 TRIGGER# output to assert a logical ONE, causing Q5 to conduct, draining the capacitor C2 to GND. Leaving this state and entering the $01_2$ state restarts the failsafe timer by causing the pin 19 TRIGGER# output to assert a logical ZERO, preventing the transistor Q5 from conducting, allowing the capacitor C2 to charge again.

The following discussion of the function of the circuitry of FIG. 6 assumes that the power supply 17 is plugged into a typical wall outlet and generating +5 VDC at AUX5, therefore, many of the devices, especially U3, are sufficiently powered.

It is believed that a discussion of the circuitry of FIG. 6 is more easily understood if first examined while the power supply 17 is "off." For the power supply 17 to be "off," the signal $\overline{ON}$ at pin 2 of JP2 must be a logical ONE. Therefore, Q4 must not be conducting and, therefore, pin 3 of U3 must be a logical ZERO. That is, the SR latch of U3A and U3B is latched with a logical ZERO output. POWERGOOD is a logical ZERO and the second PAL U2 is not powered, therefore, the pin 8 output of U3C is a logical ONE, thus, the RESET input of the SR latch is a ONE. Likewise, the SR latch SET input, pin 1 of U3A, is pulled to a logical ONE by R1. In this state, the SR latch is latched with a logical ZERO output.

When the switch 21 is pressed, the closure is debounced by R2 and C1, and the SR latch SET input, pin 1 of U3A, is pulled to GND (a logical ZERO). This causes the SR latch output, pin 3 of U3A, to change to a logical ONE, causing Q4 to conduct, which pulls $\overline{ON}$ to GND, causing the power supply 17 to start providing regulated power to the ±5 and ±12 lines. Releasing the switch allows the SR latch SET input, pin 1 of U3A, to change to a logical ONE, causing the SR latch to latch the logical ONE at the U3A pin 3 output, thereby latching the power supply 17 in the "on" state.

After the POWERGOOD signal becomes a logical ONE, all the voltages are within tolerances. While POWERGOOD is a logical ZERO, the second PAL U2 is initialized such that: (1) the pin 12 OFF output asserts a logical ZERO, which leaves the SR latch in its current latched state, (2) the pin 18 DISPLAY_OFF output asserts a logical ZERO, which allows the video controller to generate the video signal, and (3) the pin 19 TRIGGER# output asserts a logical ONE, causing Q5 to drain C2 to GND, thereby keeping the pin 11 DELAY_IN# input pulled to a logical ONE by R3.

As mentioned above, the second PAL U2 circuitry in FIG. 7 provides for three bits—SD(0), SD(1), SD(2)—at the power management port. SD(2) controls the pin 18 DISPLAY_OFF output of the second PAL U2. Writing a ONE to SD(2) of the power management port causes the video controller 56 to cease generating the video signal. Likewise, writing a ZERO to SD(2) of the power management port allows the video controller 56 to generate the video signal.

As also mentioned above, SD(1) and SD(0) work in tandem to provide four operating states: $00_2$, $01_2$, $10_2$, and $11_2$. The second PAL U2 is initialized by the RESETDRV input to the $00_2$ state. While in this state, pressing the switch 21 merely causes the power supply 17 to be turned "off." At some point in the execution of the code, if the user so desires, the software will write a $XXXXXX01_2$ to the power management port causing the second PAL U2 to enter the $01_2$ state. The $01_2$ state is the normal APM state. During each APM "get event" the Supervisor Routine checks to see if either the inactivity standby timer expired or the inactivity suspend timer expired. If the inactivity standby timer expired then the Supervisor Routine will write $XXXXX1XX_2$ to the I/O port, which blanks the video signal. If the computer ever leaves the standby state and enters the normal operating state again, then the Supervisor Routine will write $XXXXX0XX_2$ to the I/O port, which causes the video controller 56 to generate the video signal. If the inactivity suspend timer expires, then the Supervisor Routine calls the Suspend Routine, which is more fully described in the text accompanying FIG. 10.

In addition, during each APM "get event" the Supervisor Routine reads the power management port. If an OFFH is returned, then the switch 21 was not pressed. On the other hand, if an OFEH is returned, then the switch 21 was pressed and the computer system starts the Suspend Routine, which is more fully described in the text accompanying FIG. 10. If the switch 21 was pressed, or the inactivity suspend timer expires, then the failsafe timer was started and C2 is charging; therefore, to prevent the failsafe timer from turning off the power supply 17, the Suspend Routine will write $XXXXXX11_2$ to the I/O port to reset the timer and then immediately write $XXXXXX01_2$ to the I/O port to resume in the $01_2$ mode. When the system is suspended, the Suspend Routine will write $XXXXXX11_2$ to the I/O port to turn "off" the power supply 17 immediately.

System Software

Having described the hardware aspects of the computer system 10 of the present invention, the code aspects remain to be described.

Figure 8:
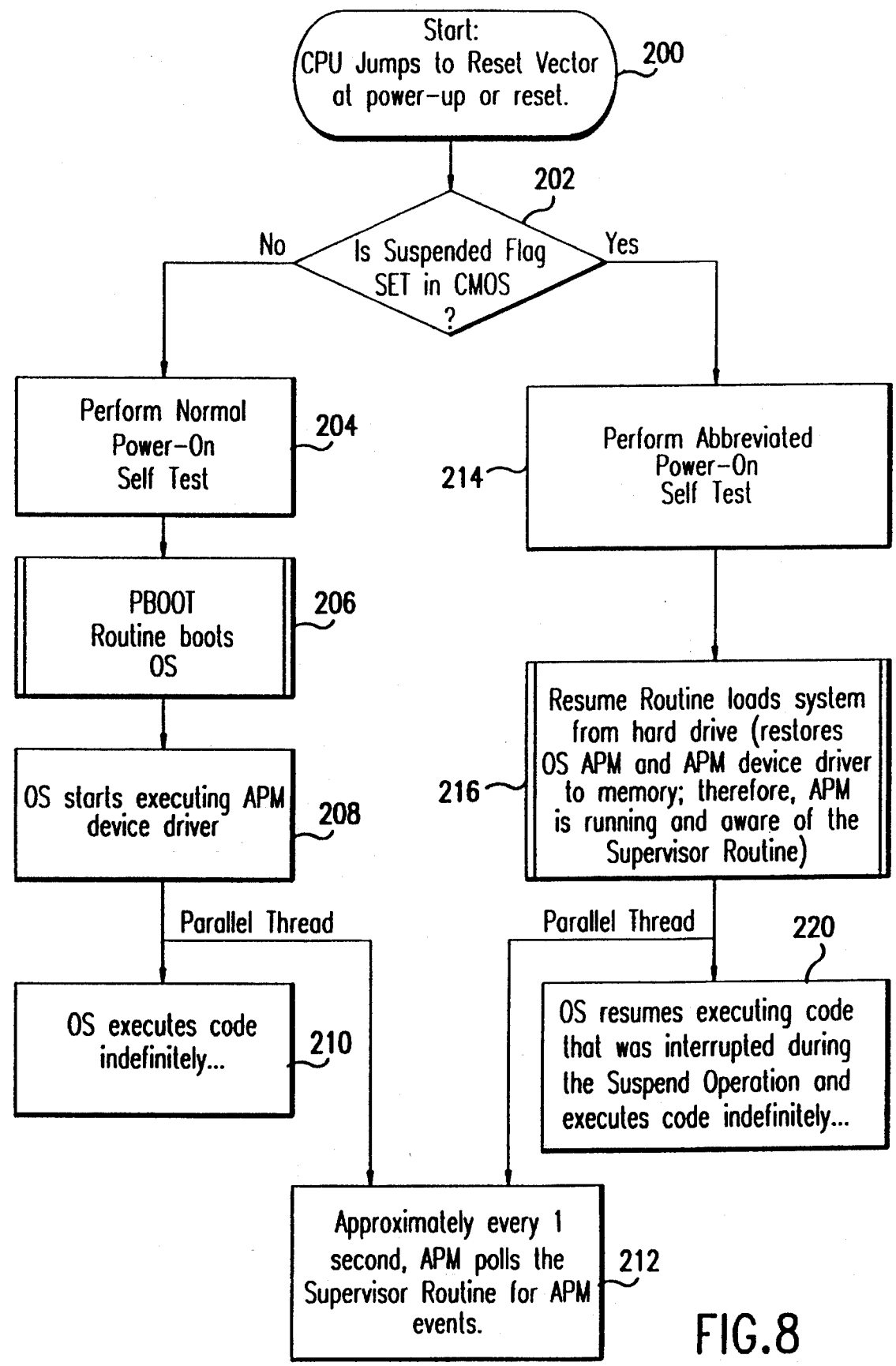
FIG. 8 is a flow chart showing generally the power-up routine of the present invention.

Referring now to FIG. 8, a general overview of the power-up routine is shown. The routine starts at 200 when the CPU jumps to and executes the code pointed to by the Reset Vector. This occurs each time the CPU is powered up and whenever the CPU is reset by either a reset hardware signal or when a RESET instruction is executed by jumping to the code pointed to by the reset vector. Such reset procedures are well known in the art.

In general, the flow of the Power-Up Routine depends on whether the system is in the off state 156 or the suspend state 154. That is, whether the Suspend Flag is cleared or set, respectively, in CMOS NVRAM 96. As shown at 202, the system 10 determines whether it is in the off state 156 or the suspend state 154 by reading a Suspend Flag from the nonvolatile CMOS memory 96. When the system leaves the normal operating state 150 to either the off state 156 or the suspend state 154, each routine either SETs or CLEARs the Suspend Flag in NVRAM 96. If the Suspend Flag is SET in NVRAM 96, then the computer system 10 is in the suspend state 154 and the state of the computer system 10 was stored in the fixed disk storage device 31. On the other hand, if the Suspend Flag is CLEAR in NVRAM 96, then the computer system 10 is in the off state 156 and the state of the computer system 10 was not stored in the fixed disk storage device 31. Thus, if the Suspend Flag is SET in NVRAM 96, then the computer executes a "normal" boot routine, shown at tasks 204–210. The first task is the power-on self-test (POST), as shown at 204, which will be explained more fully in the text accompanying FIG. 11; after returning from the POST, the CPU 40 calls the PBOOT routine to load the operating system, as shown at 206.

The PBOOT routine is a typical routine that runs on IBM PS/2 computers, with slight variations, which will be explained below. PBOOT determines from where to boot (either from the hard drive 31 or from a disk inside the floppy drive 27), loads the operating system, analyses and implements system changes as instructed by the CONFIG.SYS file, and finally executes the AUTOEXEC.BAT batch file before returning control to the operating system. The PBOOT routine is well known in the art. However, unique to the computer system 10 of the present invention, the booting routine communicates with the Advanced Power Management (APM) advanced programming interface (API) built into the operating system. The APM API was developed by Intel and Microsoft, and many operating systems currently implement the APM API: IBM's OS/2, IBM's PC-DOS, Microsoft's MS-DOS, and Microsoft's Windows, for example. The APM BIOS booting routine informs the APM OS of the existence of the Supervisor Routine. The operating system executes code indefinitely, as instructed by the user, as shown at 210. However, the consequence of informing the API of the Supervisor Routine is that the APM BIOS and APM OS cause the Supervisor Routine to execute in "parallel" with the executing programs, as indicated at 212. That is, the system 10 is a time-multiplexed multitasking system and the APM Get Event, and consequently the Supervisor Routine, are executed periodically. The end result is that the Supervisor Routine is executed approximately every second. The Supervisor Routine will be explained fully in the text accompanying FIG. 9. After the normal boot routine 204–210 is finished, the computer system 10 is in the normal operating state 150, as discussed in the text accompanying FIG. 4.

Referring again to task 202, if the Suspend Flag is SET in NVRAM 96, then the system state was saved to the hard drive 31 and the system 10, performs a resume boot routine, shown at tasks 214–220. First, the system, executes an abbreviated POST, as indicated at 214. The abbreviated POST will be explained more fully in the text accompanying FIG. 11. After the abbreviated POST, the system calls the Resume Routine, as shown at 216. The Resume Routine will be detailed in the text accompanying FIG. 12. Suffice it to say that the Resume Routine restores the state of the computer system 10 back to its configuration before the system 10 was suspended. Unlike the normal boot routine, indicated at tasks 204–210, the resume boot routine does not need to inform the APM API of the existence of the Supervisor Routine, because the APM routine must have been running to suspend the system and when the system state is restored, the APM is loaded back into memory. Thus, when the Resume Routine is finished restoring the state of the system 10, the APM is already in place and running in "parallel" with the restored code, as indicated at 212 and 220. After the resume boot routine 214–220 is finished, the computer system 10 is in the normal operating state 150, as discussed in the text accompanying FIG. 4. Thus, after either the normal boot routine 204–210 or the resume boot routine 214–220 are executed, the computer system 10 is in the normal operating state 150.

Figure 9:
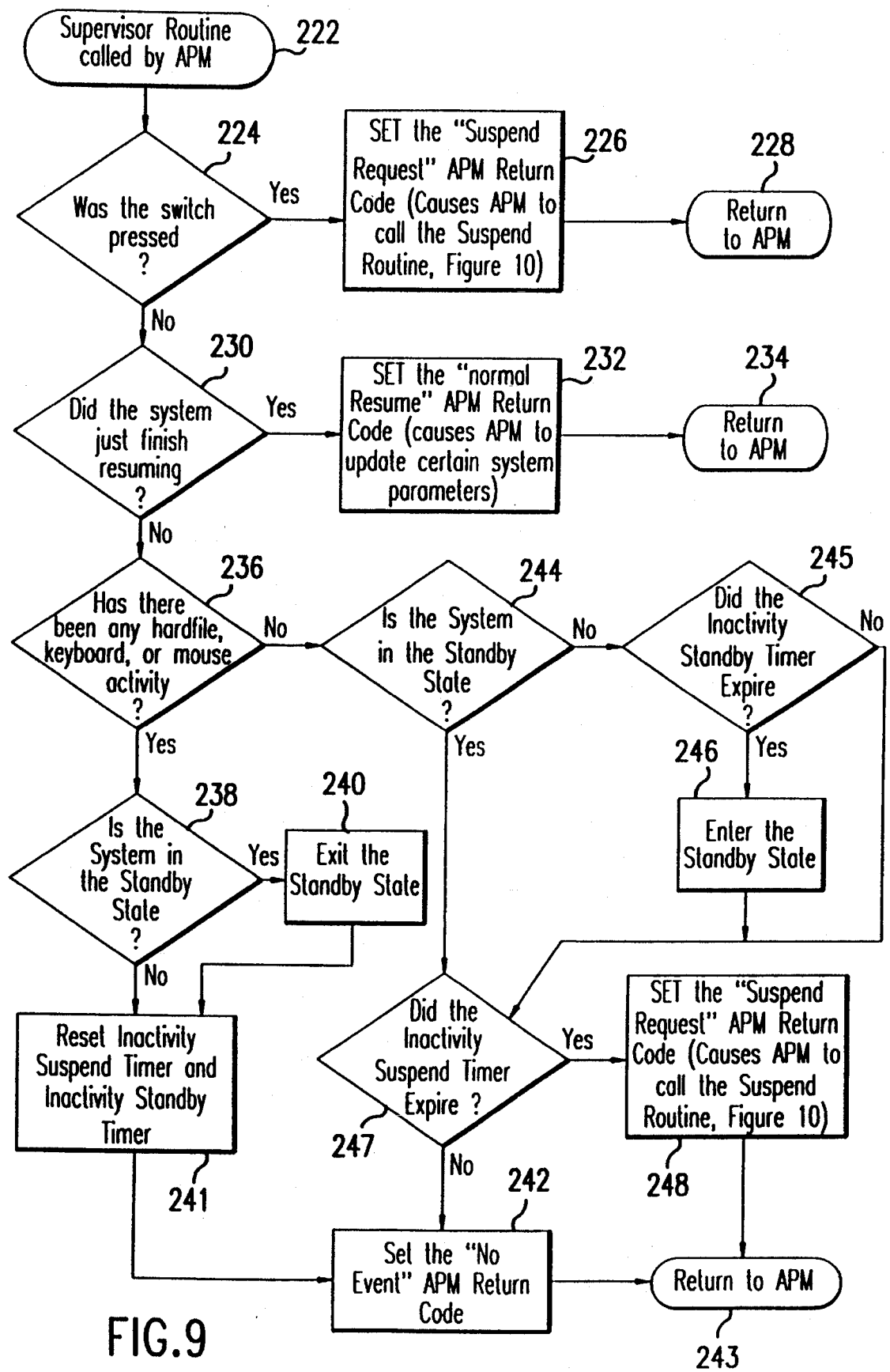
FIG. 9 is a flow chart showing the details of the Supervisor Routine, which is called by the APM approximately every second.
Figure 10A:
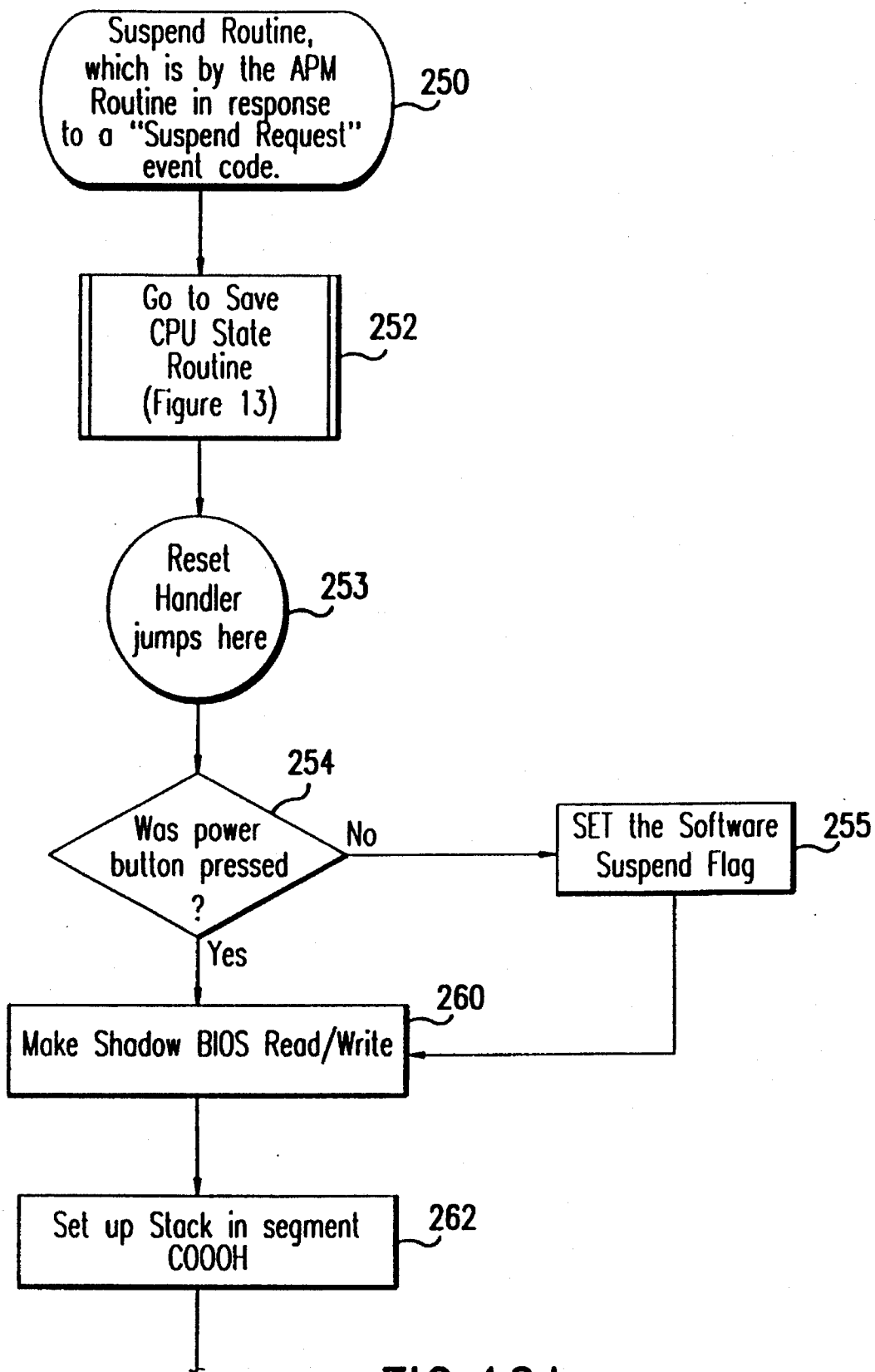
FIG. 10 is a flow chart showing the details of the Suspend Routine of the present invention.
Figure 10B:
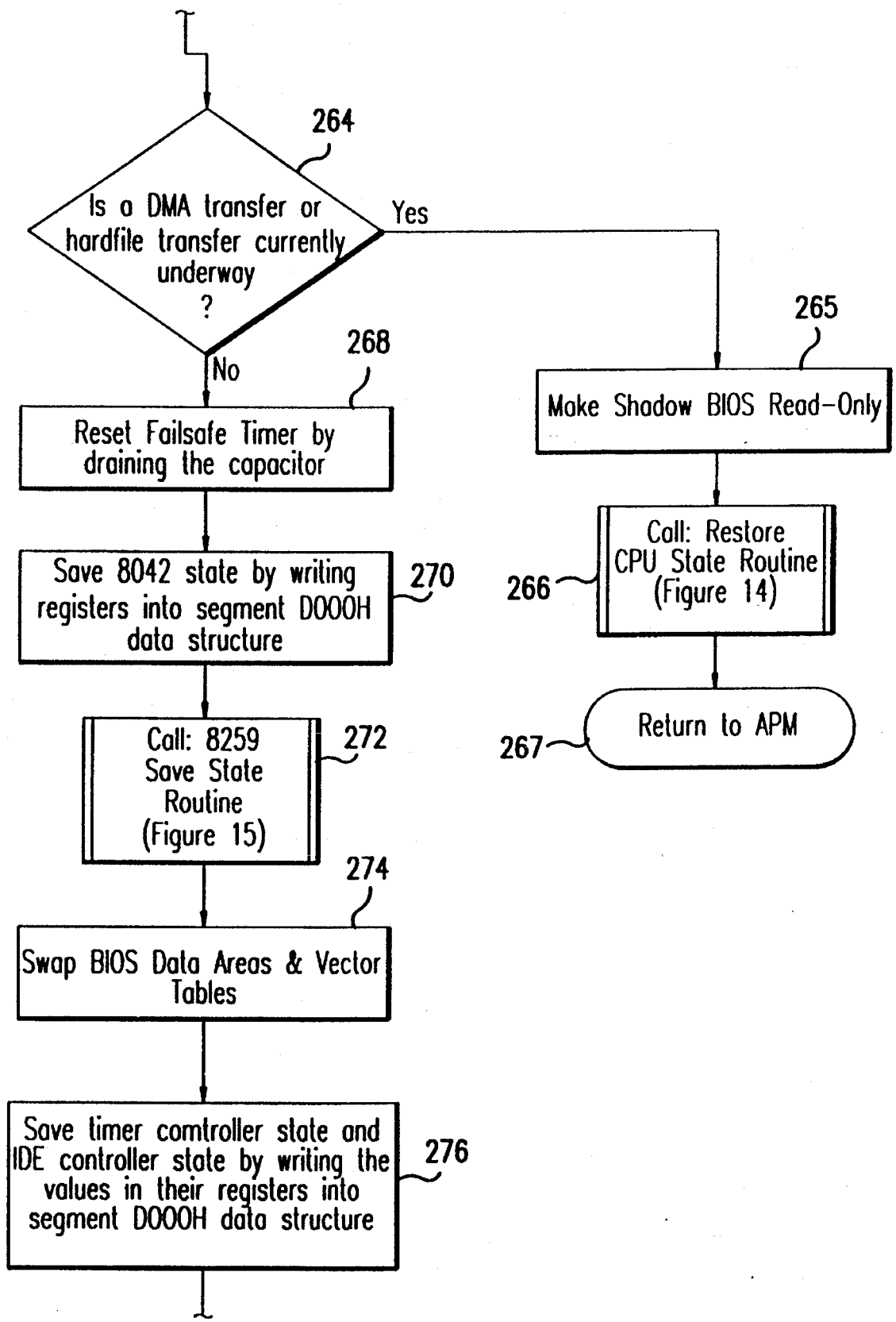
Figure 10C:
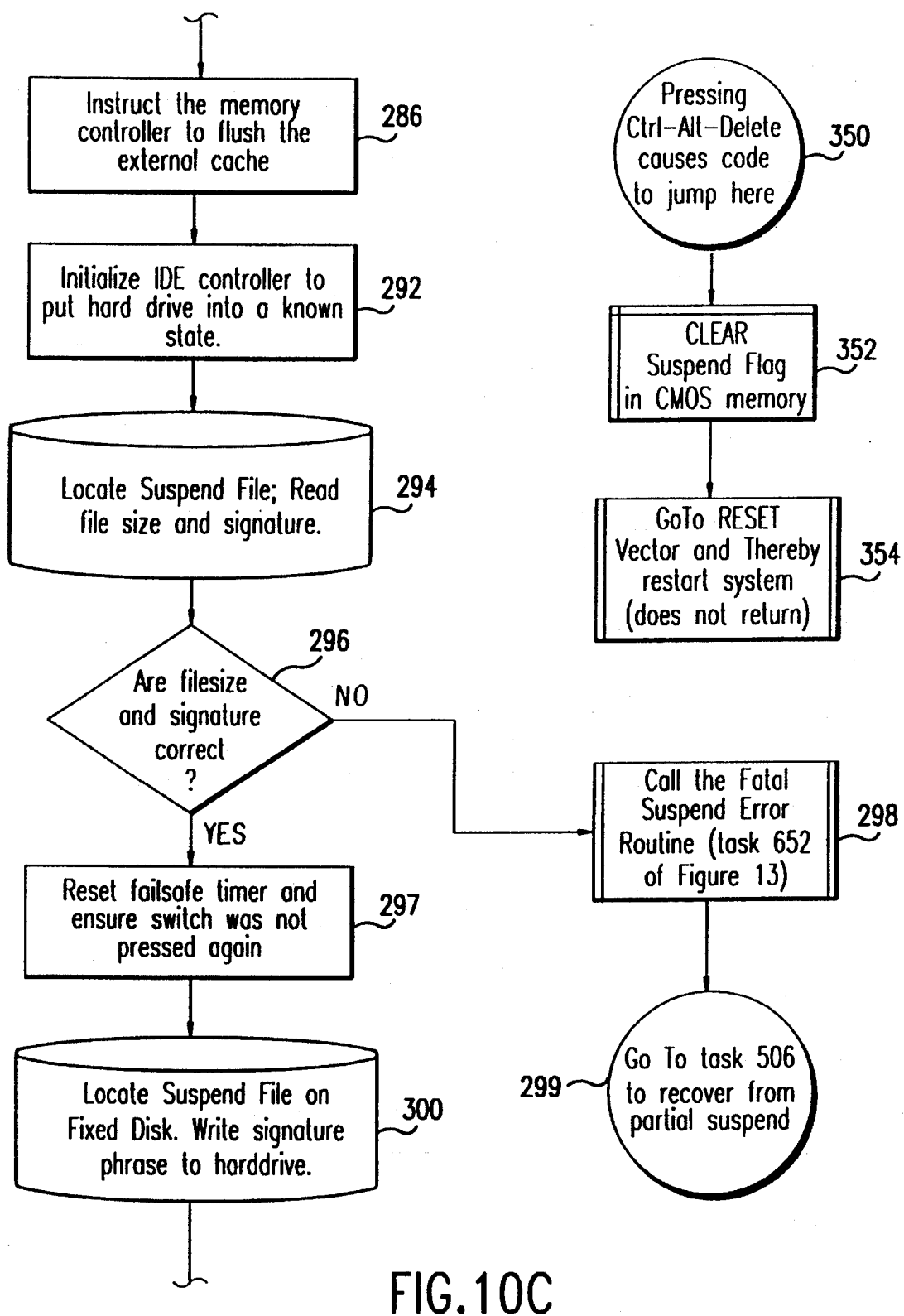
Figure 10D:
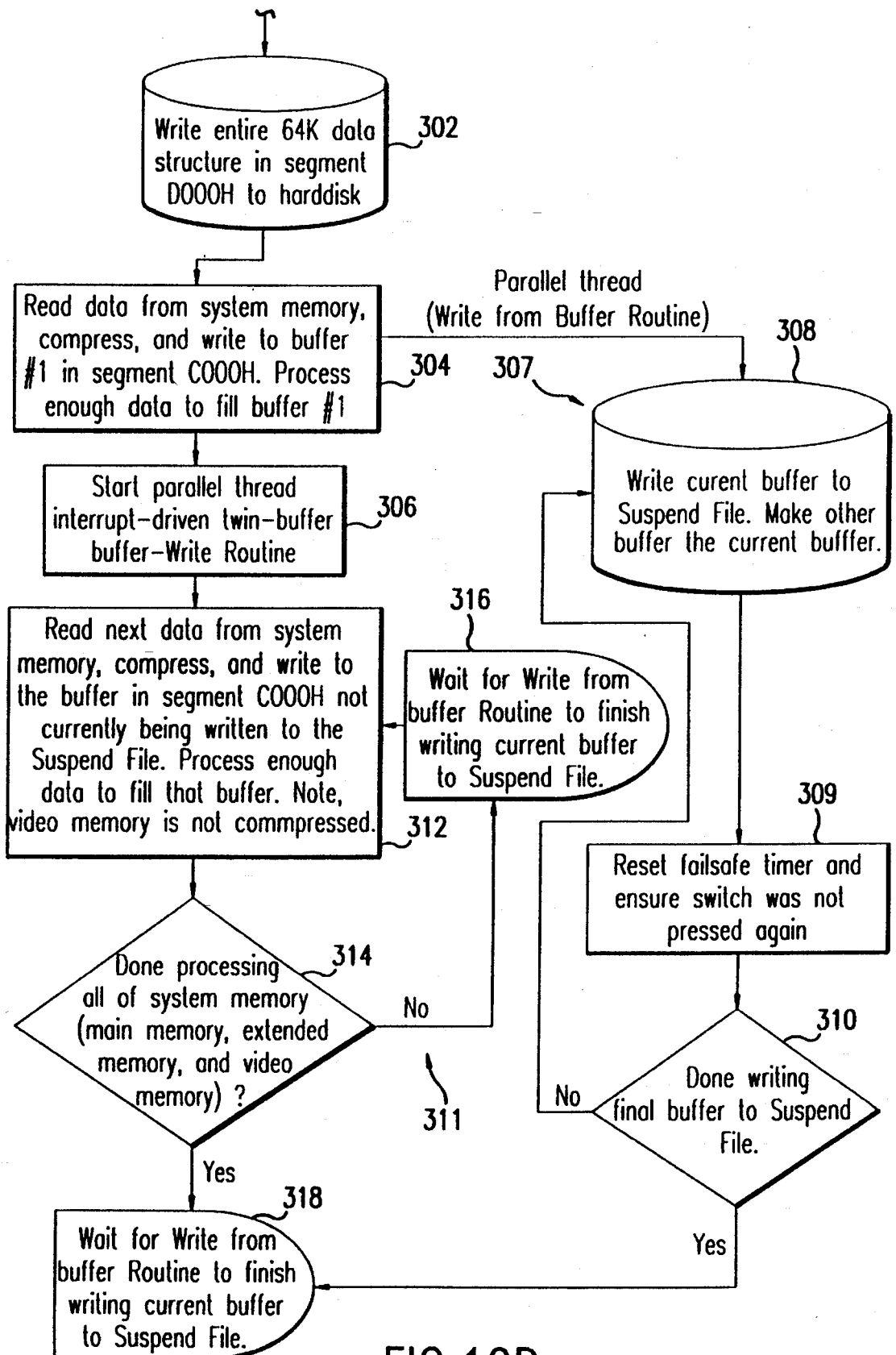
Figure 10E:
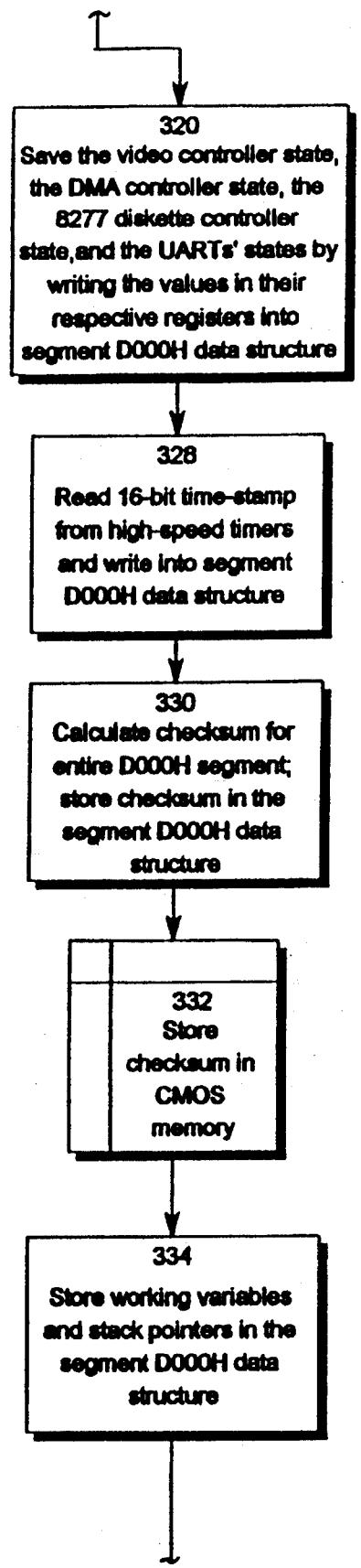
Figure 10F:
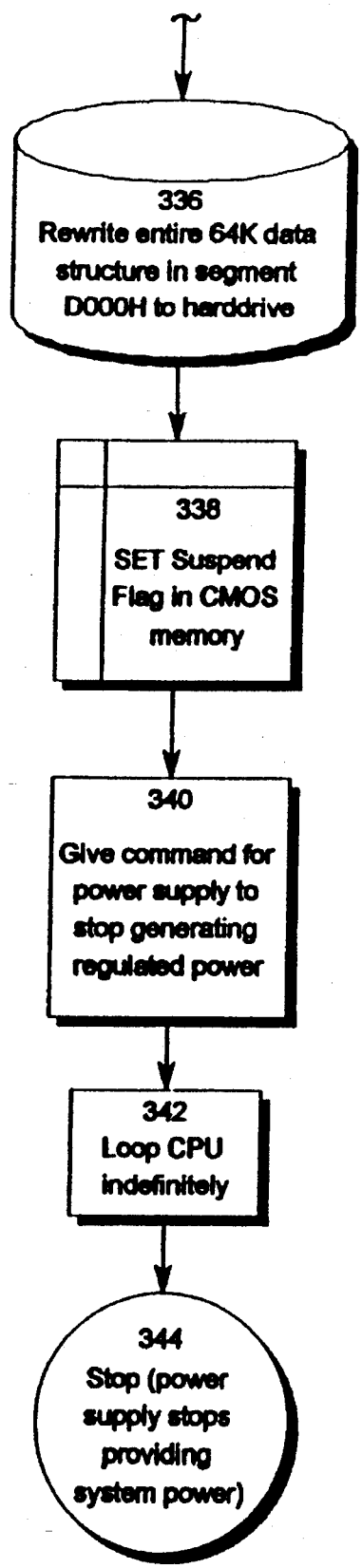

FIG. 9 is a flow chart showing the details of the Supervisor Routine, which is called by the APM approximately every second during a "Get Event." Different operating systems will perform a Get Event at different frequencies.

The Supervisor Routine starts at 222 in FIG. 9. The text below assumes that the computer system 10 starts in the normal operating state 150. The first task is to test whether the user pressed the switch 21, at 224. The switch 21 is tested by reading the power management port byte, as described more fully in the text accompanying FIG. 6 and FIG. 7. When read while the second PAL U2 is in switch state $01_2$, the power management port returns an FFH if the switch 21 was not pressed and returns an FEH if the switch was pressed.

If the test at task 224 indicates that the user pressed the switch 21, then the Supervisor Routine SETs a "Suspend Request" APM Return Code, at 226, and then returns to the APM, at 228. In response to the SET "Suspend Request" APM Return Code, the APM performs any necessary system tasks (such as synching the hard disks) and then issues the "Suspend Command," which causes the APM BIOS Routing Routine to call the Suspend Routine. The Suspend Routine is described in the text accompanying FIG. 10. The Suspend Routine essentially causes the system 10 to leave the normal operating state 150 and enter the suspend state 154 and may return control to the Supervisor Routine after several instructions (if the system is not ready to be suspended) or several minutes, hours, days, weeks, or years later (if the system is suspended and resumed). The Suspend Routine always SETs the "Normal Suspend" APM Return Code, whether the Suspend Routine returns without suspending, or returns after a complete suspend and resume.

More often than not, the switch 21 was not pressed and the Supervisor Routine then moves on to task 230 to check to see if the system just resumed. If the Suspend Routine is called, then the system thinks it has just been resumed, whether the Suspend Routine returns without suspending, or returns after a complete suspend and resume. The resume is tested at 230 and if the system was just resumed (or the suspend was not performed due to DMA of file activity) a "Normal Resume" APM Return Code is set at 232 and returned to the APM at 234. In response, the APM OS driver updates the system clock and other values that may have become stale during the interim.

More often than not, the system 10 was not just resumed and the Supervisor Routine then moves on to task 236 to test for any user activity. Three types of user activity are tested at task 236: hardfile 31 activity, keyboard 12 activity, and mouse 13 activity. Every APM Get Event, the Supervisor Routine reads values for the hardfile head, cylinder, and sector, reads a one-byte value for the mouse 13 last byte sent (which is the vertical position), reads a one-byte value at the keyboard port (which is the last key pressed) and reads the minutes value from the real-time clock 98, which ranges from 0 minutes to 59 minutes then wraps back to minutes at the start of each hour. The five activity variables (head, cylinder, sector, mouse byte, and keyboard byte) and the minutes value are stored temporarily. The five activity variables are then compared to the five activity variables saved from the previous Get Event. If the five current values are the same as the five values from the previous Get Event, then there has been no user activity. If the values are different, then there has been user activity and the current activity variable values are saved for comparison to the values read during the next Get Event.

The above activity-detection scheme is such that a routine executes on the CPU. Alternatively, activity could also be monitored in a hardware fashion. For example, the 16 hardware interrupt lines could be monitored for activity.

If there was activity, then the Supervisor Routine next determines whether the computer system 10 is in the standby state 152 by testing the standby flag, at 238. If the standby flag is SET, indicating that the system 10 is in the standby state 152, then the Supervisor Routine exits the standby state 152 and enters the normal operating state 150, at 240. The Supervisor Routine exits the standby state 152 by powering back up the devices that were powered down when the standby state 152 was entered. In the preferred embodiment this includes: (1) writing a 01H to the power management port, which causes the video controller 56 to start generating the video signal, while leaving the second PAL U2 in the $01_2$ state, (2) writing an appropriate value to the fixed disk controller 86 to cause the hard disk within the hard drive 31 to start spinning, and (3) clearing the standby flag, indicating that the system 10 is in the normal operating state 150.

Additionally, if there was activity, then the minutes value from the real-time clock 98 is also saved for comparison to the minutes value read during subsequent Get Events. Saving the current minutes value effectively resets the inactivity standby timer and the inactivity suspend timer, at 241. During normal use, there will be user activity and the Supervisor Routine SETs the "No Event" APM Return Code at 242 and returns to the APM calling code at 243. The APM does not call any more routines in response to the "No Event" Return Code.

If the test at task 236 indicates that there has been no user activity, then the Supervisor Routine next tests if the inactivity standby timer and inactivity suspend timer have expired, at 245 and 247, respectively. If the system 10 is in the standby state 152, then the inactivity standby timer is not checked for expiration; rather, the test is skipped at task 244.

The two timers are checked for expiration by subtracting the current minutes value from the saved minutes value to obtain a value corresponding to the number of minutes since there was user activity. This value is compared to the inactivity standby timeout value, at 245, and the inactivity suspend timeout value, at 247. The two timeout values are selectable by the user and may be set so that the system never enters the standby state 152, never enters the suspend state 154, or never enters either the standby state 152 or the suspend state 154 because of the expiration of one of the timers. Setting either timeout value to zero (0) indicates that the timer should never expire.

If the number of minutes since the last user activity is equal to or greater than the inactivity standby timeout value, then the Supervisor Routine causes the system 10 to enter the standby state 152, at 246. If inactivity standby timer has not expired, the Supervisor Routine next tests the inactivity suspend timer for expiration, at 247. On the other hand, if the inactivity standby timer has expired, then the Supervisor Routine causes the system 10 to enter the standby state 152 by placing certain components into their respective low-power modes. In the preferred embodiment, that includes: (1) writing a 05H to the power management port, which causes the video controller 56 to stop generating the video signal, while leaving the second PAL U2 in the $01_2$ state, (2) writing an appropriate value to the fixed disk controller 86 to cause the hard drive 31 to enter a low-power mode (the hard disk within the hard drive stops spinning), and (3) setting the standby flag, indicating that the system 10 is in the standby state 152. In short, in the preferred embodiment, the Supervisor Routine blanks the video signal, spins down the hard disk within the hard drive 31, and sets a flag indicating that the system 10 is in the Standby State 152. After causing the system 10 to enter the standby state 152, the Supervisor Routine tests the inactivity suspend timer for expiration, at 247.

The Supervisor Routine tests if the inactivity suspend timer has expired, at 247. If the number of minutes since the last user activity is equal or greater than the inactivity suspend timeout value, then the Supervisor Routine SETs the "Suspend Request" APM Return Code, at 248, and then returns to the APM, at 243. As described above in the text accompanying task 226, in response to the SET "Suspend Request" APM Return Code, the APM performs any necessary system tasks and then calls the Suspend Routine. The Suspend Routine is discussed more fully in the text accompanying FIG. 10 and, in short, causes the system 10 to leave the normal operating state 150 and enter the suspend state 154. As discussed in the text accompanying task 226, the Suspend Routine may return control to the Supervisor Routine with or without suspending the system 10. On the other hand, if the inactivity suspend timer has not expired, then the Supervisor Routine SETs the "No Event" APM Return Code at 242 and returns to the APM calling code at 243.

Although most often a "No Event" APM Return Code will be returned to the APM, various other events may be returned to the APM. However, only one APM Return Code may be specified for each APM Get Event. For example, after entering the standby state 152, a "No Event" is returned to APM. After leaving the suspend state 154, the "Normal Suspend" APM Return Code is returned to the APM. The specific messages queued for APM will depend on the exact nature of the computer system. The Supervisor Routine also returns a "Normal Resume" APM Return Code or a "Suspend Request" APM Return Code.

Figure 15A:
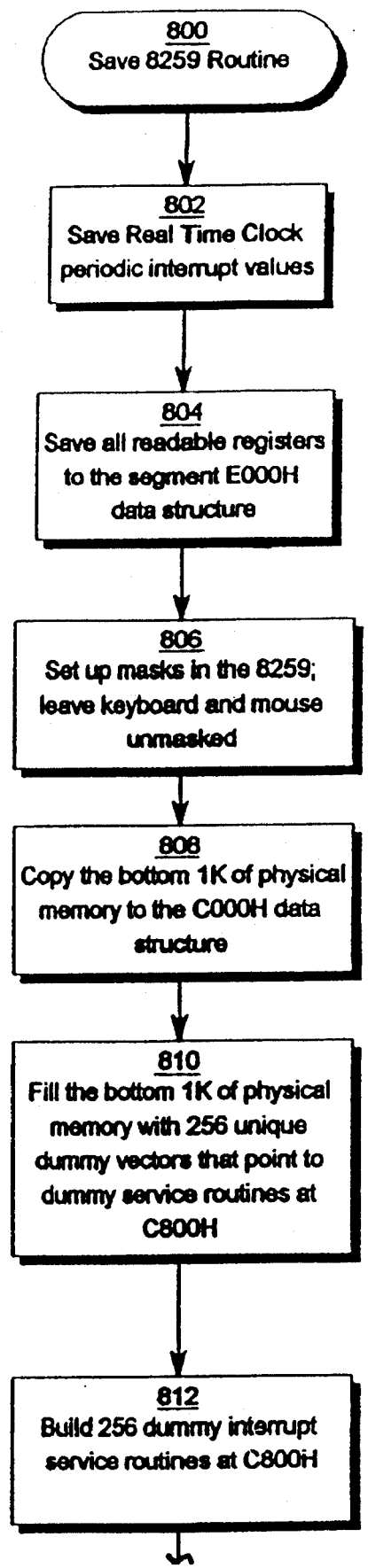
FIG. 15 is a flow chart showing the details of the Save 8959 State Routine of the present invention.
Figure 15B:
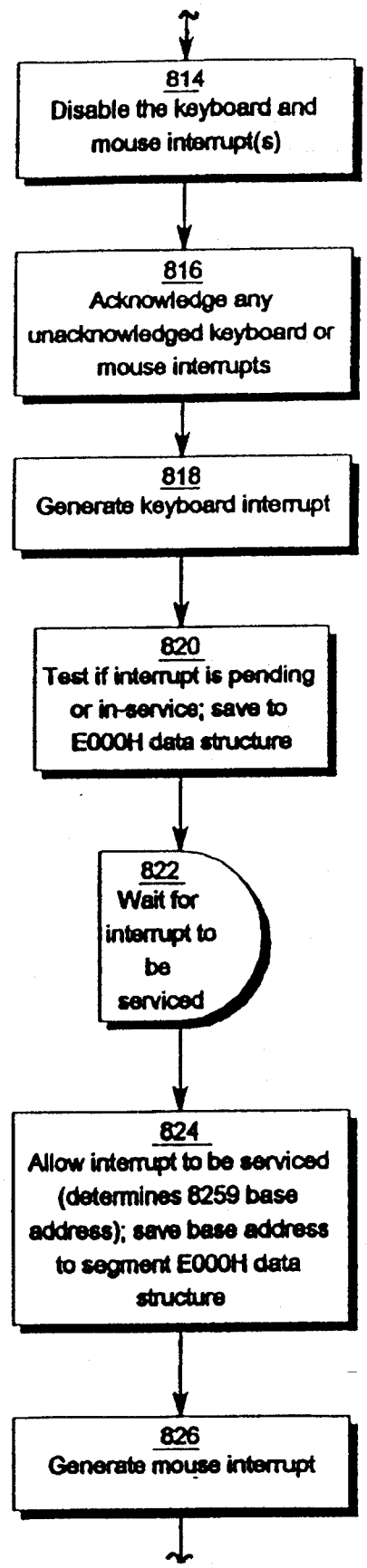
Figure 15C:
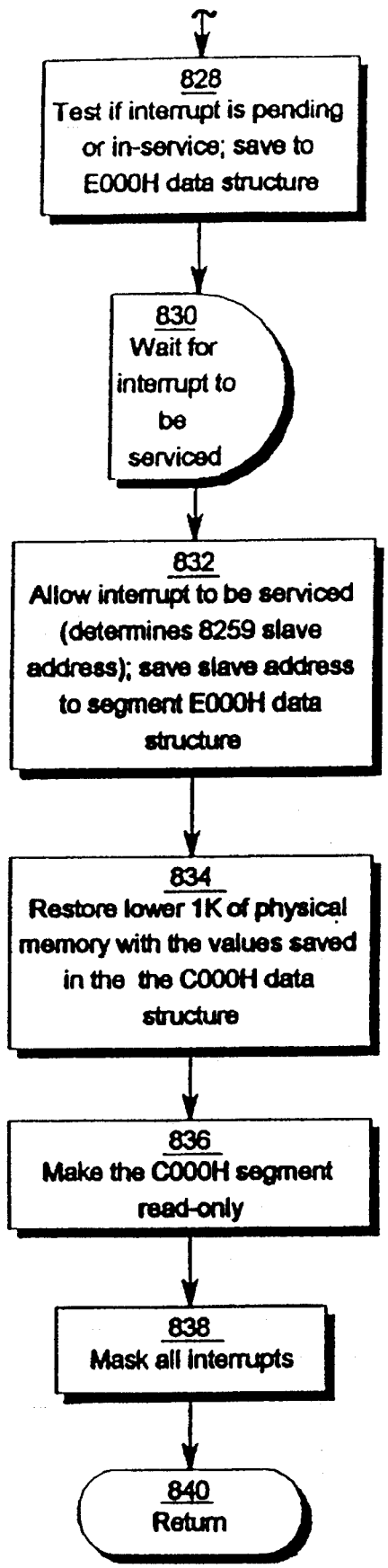

The Power-Up and Resume routines are best understood with a knowledge of the Suspend Routine. Therefore, it is believed that a description of the APM BIOS routines is best examined in the following order: a general overview of the Power-Up routine of the present invention (above in FIG. 8), details of the Supervisor Routine (FIG. 9), details of the Suspend Routine of the present invention (FIG. 10), details of the Power-Up process of the present invention (FIG. 11), details of the Resume Routine of the present invention (FIG. 12), details of the Save CPU State Routine (FIG. 13), details of the Restore CPU State Routine (FIG. 14), and details of the Save 8259 State Routine (FIG. 15).

It is believed that although any discussion of the computer system 10 of the present invention is somewhat circular because most of the routines interract with the others and the suspend/resume process is a continuing cycle, a discussion of the Suspend Routine (FIG. 10) before the Boot Routine (FIG. 11) or the Resume Routine (FIG. 12) will be most helpful. Referring now to FIG. 10, a flow chart of the Suspend Routine is shown. Recall that after either the normal boot routine 204–210 or the resume boot routine 214–220 are executed, the computer system 10 is in the normal operating state 150. Moreover, as mentioned above in the text accompanying FIG. 8, whether the computer system was either normally booted 204–210 or resume-booted 214–220, after either routine finishes, the APM OS driver is aware of the APM BIOS routines, such as the Supervisor Routine, shown in FIG. 8. As a result, the APM polls the Supervisor Routine approximately every one second.

The Suspend Routine is shown in FIG. 10 and commences at 250. The Suspend Routine is called by the APM in response to the Supervisor Routine returning to the APM a "Suspend Request" APM Return Code. First, the Save CPU State Routine is called, as shown at 252. The Save CPU State Routine will be detailed in the text accompanying FIG. 13. Suffice it to say for now that no matter what mode the CPU 40 is in when the Suspend Routine is originally called, the remainder of the Suspend Routine will be executed with the CPU 40 in Real Mode and, therefore, may be executed without fear of generating any errors that might be caused by attempting to execute an instruction outside the allowed address-space or by attempting to execute a privileged instruction.

The Save CPU State Routine returns program control to the Suspend Routine, at 253, in a unique manner. The "Return" from the Save CPU State Routine to the Suspend Routine involves resetting the CPU and is explained in more detail in the text accompanying tasks 630 and 632 of FIG. 13, below. The important detail with respect to the Suspend Routine is that the CPU registers have been written to the segment E000H data structure and the CPU 40 is now in Real Mode.

The Suspend Routine next ascertains whether the switch 21 was pressed at 254. The switch 21 closure is tested as described in the text accompanying FIGS. 6 and 7. In short, if the switch 21 was pressed, then the power management port will return an FEH when read. If not, it will return an FF when read. If the switch was not pressed, then the suspend underway is a software-suspend and the Software Suspend Flag is SET in CMOS NVRAM 96. This ensures that a software suspend is not confused with a hardware suspend initiated by a switch closure. If the suspend is a software suspend, the next switch closure causes the suspend to become a hardware suspend. The next switch closure after converting the software suspend to a hardware suspend aborts the suspend.

Next, the BIOS ROM 88 is unshadowed, as shown at 260. The BIOS ROM is unshadowed by first turning off ISA access to segments C000H and D000H. Then the BIOS Vector is changed from pointing to segments C000H and D000H to pointing back to the ROM 88. The next task is to set up a stack in segment C000H, indicated at 262.

After the stack is set up the Suspend Routine, at 264, examines the DMA controller 72, the diskette adapter 84, and the IDE disk controller 86 to see if any DMA transfers, floppy drive transfers, or hardfile transfers, respectively, are currently underway. If so, the suspend cannot be done because characteristics peculiar to these three types of transfers prevent a satisfactory suspend from being performed. For example, if a hardfile transfer from the hard drive 31 is underway, the data has already been read by the IDE controller, but has not yet been transferred to the system memory 53. This data cannot be adequately accessed by the CPU and, therefore, this data would be lost if the system was suspended in the middle of a hard file read. Thus, if any of these three types of transfers are underway, the suspend is postponed until the next APM Get Event, when the DMA and diskette controllers are tested for activity once more.

Consequently, the tasks performed at 252, 260, and 262 must be reversed so control can be passed back to the APM. First, the BIOS is changed from read/write to read-only, as shown at 265. That is accomplished by closing segments C000H and D000H, which still contain the shadowed data. Then the ISA access to these two segments is turned back on. The stack that was created in task 262 is popped and restored. Finally, the CPU state is restored by the Restore CPU State Routine, at 266, before control is passed back to the APM at 267. The Suspend Routine will be polled again by the APM in approximately another second during the next Get Event. By that time, the transfer(s) that prevented the suspend process will probably be complete, allowing the suspend to continue.

Returning now to task 264, if no DMA transfers, floppy drive transfers, or hardfile transfers are currently underway, then a suspend may be performed. The Suspend Routine continues at 268. Recall that the Failsafe Timer is enabled when the power button 21 is pressed. Therefore, a first task is to reset the Failsafe Timer, described in the text accompanying FIG. 6, as shown at 268. The Failsafe Timer is reset by writing a $0X11_2$ to the power management port, as more fully explained in the text accompanying FIGS. 6 and 7. This causes pin 19 of the second PAL U2 (in FIG. 6) to drain any voltage that has risen in C2 through R4, thereby preventing an accumulated voltage of approximately 2.7 VDC at C2 from causing Q1 to conduct. Recall that if Q1 conducts, pulling pin 11 of the second PAL U2 to a logical ZERO, the circuitry within the second PAL U2 will cause pin 12 of the second PAL U2 to output a logical ONE, causing the power supply 17 to stop providing regulated power to the computer system 10, as explained more fully in the text accompanying FIGS. 6 and 7. Thus, C2 must be drained by the Suspend Routine at least approximately every 10 seconds to prevent the power from being removed in mid-suspend.

Next, the state of the 8042 coprocessor 104 is saved, at 270. The 8042 coprocessor 104 registers are well known in the art. The registers are directly readable by the CPU 40 and their values are written directly into the data structure in D000H.

Next, the state of the 8259 interrupt controller 92 is saved, at 272. The Suspend Routine calls the 8259 Save State Routine, which will be detailed in the text accompanying FIG. 15. Suffice it to say for now that the 8259 Save State Routine ascertains the contents of the unknown registers of the two 8259 interrupt controllers 92, even though some of the registers are write-only. The register values are written directly to the data structure in D000H.

After the state of the interrupt controller 92 is saved, the configuration of the interrupt controller 92 must be changed to a known state to allow proper functioning of the various interrupt-driven tasks executed by the Suspend Routine. Therefore, the BIOS Data Areas & Vector Tables are swapped, at 274. The Suspend Routine copies the contents of the present-state BIOS Data Area and Vector Table in segment 0000H to a location in segment D000H. Next, the contents of the known-state BIOS Data Area and Vector Table are copied from the data structure in segment D000H to the location in segment 0000H. The known-state BIOS Data Area and Vector Table is copied to segment D000H in task 414 of the Boot-Up Routine, shown in FIG. 11, which is discussed below. Finally the present-state BIOS Data Area and Vector Table are copied from segment 0000H to the data structure in segment D000H. When the routine at 274 is finished, all the interrupts, such as interrupt 13H (disk read/write) and interrupt 10H (video access), will function as expected.

Next, the state of the timers $10_2$ are saved, at 276. The timers' registers are well known in the art. All of the registers are directly readable by the CPU 40 and their values are written directly into the data structure in D000H. The state of the IDE disk controller 86 is also saved at 276. The IDE disk controller 86 registers are well known in the art. All of the registers are directly readable by the CPU 40 and their values are written directly into the data structure in D000H.

The next step is to prepare the system memory to be written to the Suspend File on the hard drive 31. The system memory comprises system RAM 53 (which includes both main memory and any extended memory) and the video memory 58. At this time, parts of the RAM 53 may be in the external cache 60. The CPU cache was flushed at task 628, which is discussed below in the text accompanying FIG. 13. Thus, the external cache must be flushed before the RAM 53 can be written to the hard drive 31. Therefore, system cache 60 is flushed, at 86. After the flushing is complete, the RAM 53 is whole, with no memory data remaining in either the CPU cache 41 or the system cache 60.

The code executing on the system 10 may have put the IDE controller 86 into an unknown state. Consequently, the next step is to initialize the IDE controller 86 to a known state, at 292. This is accomplished by writing values directly to the registers within the IDE controller 86.

Next, the Suspend File must be located on the fixed disk within the hard drive 31, at 294. The head, sector, and cylinder of the Suspend File is stored in CMOS memory 96. Once the Suspend File is located, the file size and signature are read. In the preferred embodiment, the signature is an ASCII code of arbitrary length that indicates the presence of the Suspend File. Other alternative implementations of the signature are possible, such as using binary strings with very low probability of being found randomly on a hard file system.

Having read the filesize and signature for the Suspend File, the next step is to ensure that the signature and filesize are correct, at 296. If either the signature is incorrect, indicating that another program may have modified the Suspend File, or the filesize is not correct, indicating that the Suspend File size was modified, then the Suspend Routine calls the Fatal Suspend Error Routine, which starts at task 652 of FIG. 13, at 298. If the user presses the switch 17, to exit the Fatal Suspend Error Routine, program control jumps from task 299 to task 506.

On the other hand, if the signature is correct and the Suspend File is large enough, then the Suspend Routine may proceed writing the state of the computer system to memory.

Before writing the state of the computer system 10 to the hard drive 31, the failsafe timer C2 is reset and the switch is tested to detect if the switch 21 was pressed again, at 297. As explained more fully in the text accompanying FIGS. 6 and 7, if a read to the power management port returns a FEH, then the switch 21 was not pressed again and the suspend should continue. On the other hand, if a read to the power management port returns a FFH, then the switch 21 was pressed again and the suspend is aborted. C2 is drained and the switch 21 is tested for closure at several points in the Suspend Routine. Task 297 is merely illustrative; a circuit designer of ordinary skill in the applicable art will be able to determine the number of and time between C2 drainings. The Suspend Routine should ensure that C2 is drained, thereby resetting the failsafe timer, before C2 causes the power supply 17 to be turned "off." Likewise, the switch 21 should be checked occasionally. If the switch 21 was pressed again, indicating that the user desires to abort the suspend, then the code should jump to an appropriate point in the Resume Routine to un-suspend what was suspended already by the Suspend Routine.

Similarly, a Ctrl-Alt-Del aborts the suspend, at 350. Pressing Ctrl-Alt-Delete (pressing the Control key, the Alt key, and the Delete key simultaneously) is a well known method of resetting typical computer systems based on the IBM BIOS and Intel 80X86 family of CPUs. The computer system 10 handles a Ctrl-Alt-Del with a BIOS Interrupt 1 handler, as is well known in the art. The computer system 10 has a slightly modified Interrupt 1 handler, at 350, which clears the Suspend Flag in CMOS memory 96, at 352, and jumps to the Boot-Up Routine on reset, at 354.

In the computer system 10 of the present invention, pressing Ctrl-Alt-Del while the Suspend Routine executes causes the computer system to enter the off state 156. This happens because the second PAL U2 is in switch state $10_2$ after the switch 21 closure, pressing Ctrl-Alt-Del causes the Boot-Up Routine to be called, and the Boot-Up Routine writes a 00H to the power management port to place the second PAL U2 into a known state. However, writing a 00H to the second PAL U2 while the second PAL U2 is in switch state $10_2$ causes the second PAL U2 to cause the power supply 17 to stop providing system power, as explained in the text accompanying FIGS. 6 and 7. Thus, pressing Ctrl-Alt-Del while in the Suspend Routine causes the computer system 10 to enter the off state 156.

Referring now to task 300, the Suspend File is again located on the hard drive 31; the signature phrase is written to the first bytes of the Suspend File, at 300. Next, the entire 64 kilobytes of data in segment D000H is written to the Suspend File, at 302. This 64K copy of D000H is really just a place holder and will be rewritten to this same location at the end of the Suspend Routine.

Next, the system memory is written to the Suspend File. This is accomplished by a twin-buffer system that reads data from system memory, compresses and writes it to segment C000H, and finally writes the compressed data from segment C000H to the Suspend File. Two routines work in a time-multiplexed arrangement: one compresses the data and writes to segment C000H, the other writes to the Suspend File. The former is running in the foreground, the latter is an interrupt-driven routine that runs in the background. Obviously, since there is only one CPU 40, only one routine can execute at a given time; however, because the latter routine is interrupt-driven, it can interrupt the execution of the former routine as needed to optimize the speed of transfer of the data to the Suspend File. Each of the two buffers is 8 kilobytes long, which is believed to optimize transfer time to the hard drive 31.

This process starts at 304 with the reading, compression, and writing to segment C000H of enough data to fill the first of the 8K buffers. The data is compressed using the run length encoding method; however, any suitable compression method may be used. At this time, the Write from Buffer Routine, which is generally indicated at 307, is started, at 306. The Write from Buffer Routine 307 is an interrupt-driven routine that runs in the background and is comprised of tasks 308–310. The Compression Routine, generally indicated at 311, comprises tasks 312–318 and is the foreground routine. First, the Write from Buffer Routine 307 writes the buffer just filled by task 304 to the Suspend File, at 308. While the Write from Buffer Routine 307 writes the contents of that buffer to the Suspend File, the Compression Routine 311 continues reading the next bytes from system memory, compressing them, and writing the compressed data to the other of the two 8K buffers, at 312. Once the Compression Routine 311 has filled the buffer with compressed data, the next step is to determine if the entire system memory has been compressed yet, at 314.

The IDE controller 86 cannot write data to the hard drive 31 very quickly. As a consequence, the Compression Routine 311 will always finish filling the 8K buffer not being written to the hard drive 31 before the Write from Buffer Routine 307 finishes writing the buffer to the hard drive 31. Therefore, the Compression Routine 311 must wait for the Write from Buffer Routine 307 to finish writing the buffer to the hard drive 31. If the Compression Routine 311 has not finished compressing and writing all of system memory, then the Compression Routine 311 waits for the Write from Buffer Routine 307, at 316. The Compression Routine 311 and the Write from Buffer Routine 307 communicate via a set of flags. When the Write to Buffer Routine 307 finishes writing the current buffer to the Suspend File, the Routine 307 next switches the buffer flags, indicating to the Compression Routine 311 that it may start filling with compressed data the buffer that was just written to the Suspend File. Next, the failsafe timer C2 is reset and the switch 21 is checked for a closure event, at 309, in the manner explained in the text accompanying task 297.

The Write to Buffer Routine 307 then decides if the buffer just written to the Suspend File is the last buffer to be written, at 310. If not, the Write from Buffer Routine writes to the Suspend File the buffer that was just filled by the Compression Routine 311. In the mean time, the Compression Routine 311, by examining the buffer flags, determined that a buffer is ready for more compressed system memory. That is, the Compression Routine waits at 316 until the Write from Buffer Routine finishes with the current buffer, at which time the compression loop continues at 312. Note, the video memory 58 is not compressed. Rather, the video memory 58 is read through the video controller 56 using VESA calls and is written without compression using the twin-buffer system, explained in more detail above.

Once the Compression Routine 311 is finished compressing all the system memory, it waits at 318 for the Write from Buffer Routine 307 to finish writing the last buffer to the Suspend File. Once the Write from Buffer Routine 307 is finished, it branches from 310 to 318 and ceases to exist. At this time, no background routines are executing and the main program continues at 320.

Next, the state of the video controller 56 is saved, at 320. The video controller 56 registers are well known in the art.

All of the registers are directly readable by the CPU 40 and their values are written directly into the data structure in D000H. Also in task 320, the state of the DMA unit 71 (DMA controller 72 and Central Arbiter 82), the 8277 diskette controller 84, and the RS-232 UARTs 94 are saved. These devices have registers that are well known in the art. All of the registers within the diskette controller 84 and the UARTs 94 are directly readable by the CPU 40 and their values are written directly into the data structure in D000H. The DMA unit does not have readable registers. Rather, the write-only registers are normally set up before each DMA transfer. For this reason, the Suspend Routine stops a suspend if a DMA transfer is underway.

It is believed to be desirable to be able to detect any tampering with the Suspend File once the computer system 10 enters the suspend state 150. For example, it may be possible for someone to generate a modified Suspend File, move that Suspend File to the hard drive 31, and attempt to have the computer system 10 restore into a different state than the one saved. To this end, a pseudo-random value is placed in the segment D000H data structure. As shown at 328, a 16-bit time-stamp is read from one of the high-speed timers 102. This time-stamp is then written to the segment D000H data structure.

Next, a 16-bit checksum for the entire D000H segment is calculated by adding each 16-bit word in D000H together without ever considering the carry bit. This checksum is written to the segment D000H data segment, at 330, and is written to the CMOS NVRAM 96, at 332. After which, all the working variables are written from the CPU 40 to the segment D000H data structure, at 334, and the entire segment D000H is rewritten to the Suspend File, starting after the signature phrase of the Suspend File (directly after the signature), at 336. Next, the Suspend Flag is SET in the CMOS NVRAM 96, at 338, informing the system 10 that the state of the computer system was saved to the Suspend File.

Finally, the CPU 40 turns "off" the power supply by writing X10$_2$ to the power management port, causing the second PAL U2 to enter the 10$_2$ state. Entering the second PAL U2 10$_2$ state turns "off" the power supply 17 immediately by causing the pin 12 output of the second PAL U2 to assert a logical ONE, causing the output pin 3 of the SR latch to latch into a logical ZERO state, allowing $\overline{ON}$ to be pulled HIGH by R6, causing the primary/regulation unit 172 of the power supply 17 to stop providing regulated voltages along the ±5 and ±12 lines. The voltages take several seconds to ramp down to approximately zero, giving the CPU 40 time to execute numerous commands. Therefore, the CPU 40 executes an endless loop (a "spin"), at 342, as it waits for the system power voltages generated by the power supply 17 to decline until the CPU 40 stops functioning.

Figure 11A:
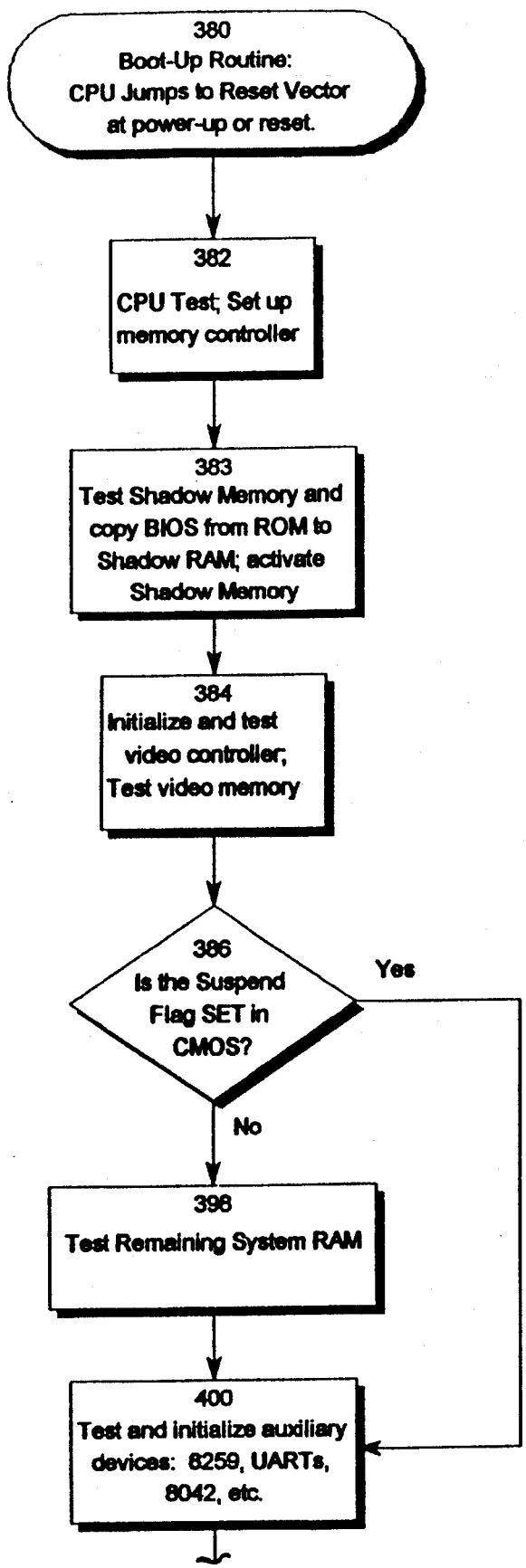
FIG. 11 is a flow chart showing the details of the Boot-Up Routine of the present invention.
Figure 11B:
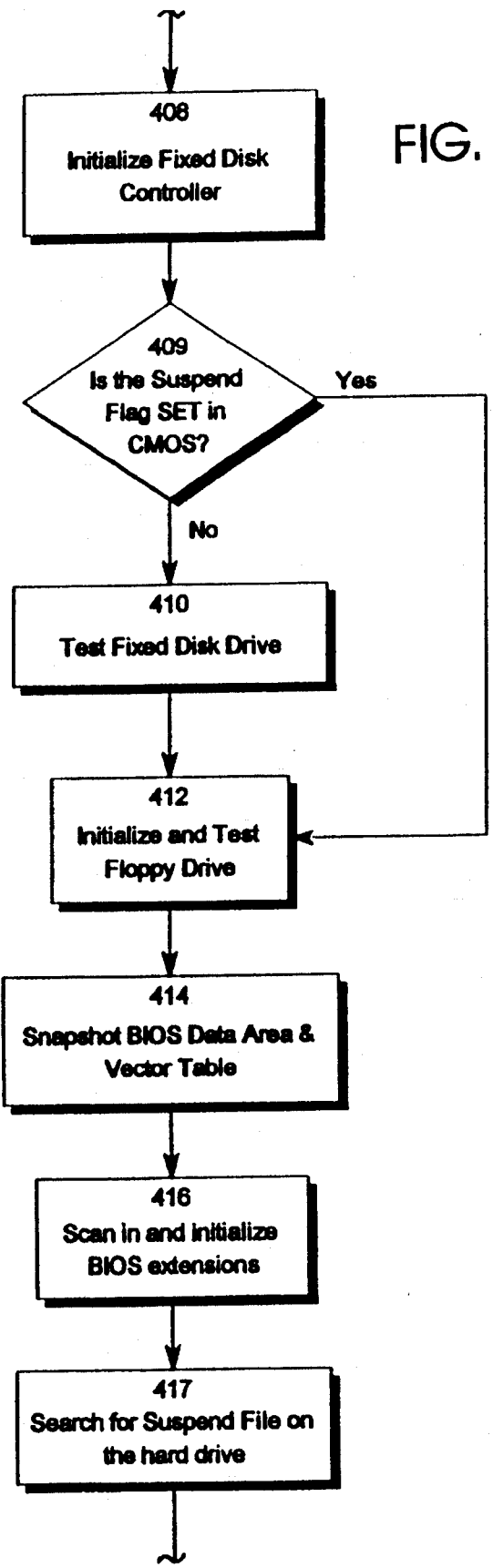
Figure 11C:
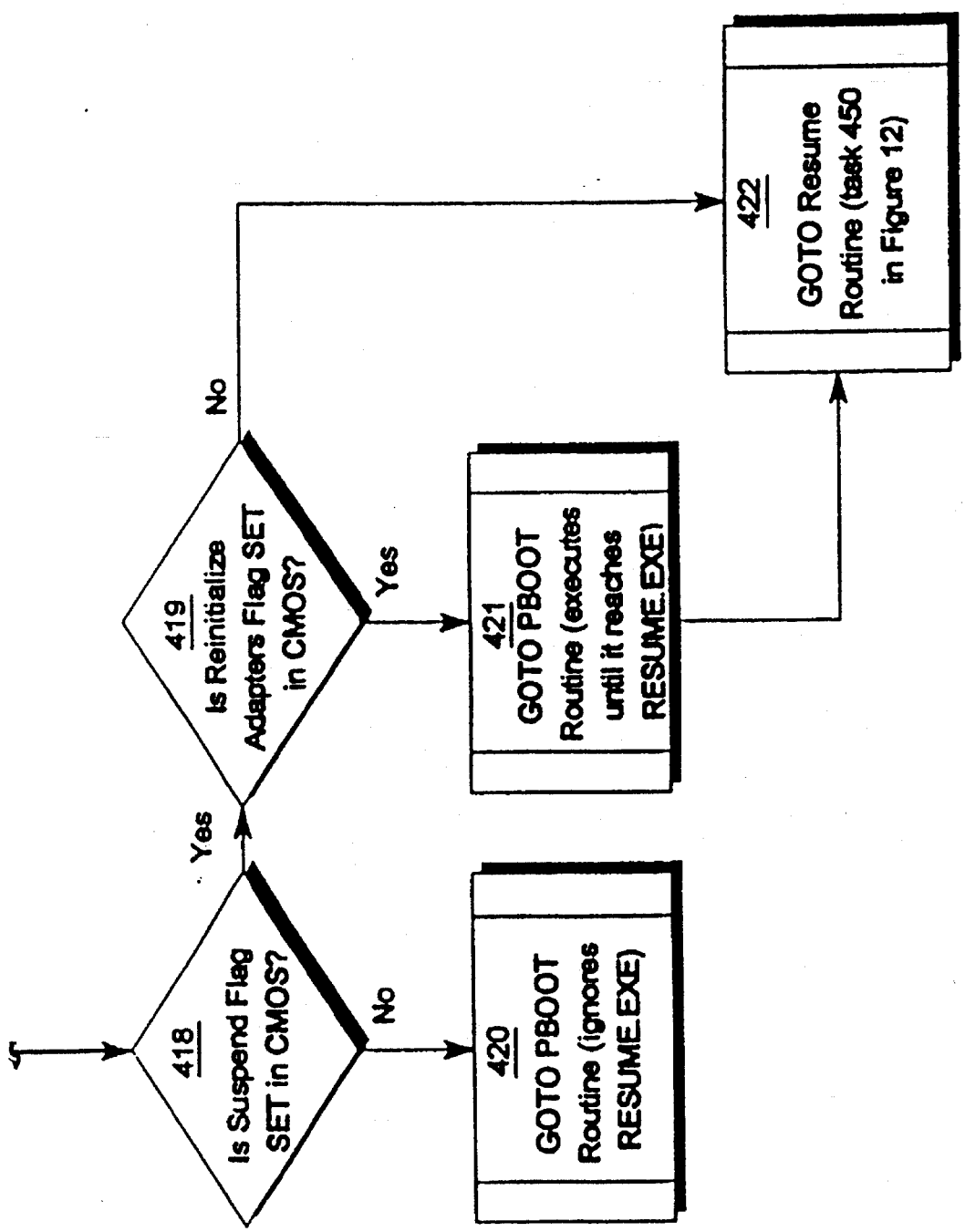
Figure 12A:
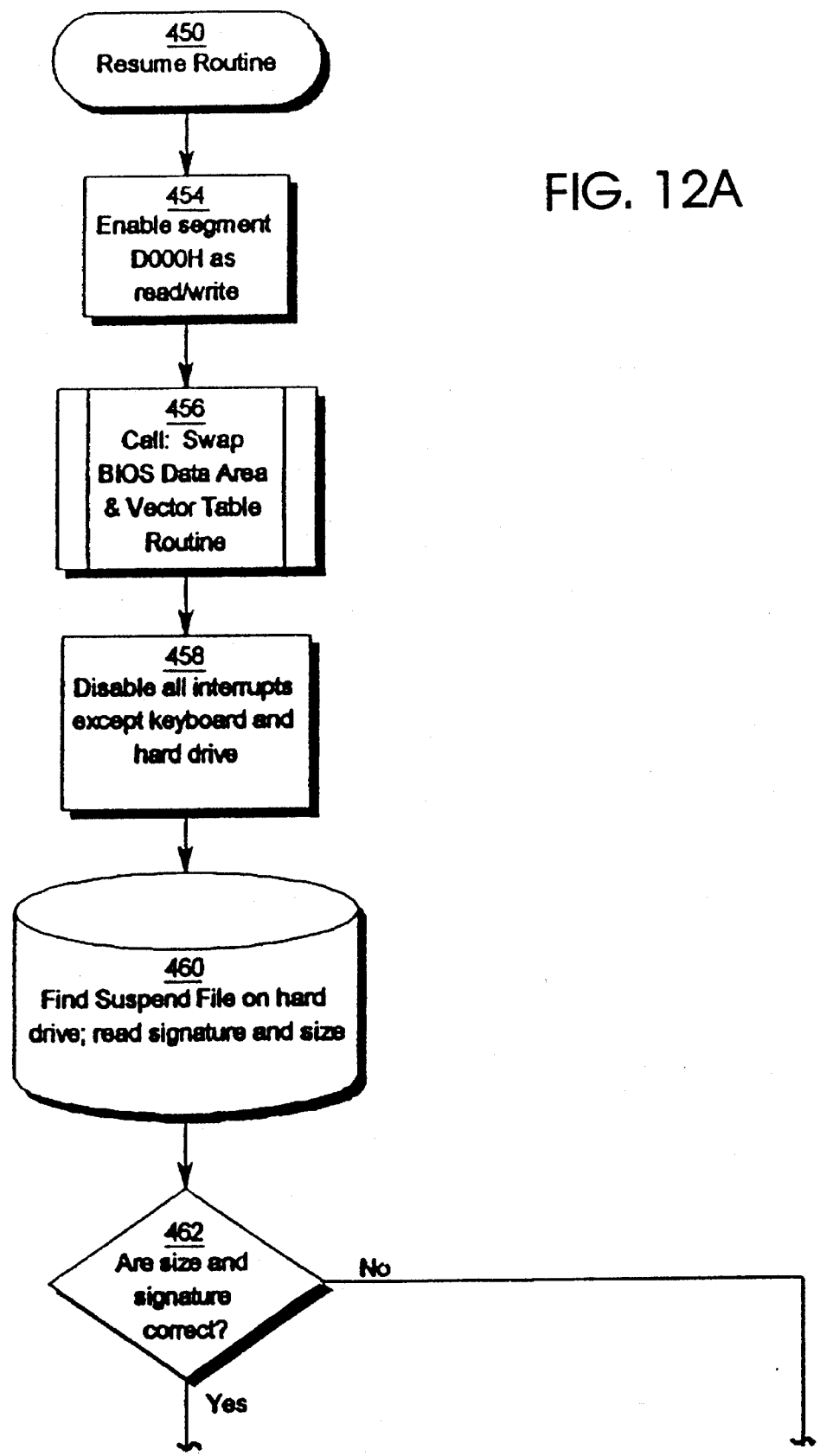
FIG. 12 is a flow chart showing the details of the Resume Routine of the present invention.
Figure 12B:
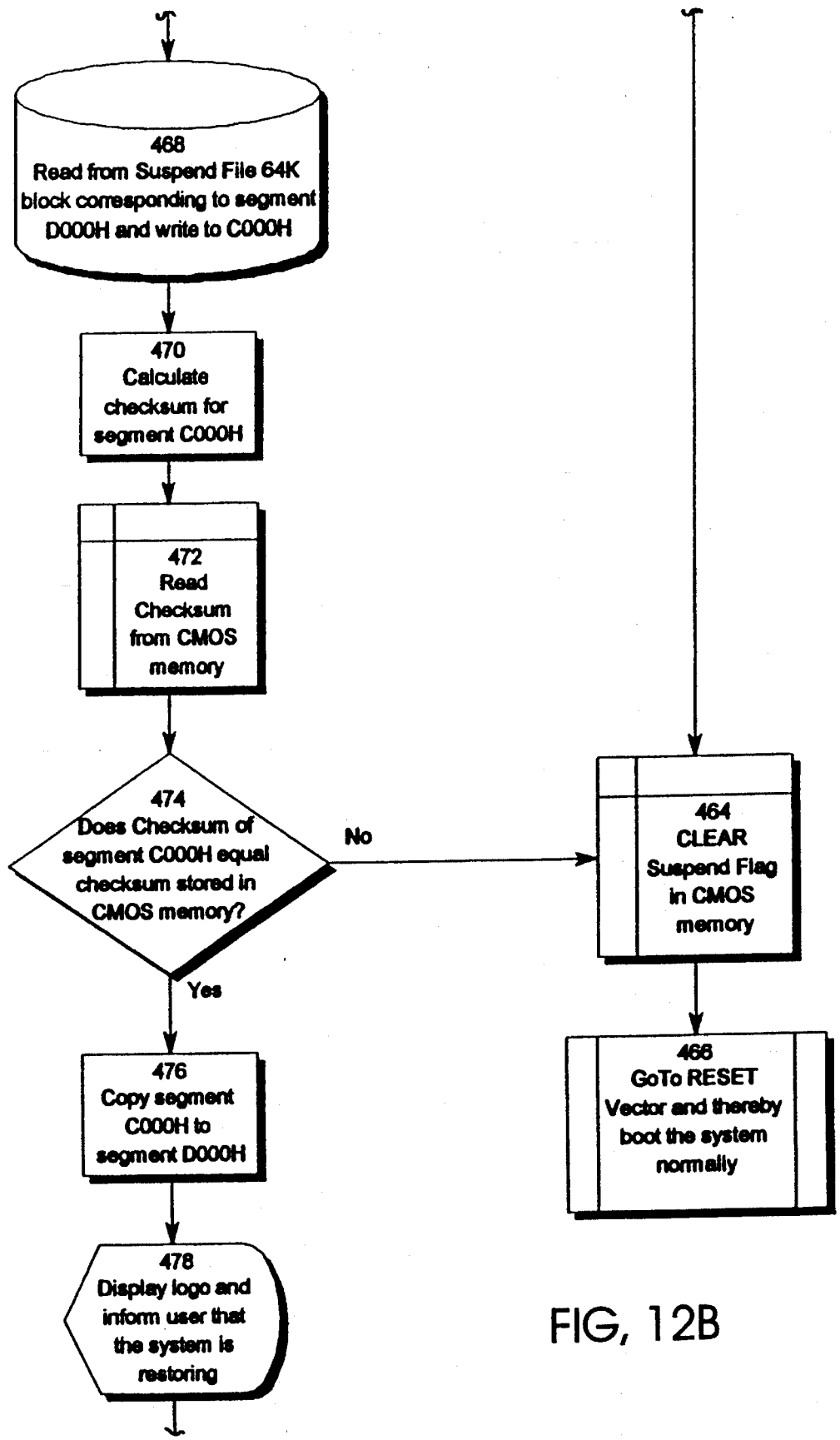
Figure 12C:
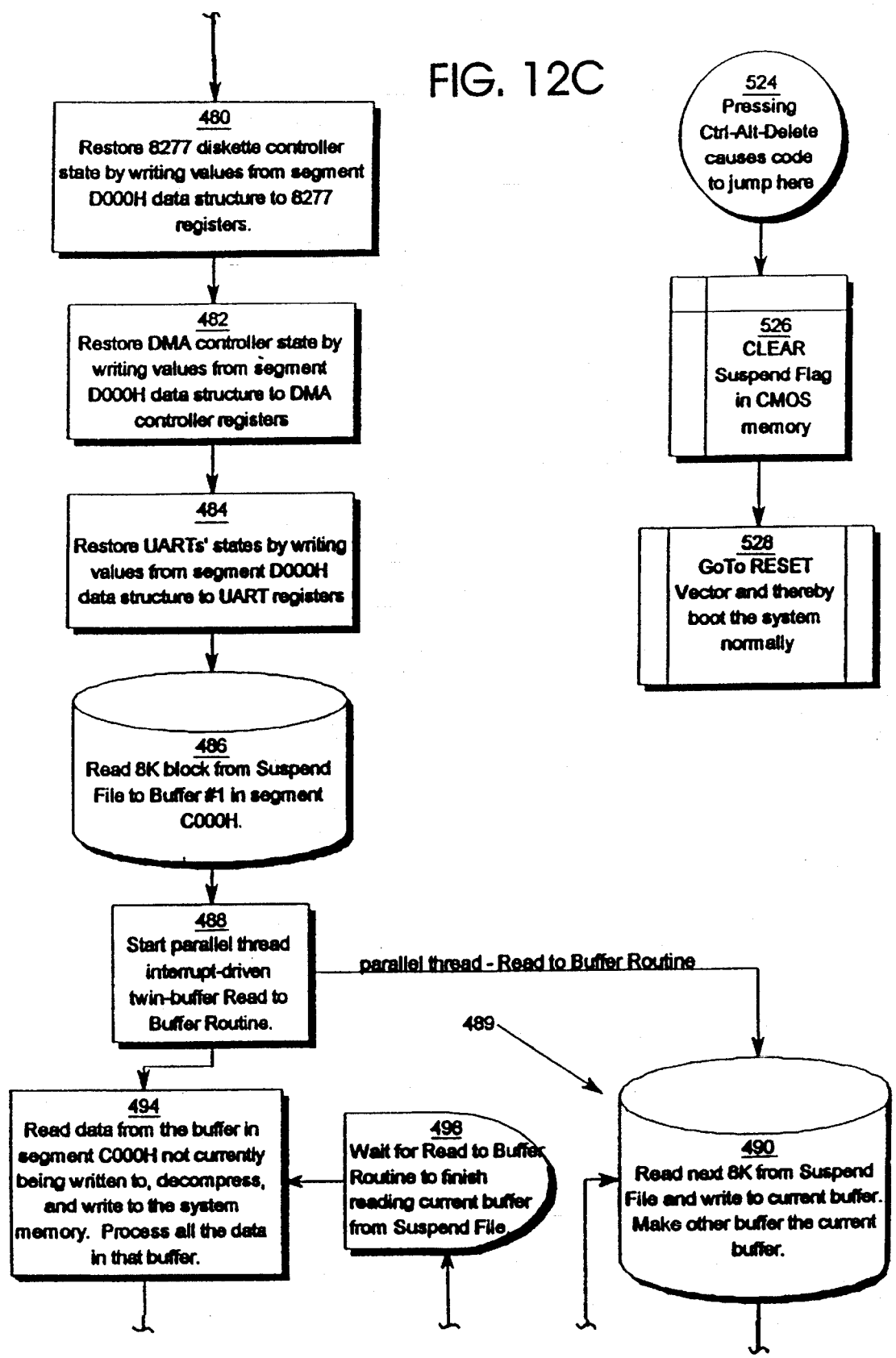
Figure 12D:
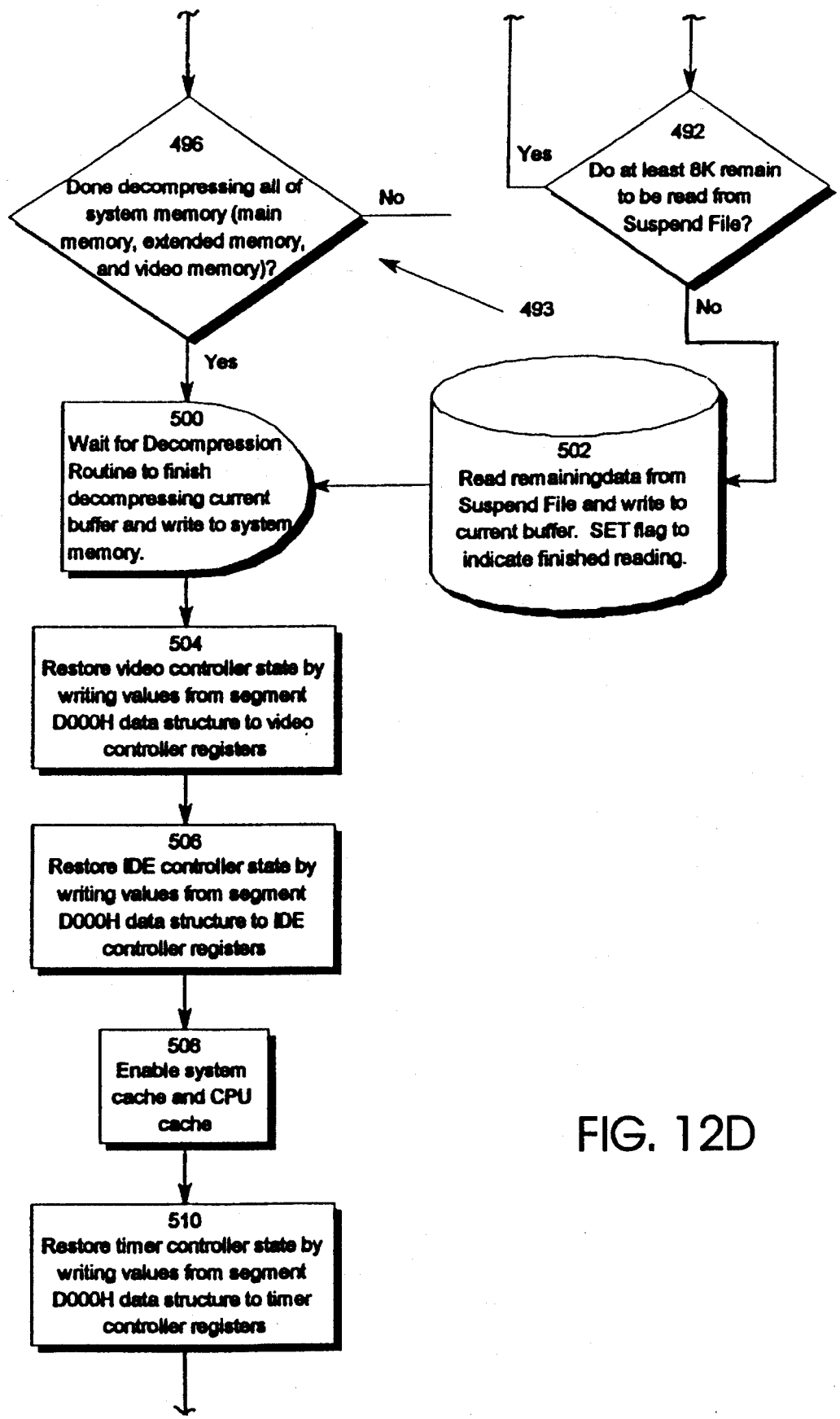
Figure 12E:
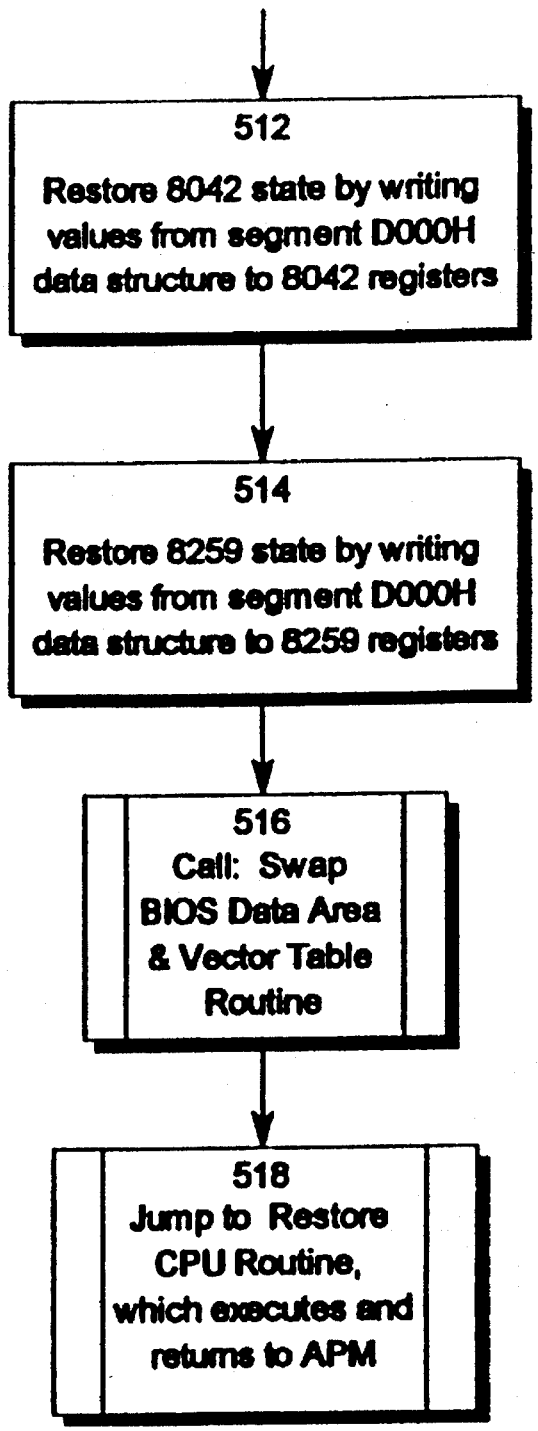
Figure 13A:
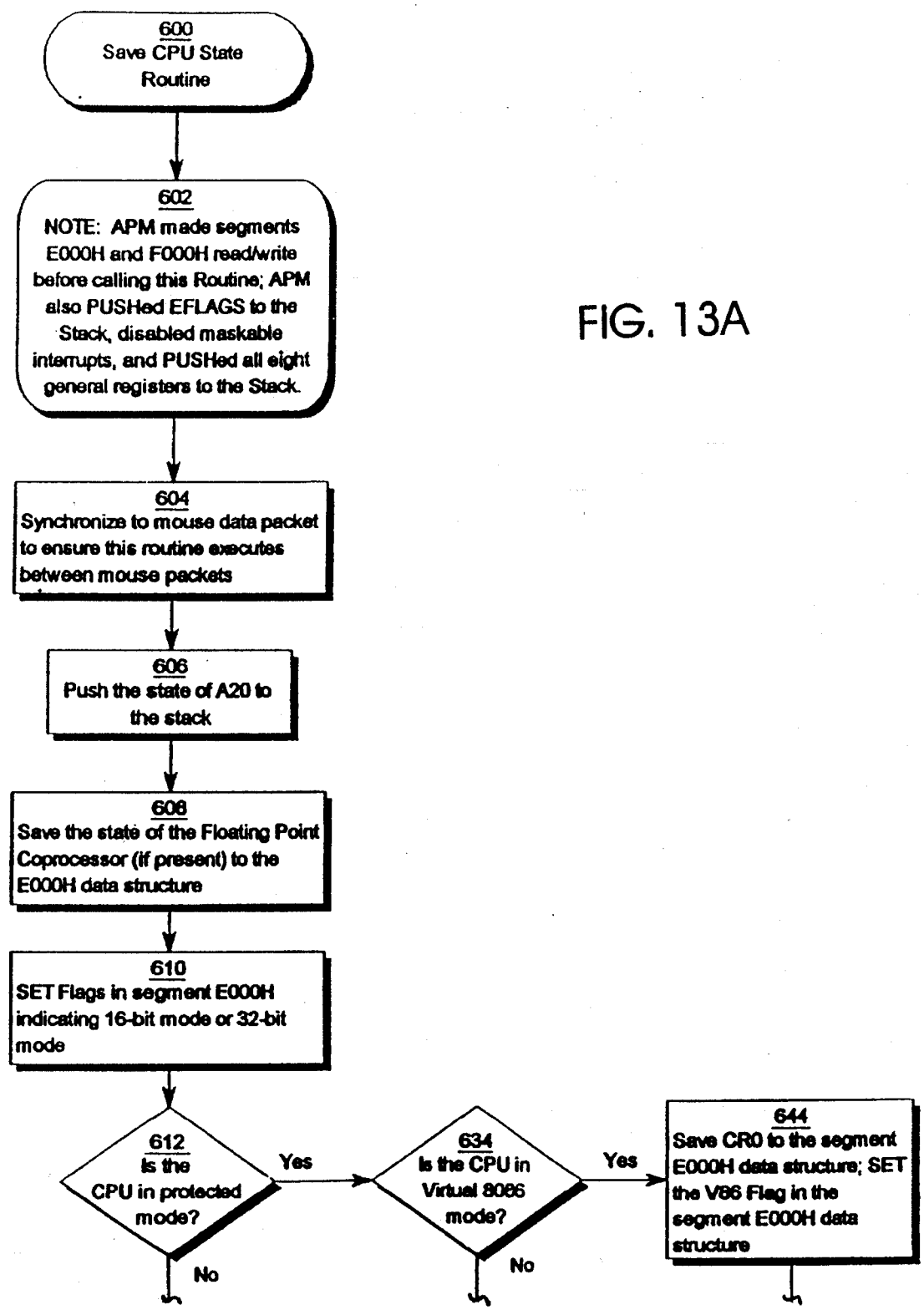
FIG. 13 is a flow chart showing the details of the Save CPU State Routine of the present invention.
Figure 13B:
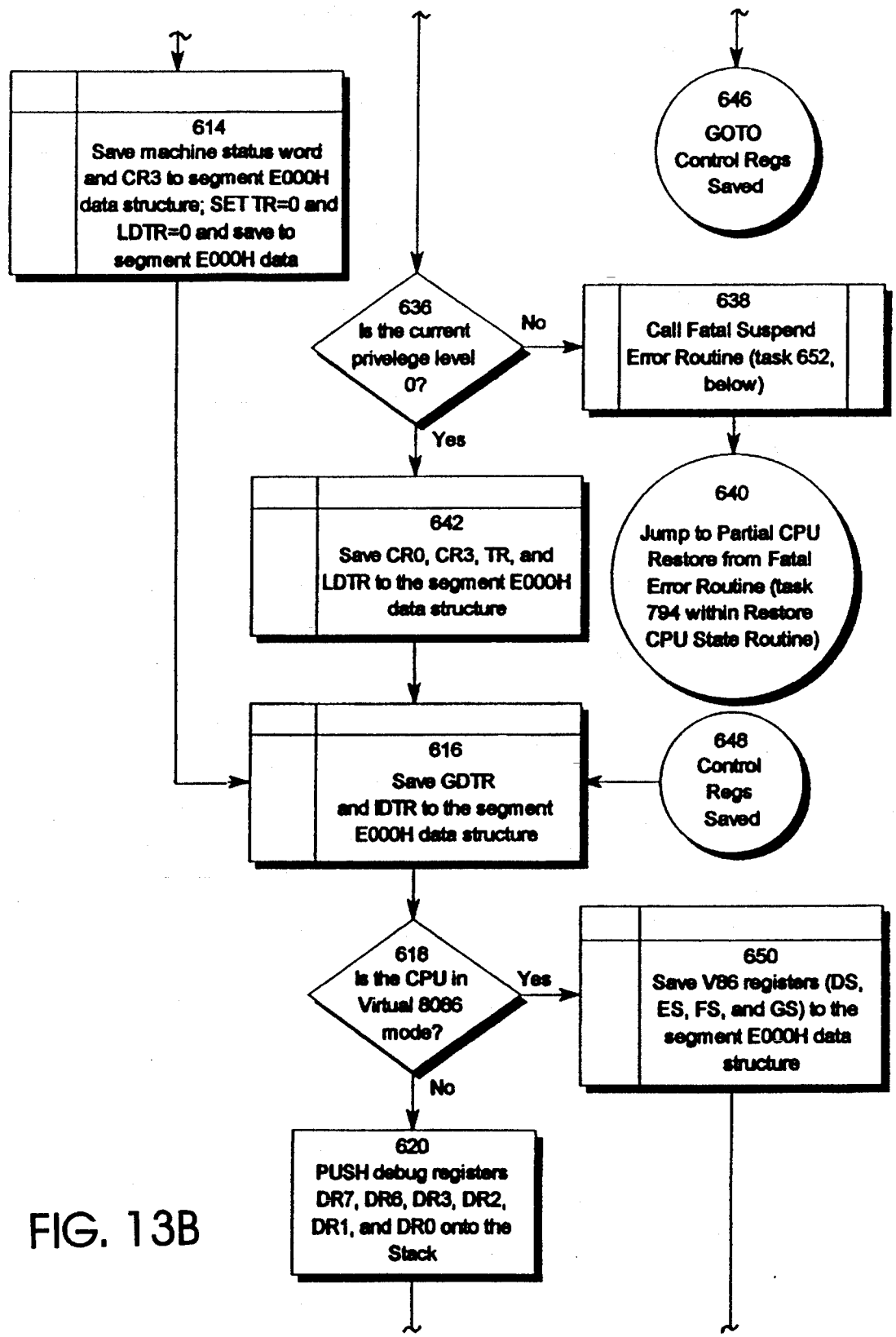
Figure 13C:
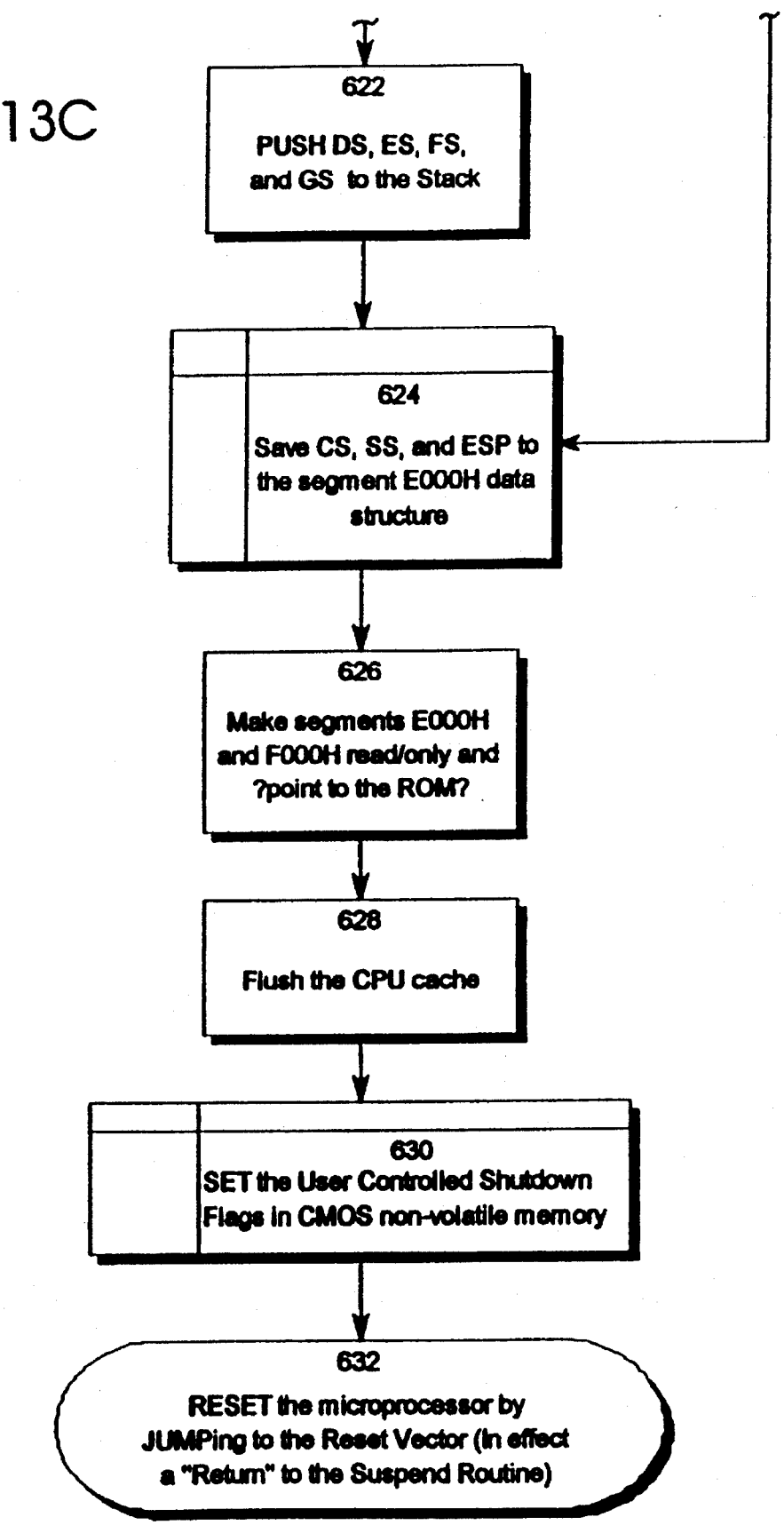
Figure 13D:
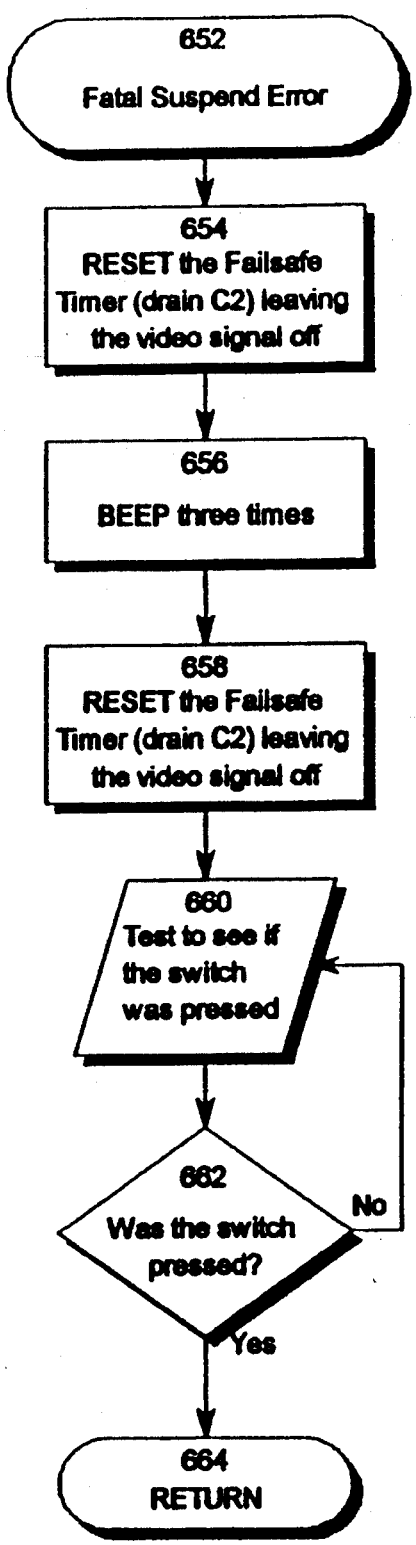
Figure 14A:
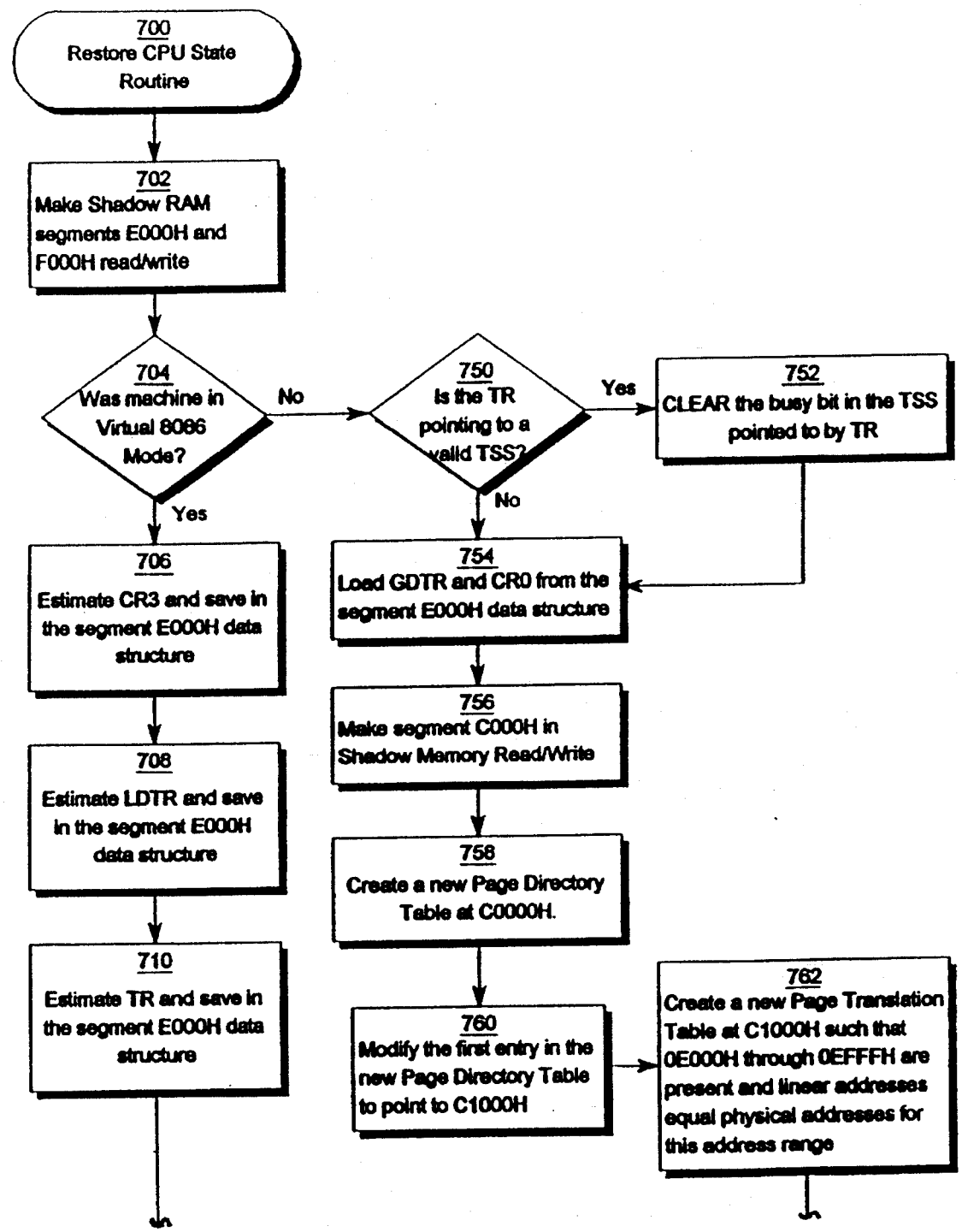
FIG. 14 is a flow chart showing the details of the Restore CPU State Routine of the present invention.
Figure 14B:
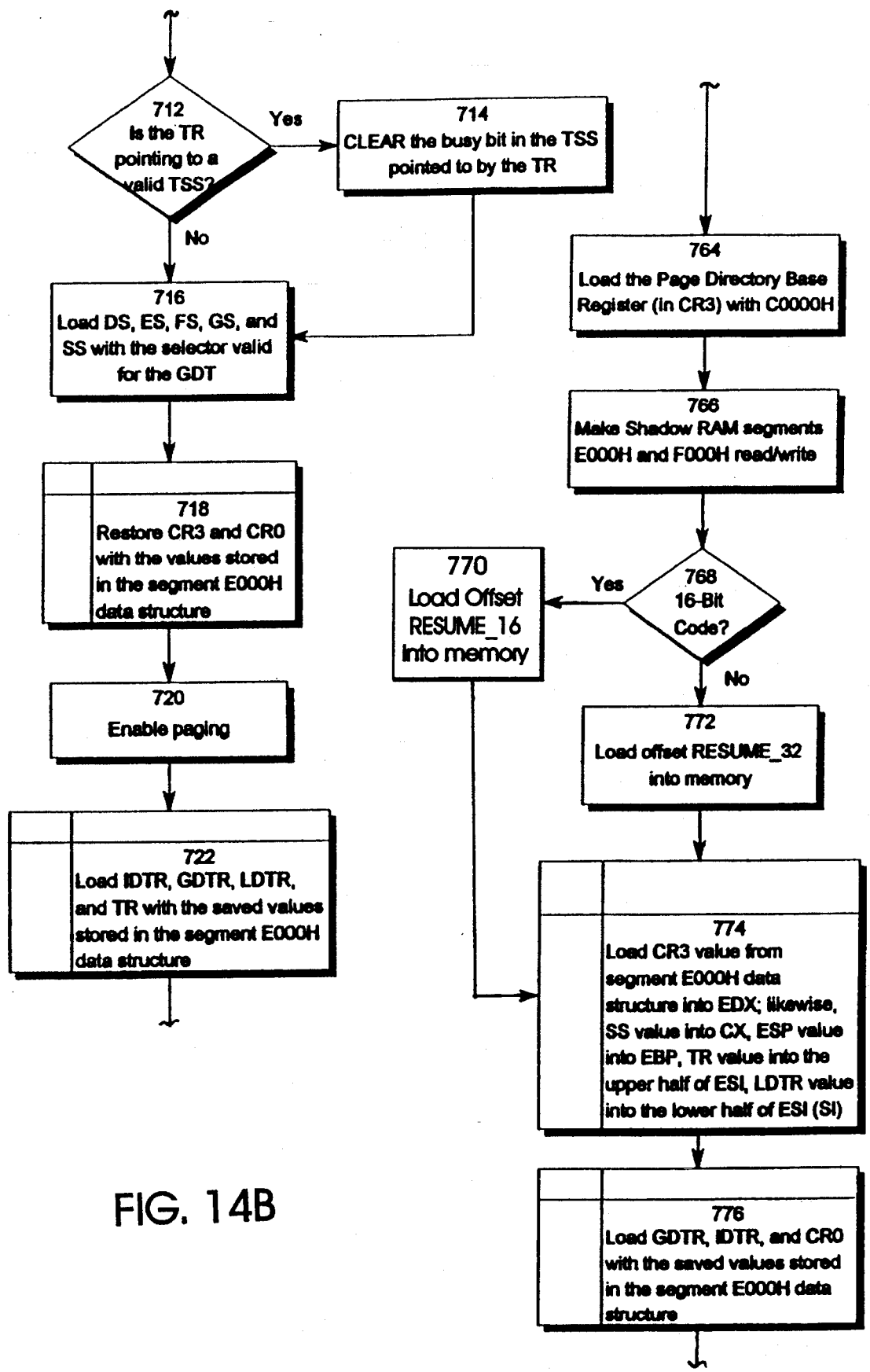
Figure 14C:
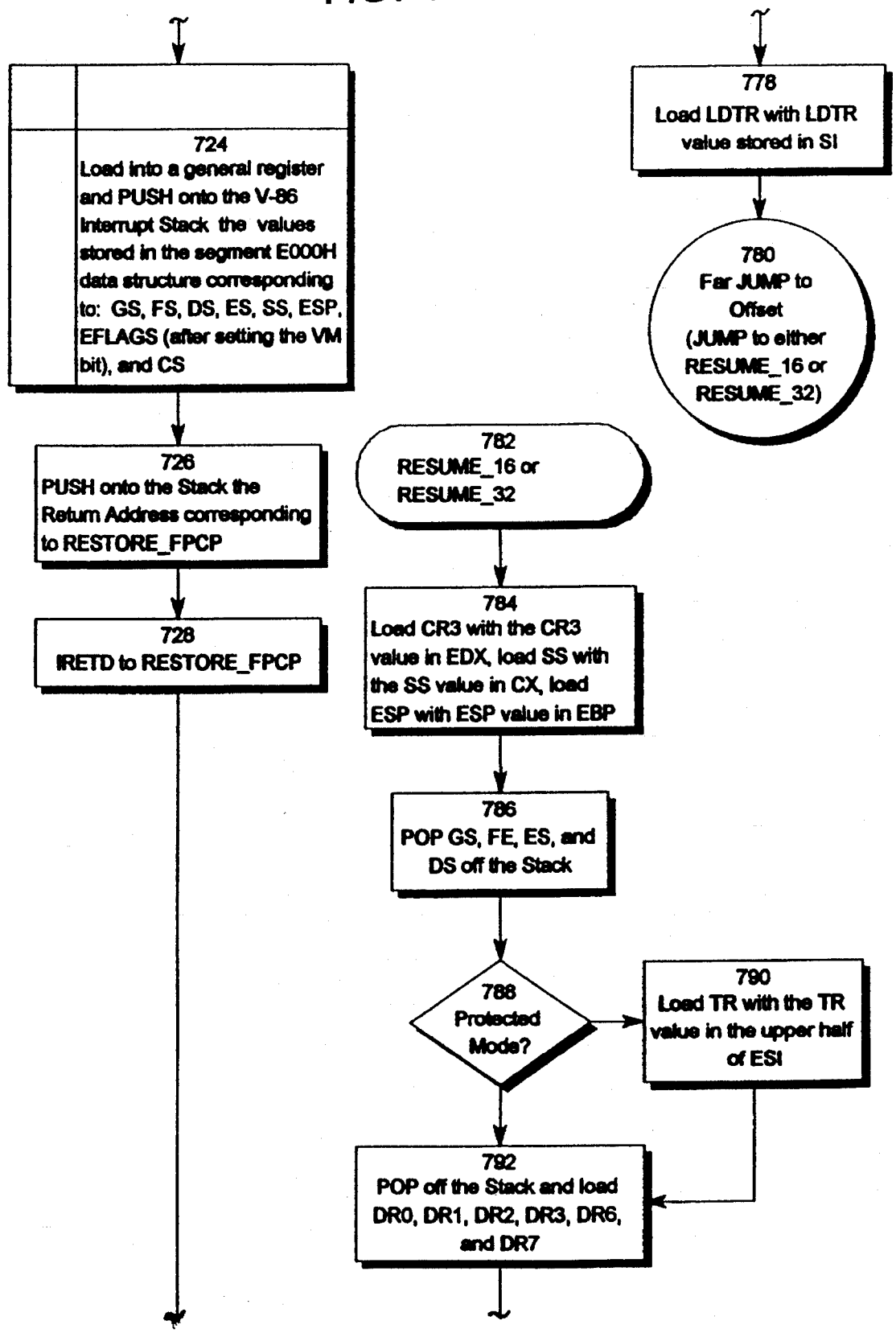
Figure 14D:
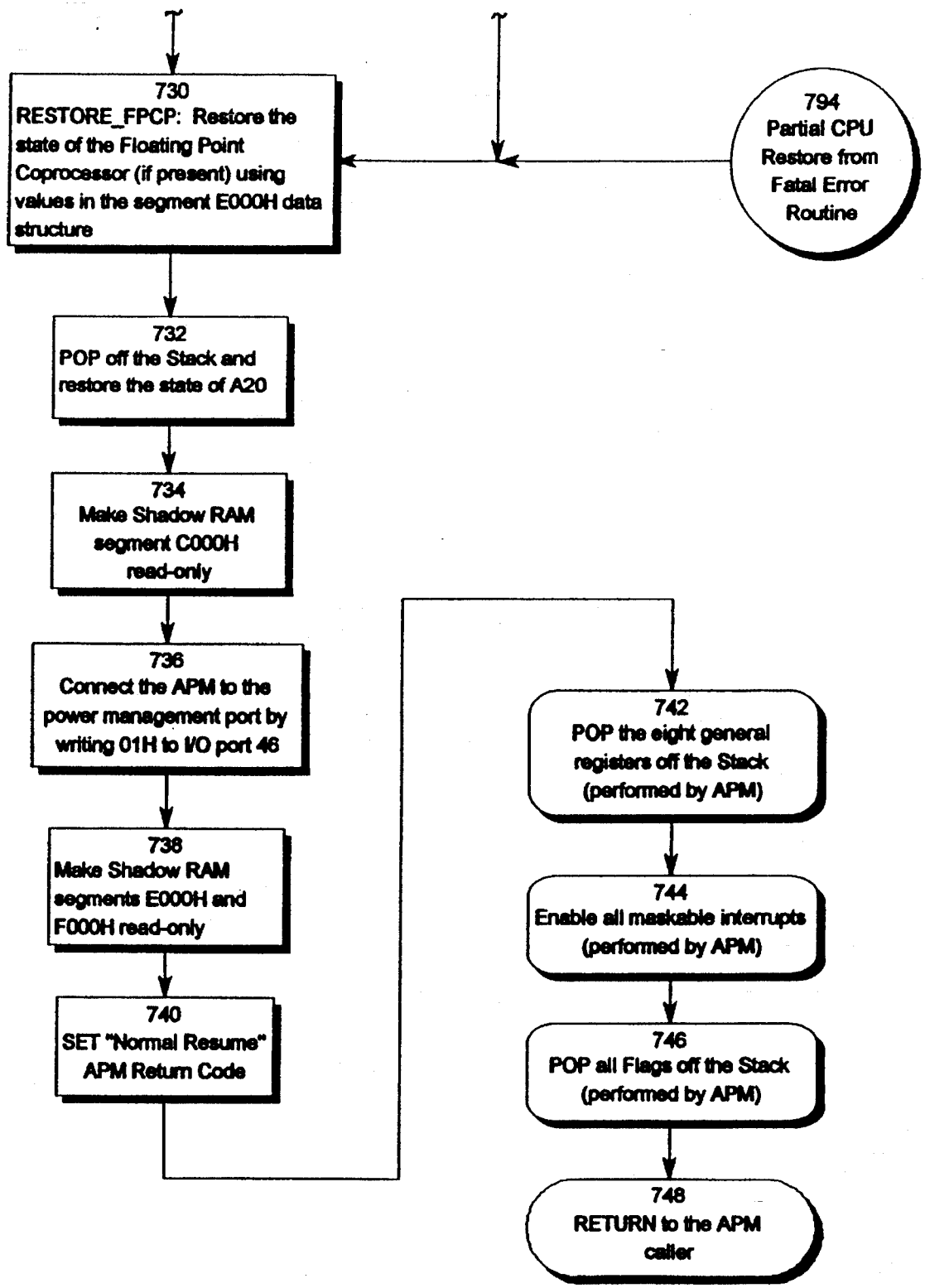

Referring now to FIG. 11, the details of the Boot-Up Routine are shown. The boot process was generally outlined in the text accompanying FIG. 8. The Boot-Up Routine starts at 380 when the CPU 40 jumps to and executes the code pointed to by the Reset Vector. This occurs each time the CPU 40 is powered up and whenever the CPU 40 is reset by jumping to the code pointed to by the reset vector. Such reset procedures are well known in the art.

The first task is to test the CPU 40 and initialize the memory controller 46, at 382. The CPU is tested by the POST routine. The memory controller 46 is initialized by the POST routine.

Next, the shadow memory is tested and the BIOS is copied from ROM 88 to the shadow memory portion of RAM 53. The flow of the executed code depends on whether the Suspend Flag is SET in CMOS NVRAM 96. If the Suspend Flag is SET, then the computer system 10 is in the suspend state 150, and the computer system 10 should be restored to the state it was in when it was suspended. The system RAM 53 in segments E000H and F000H are given an abbreviated test. To reduce the amount of time the computer takes to resume, the memory is merely checked for proper size and zeroed (000H is written to each location).

On the other hand, if the Suspend Flag is CLEARed in CMOS NVRAM 96, then the system RAM 53 in segments E000H and F000H are given the standard, in-depth memory test comprising: (1) a sticky-bit test, (2) a doublebit memory test, and (3) a crossed address line test. These tests are well-known in the art.

After segments E000H and F000H are tested, the BIOS may be shadowed which involves copying the contents of the ROM BIOS 88 to the system RAM 53 and configuring the memory controller to execute the BIOS from RAM. Shadowing the BIOS is done to increase the speed of the system; system performance is enhanced because the BIOS is running from the faster system RAM 53 (a typical access time is 80 nanoseconds) rather than the slower ROM 88 (typical access time 250 nanoseconds). Shadowing the BIOS comprises loading a BIOS copier to an address in lower memory, copying the BIOS from the ROM 88 to the segments E000H and F000H of the system RAM 53, and enabling the shadow RAM.

Next the video controller 56 is tested and initialized and the video memory 58 is tested, both at 384. These tests and initializations are well known in the art.

The flow of the executed code depends on whether the Suspend Flag is SET in CMOS NVRAM 96, at 386. If the Suspend Flag is SET, then the remaining system RAM 53 is merely checked for size and then zeroed, like task 383. If, however, the Suspend Flag is CLEARed in CMOS NVRAM 96, then the remaining system RAM 53 is tested at task 398 using the three-step, in-depth memory test described in the text accompanying task 383.

After the memory is tested, the auxiliary devices—including the 8259, the UARTs, the 8042, and any others—are tested and initialized, at 400. At task 408, the fixed disk controller is initialized.

The flow of the executed code depends on whether the Suspend Flag is SET in CMOS NVRAM 96, at 409. If the Suspend Flag is SET, indicating that the state of the system was successfully saved when power was last removed, then the Boot-Up Routine skips the test of the hard drive controller 86 and hard drive 31. On the other hand, if the Suspend Flag is CLEARed in CMOS NVRAM 96, indicating that the state of the system was not saved when power was last removed, then the Boot-Up Routine performs a complete test of the fixed disk controller 86 and hard drive 31, at task 410, as is well known in the art.

Next, the floppy drive controller 84 is tested and initialized at 412.

At this time, all the devices are initialized and the vectors point to known locations, so all interrupt routines will work as expected. Therefore, the Boot-Up Routine snapshots the BIOS Data Area & Vector Table, at 414, which writes a copy of the BIOS Data Area and the Vector Table to the data structure in segment D000H. This copy of the BIOS Data Area and the Vector Table is used by the Suspend Routine at task 274 to place the computer system 10 into a known state, with all interrupts working as expected.

Next, any BIOS extensions are "scanned in" and initialized at 416 as is well known in the art. BIOS extensions are blocks of BIOS code added to the system by peripheral adapters, such as network adapters. BIOS extensions are typically located in segments C000H and D000H on the ISA bus 76 and have an associated "signature" to identify the BIOS extension as such. If a BIOS extension is detected, the length is checked and a checksum is calculated and checked. If the signature, length, and checksum all indicate that a valid BIOS extension exists, program control passes to the instruction located three bytes past the signature and the BIOS extension can perform any needed tasks such as the initialization of the peripheral adapter. Once the extension finishes execution, control passes back to the Boot-Up Routine, which searches for more BIOS extensions. Any more BIOS extensions are handled like the BIOS extension above. If no more BIOS extensions are detected, the Boot-Up Routine then moves to task 417.

At 417 the Boot-Up Routine searches for a partition on the hard drive 31 that appears to be partition specifically allocated for the Suspend File. If a partition with a PS/1 identifier ("FE") in the partition table is found and that partition is large enough to accommodate a Suspend File for this particular system, then that partition is determined to be for the Suspend File. Consequently, a Suspend File is allocated in the file allocation table (FAT) as is well known in the art, the Suspend File Signature is written to the first bytes of the file, and the starting head, sector, and cylinder of the file are written to CMOS NVRAM 96.

The flow of the executed code then branches, depending on whether the Suspend Flag is SET in CMOS NVRAM 96, at 418. If the Suspend Flag is cleared, then the Boot-Up Routine passes control to the PBOOT routine at 420. PBOOT is well known in the art and is responsible for loading the operating system (OS) and command interpreter from either a floppy disk or the hard drive 31. The normal booting routine of the present invention is modified slightly in that when the OS is loaded, if a partition for the Suspend File was not found at task 417, then the OS executes an OS-specific driver that allocates a file of contiguous sectors (defragmenting an area if necessary) in the FAT, writes the signature to the first bytes of the Suspend File, and writes the starting head, sector, and cylinder of the Suspend File to the CMOS NVRAM 96.

Regardless of when the Suspend File is allocated, the area in the FAT should be contiguous sectors to allow a rapid write to disk and a rapid read from disk during suspends and resumes, respectively.

PBOOT next configures the system based on the instructions found in the CONFIG.SYS file. Lastly, PBOOT passes execution control to the AUTOEXEC.BAT file, which eventually passes execution control to the operating system. If the Suspend Flag is cleared in CMOS NVRAM 96, indicating that the state of the system was not saved when power was last removed, then RESUME.EXE, which is explained more fully in the text accompanying task 421, is ignored.

Referring back top task 418, if the Suspend Flag is set in CMOS NVRAM 96, indicating that the state of the system was saved when power was last removed, then the flow of the executed code then branches, depending on whether the Reinitialize Adapters Flag is SET in CMOS NVRAM 96, at 419. If the Reinitialize Adapters Flag is set, then the Boot-Up Routine passes control to the PBOOT routine at 421. Like the usual PBOOT Routine, PBOOT of the present invention configures the system in accordance with the commands found in the CONFIG.SYS and AUTOEXEC.BAT files, which, inter alia, load drivers and configure the system as is well known in the art.

The commands in CONFIG.SYS and AUTOEXEC.BAT may initialize adapter cards in the system. This application presumes three types of adapter cards exist: Type I adapters do not need initialization; Type II adapters require initializing, but are placed into a known working state by the BIOS extension or the driver loaded as per the CONFIG.SYS or AUTOEXEC.BAT files; and Type III adapters are modified by code executing on the system. Systems comprising Type I and Type II adapters may be suspended and restored; however, systems comprising Type III adapters, which include many networking adapters, may not be restored, unless the cards have a routine to recover from an error. Systems may suspend Type III cards that recover from an error.

The file RESUME.EXE is added to the AUTOEXEC.BAT file in the preferred embodiment and is responsible for transferring program control from PBOOT to the Resume Routine. PBOOT in task 420 ignores the presence of RESUME.EXE; however, the PBOOT of task 421 executes RESUME.EXE, which passes control to the Resume Routine after the Type II adapters are finished being initialized by the device drivers loaded by PBOOT from CONFIG.SYS AND AUTOEXEC.BAT.

Referring back to task 419, if the Reinitialize Adapters Flag is cleared in CMOS 96, the Boot-Up passes execution control directly to the Resume Routine, at 422, without processing CONFIG.SYS or AUTOEXEC.BAT. The Resume Routine restores the system state from the Suspend File on the hard drive and is described in detail in the text accompanying FIG. 12.

Referring now to FIG. 12, the details of the Resume Routine, tasks 450 through 530, are shown. During the configuration process, the BIOS Data Area & Vector Table is probably modified to an unknown state; therefore, the basic BIOS routines may or may not function as expected. Consequently, the Resume Routine enables segment D000H as read/write, at 454, and calls the Swap BIOS Data Area & Vector Table Routine at 456. This routine swaps the known, good BIOS Data Area & Vector Table, which was copied to segment D000H in task 414, with the modified BIOS Data Area & Vector Table, which is currently active in segment 0000H. When the routine is finished, the known BIOS Data Area & Vector Table is active in segment D000H, the modified BISO Data Area & Vector Table is in segment D000H, and the BIOS routines will function as expected.

Next, the Resume Routine disables all interrupts except those supporting the keyboard and the hard drive, at 458. Then, the Resume Routine locates the Suspend File on the hard drive 31, at 460, and reads the file size and the signature, which, as explained above, is the multi-byte identifier for the Suspend File. The flow of the executed code then branches, at 462, depending on whether the Suspend File has the correct size and signature. If the Suspend File does not have the correct size and signature, then the Resume Routine CLEARs the Suspend Flag in CMOS memory 96, at 464, and program control is passed to the code in the location pointed to by the Reset Vector, at 466, thereby causing the system to boot as though the system was never suspended. On the other hand, if the Suspend File has the correct size and signature, then the Resume Routine continues with the system resume by reading the 64K block in the Suspend File located after the signature (the portion of the Suspend File that corresponds to the segment D000H information) to segment C000H, at 468.

Next, the checksum of the block in C000H is calculated, at 470, the previously stored checksum is read from CMOS non-volatile memory 96, at 472, and the flow of the executed code then branches, at 474, depending on whether the checksum calculated in task 470 is the same as the checksum calculated in task 330. If the checksum calculated in task 470 is not the same as the checksum calculated in task 330, then the Suspend File is somehow flawed (for example, it may have been tampered with) and control passes to task 464, which CLEARs the Suspend Flag and resets the system, as explained in the text accompanying tasks 464 and 466. If the checksum calculated in task 470 is the same as the checksum calculated in task 330, then the Suspend File is presumed to be the same one written by the Suspend Routine, and the data in segment C000H is copied to segment D000H, at 476. Note, when the C000H data is copied to D000H, the modified BIOS Data Area & Vector Table is overwritten and is, therefore, irrecoverable.

Now, the Resume Routine writes to the screen, at 478, a special signal screen informing the user that the system is being restored and that the user should press Ctrl-Alt-Del to abort the resume. As with the Suspend Routine, pressing Ctrl-Alt-Del clears the Suspend Flag, at 526, and causes the system to reboot, at 528. However, on rebooting, the second PAL U2 is in switch state $01_2$, therefore, writing X00H to the power management port does not cause the power supply 17 to stop providing system power. Thus, the system reboots normally when Ctrl-Alt-Del is pressed and the Resume Routine is executing.

Next, the 8277 diskette controller 84, the DMA unit 71, and the UARTs 94 are restored by writing the values from the segment D000H data structure to their respective registers, at 480, 482, and 484, respectively.

Then, at tasks 486 through 500, the system memory is restored from the Suspend File using a twin buffer routine similar to the routine explained in the text accompanying tasks 304 through 318 in the Suspend Routine. This twin-buffer system reads compressed data from the Suspend File, writes it into segment C000H, decompresses it, and writes it to the system memory. Two routines work in a time-multiplexed arrangement: one reads data from the Suspend File and writes it into segment C000H, and the other decompresses the data and writes the decompressed data to the system memory. The latter is running in the foreground, the former is an interrupt-driven routine that runs in the background. Obviously, since there is only one CPU 40, only one routine can execute at a given time; however, because the former routine is interrupt-driven, it can interrupt the execution of the latter routine as needed to optimize the speed of transfer of the data from the Suspend File. Each of the two buffers is 8 kilobytes long, which is believed to optimize transfer time.

This process starts at 486 with the reading from the Suspend File and writing to segment C000H of enough data to fill the first of the 8K buffers. At this time, the Read from Buffer Routine, which is generally indicated at 489, is started, at 306. The Read from Buffer Routine 489 is an interrupt-driven routine that runs in the background and is comprised of tasks 490–492. The Decompression Routine, generally indicated at 493, comprises tasks 494–498 and is the foreground routine. First, the Read from Buffer Routine 489 starts reading the next 8K of the Suspend File and writing it to the other buffer, now the current buffer, at 490. While the Read from Buffer Routine 489 reads the next 8K from the Suspend File and writes it to the current buffer, the Decompression Routine 493 reads the buffer filled by task 486 decompresses the compressed data, and writes the decompressed data to the system memory, at 494. Once the Decompression Routine 493 has decompressed all the data in that buffer, the next step is to determine if the entire system memory has been decompressed yet, at 496.

The IDE controller 86 cannot read data from the hard drive 31 very quickly. As a consequence, the Decompression Routine 493 will always finish decompressing the 8K buffer not being written to the hard drive 31 before the Read from Buffer Routine 489 finishes reading data into the current buffer from the hard drive 31. Therefore, the Decompression Routine 493 must wait for the Read from Buffer Routine 489 to finish reading data from the hard drive 31. If the Decompression Routine 493 has not finished compressing and writing all of system memory, then the Decompression Routine 493 waits for the Read from Buffer Routine 489, at 498. The Decompression Routine 493 and the Read from Buffer Routine 489 communicate via a set of flags. When the Read from Buffer Routine 489 finishes reading data from the Suspend File into the current buffer, the Routine 489 next switches the buffer flags, at 490, indicating to the Decompression Routine 493 that it may start decompressing the data in the buffer that was just read from the Suspend File. The Read from Buffer Routine 489 then decides if an 8K block remains to be read from the Suspend File, at 492. If not, the Read from Buffer Routine reads the remaining data from the Suspend File and writes it to the current buffer, at 502. The Read from Buffer Routine then ceases running in the background, in effect waiting at 500 for the Decompression Routine to finish decompressing the last memory.

In the mean time, the Decompression Routine 493, by examining the buffer flags, determines that a buffer is ready for decompression to system memory. That is, the Decompression Routine waits at 498 until the Read from Buffer Routine finishes with the current buffer, at which time the decompression loop continues at 494.

Once the Decompression Routine 493 is finished decompressing all the system memory, no background routines are executing and the main program continues at 504.

Next, the video controller 56 and the IDE controller 86 are restored, at 504 and 506 by writing the values from the D000H data structure to the registers within each of the two devices. Then, the CPU cache 41 and the system cache 60 are enabled by writing appropriate values to the CPU 40 and the cache controller 62, respectively, at 508. Next, the Resume Routine restores the state of the timer controller 102, the 8042 keyboard interface microprocessor 104, and the 8259 interrupt controller 92 by writing values from the segment D000H data structure to the registers within the respective devices, at 510 through 514.

Next, the Resume Routine calls the Swap BIOS Data Area & Vector Table Routine, at 516. Before the routine is called, the known BIOS Data Area & Vector Table is active in segment 0000H and the BIOS Data Area & Vector Table read from the Suspend File is inactive in the segment D000H data structure. After the swap, the known BIOS Data Area & Vector Table is inactive in segment D000H and the BIOS Data Area & Vector Table that was saved by the Suspend Routine is active in segment 0000H.

Lastly, the Resume Routine jumps to the Restore CPU Routine, at 518, which restores the CPU 40 to the state before it was suspended. The Restore CPU Routine will be explained more fully in the text accompanying FIG. 14. The Restore CPU Routine eventually passes execution control back to the APM.

Finally, the CPU 40 executes a RETURN instruction, causing the system to return to the APM. The system now continues executing code as though the system was never suspended. For all practical purposes, the system is unaffected by the suspend/resume procedure.

Referring now to FIG. 13, a flow chart of the Save CPU State Routine is shown. The Suspend Routine jumps to the Save CPU State Routine at 600. Note that the APM enabled segments E000H and F000H, from which these routines execute, as read/write. In addition, EFLAGS and the eight general purpose registers were saved by the APM, as indicated at 602. The Save CPU State Routine first waits for any DMA to finish and synchronizes to the mouse 13 data packet, at 604, to ensure that this routine executes between mouse packet transmissions. The following steps allow DMA to finish and synchronize to the mouse packet: (1) enable interrupts, (2) wait 7 milliseconds for any DMA to finish, (3) disable interrupts, (4) wait 5 milliseconds for a mouse packet boundary, (5) enable interrupts, (6) wait 5 more milliseconds for the mouse packet to arrive, and (7) disable interrupts. After these steps, the code may safely execute between mouse packets.

Next, the state of Address Line 20 (I/O port 92H) is PUSHed onto the Stack, at 606, and the state of the arithmetic coprocessor 44 is PUSHed onto the Stack, at 608. Then, at 610, a flag is SET of CLEARed to indicate whether the CPU is executing in 32-bit or 16-bit mode, respectively.

The flow of the executed code then branches, depending on whether the CPU 40 is executing in Protected Mode or not, at 612. If the CPU 40 is not executing in Protected Mode, then it must be executing in Real Mode and the registers may be saved in a very straightforward manner. First, the values in the machine status word and CR3 are written to the segment E000H data structure, at 614. Also at 614, zero is written into the segment E000H data structure in the areas corresponding to TR and LDTR, because TR and LDTR are zero in Real Mode.

The code then merges with a common code path at 616, where the values stored in GDTR and LDTR are written to the segment E000H data structure. Next the flow of the executed code then branches, depending on whether the CPU 40 was executing in Virtual 8086 Mode or not, at 618. If the CPU 40 is not executing in Virtual 8086 Mode, then the code continues down the common path to task 620, where the debug registers DR7, DR6, DR3, DR2, DR1, and DR0 are PUSHed onto the Stack. These registers are being used by debuggers and other routines. Then DS, ES, FS, and GS are PUSHed onto the Stack, at 622. Next, the values in CS, SS, and ESP are written to the segment E000H data structure.

At this point, all the values to be written to the segment E000H data structure have been written, so the Shadow RAM segments E000H and F000H can be changed back to read-only, at 626. Next, the CPU cache 41 is flushed using the Write-Back and Invalidate Cache command, at 628.

Lastly, a unique Shutdown Flag is SET in the CMOS non-volatile memory 96, at 630. Finally, the Save CPU State Routine "Returns," in effect, to the Suspend Routine, at 632. The "Return" is actually a RESET followed by a branch in the code. The CPU 40 resets by JUMPing to the code pointed to by the Reset Vector. Resetting the CPU 40 forces the CPU into Real Mode, where all the devices and memory locations may be accesses without fear of generating a protection fault. After this point, the state of the CPU has been saved and the Suspend Routine must save the state of the rest of the system.

Within the code pointed to by the Reset Vector, program control branches, depending on whether the Shutdown Flag is SET in the CMOS 96. If the Shutdown Flag is CLEARed, then the system boots as it normally would. On the other hand, if the Shutdown Flag is SET, then the code branches to the rest of the Suspend Routine; that is, execution control jumps to task 253 in FIG. 10 within the Suspend Routine, which finishes suspending the system 10. Thus, the Save CPU State Routine effectively "Returns" to the Suspend Routine at 632.

Referring back to task 612, if the CPU is in Protected Mode, then the code branches, at task 634, depending on whether the CPU is in Virtual 8086 Mode, or not. If the CPU is not in Virtual 8086 mode, then the code again branches, at task 636, depending on whether the current privilege level is zero. If the current privilege is anything but zero, then a routine without proper privilege is executing the Save CPU State Routine, and the Fatal Suspend Error Routine (starting at task 652) is called. The Fatal Suspend Error Routine will be discussed below. If program control returns from the Fatal Suspend Error Routine, then the CPU must be returned to its condition before the Save CPU State Routine was called, so program execution branches to task 794, in FIG. 14, which performs a partial restore of the CPU. Only a partial restore is necessary because very little in the CPU has been modified.

Referring back to task 636, if the calling code has the proper privilege level, then the save continues, at 642, as the values in CR0, CR3, TR, and LDTR are saved to the segment E000H data structure. Then this code path merges with the common code path at 616, where the values in GDTR and the IDTR are saved to the E000H data structure, as explained above. From here, the code follows the path from 618 to 632 that was explained above, resulting in a "Return" (RESET plus a branch) to the remaining Suspend Routine code.

Referring back to task 634, if the CPU 40 is in Virtual 8086 mode, then execution continues at 644, where the value of the machine status word (the lower 16 bits of CR0) is saved to the E000H data structure and a Flag in the segment E000H data structure is SET indicating that the CPU is in Virtual 8086 Mode. This code then merges with the common code at 616 via the transfer 646 and 648. At task 618, if the CPU was in the Virtual 8086 Mode, then control branches to 650, where the values in DS, ES, FS, and GS are saved in the segment E000H data structure. This code re-merges with the common code at 624. From here, the code follows the path from 624 to 632 that was explained above, resulting in a "Return" (RESET plus a branch) to the remaining Suspend Routine code.

The Fatal Suspend Error Routine is found at tasks 652 through 664 and is called at 638 if code with an improper privilege level attempts to save the state of the CPU. First, the Failsafe Timer is RESET, at 654, by writing a 07H then a 05H to the power management port, as explained in the text accompanying FIG. 7. Then the speaker beeps three times at 886 Hz for 0.25 seconds, with ⅙th of a second between beeps, at task 656. The three beeps alerts the user that the attempted suspend did not take place. After beeping, the Failsafe Timer is RESET again at 658 to give the user a consistent 15 to 18 seconds before the Failsafe Timer expires, shutting off the power supply 17.

Next, the Fatal Suspend Error Routine repeatedly checks to see if the switch 21 was pressed by user, at tasks 660 and 662, indicating that the user wants to abort the suspend. The switch is checked for closure by waiting for an FFH to appear after a read of the power management port, as explained in the text accompanying FIG. 7. If the user presses the button 21, then the execution control returns to task 640, above. If the user does not press the button 21 within 15 to 18 seconds, then the Failsafe Timer will expire and the power supply 17 will be turned "off," and obviously, all execution of the code will cease.

Referring now to FIG. 14, a flow chart of the Restore CPU Routine is shown starting at 700. This routine is called by the Resume Routine after the rest of the hardware and memory have been restored to their state before the suspend. First, if segments E000H and F000H are not read/write yet, they should be made read/write, at 702.

Next the flow of the executed code then branches, depending on whether the CPU 40 was executing in Virtual 8086 Mode when it was suspended, at 704. If the CPU 40 was executing in Virtual 8086 Mode when the system 10 was suspended, then the code from tasks 706 through 728, which are unique to the Virtual 8086 CPU restore. Then the code merges with a common path from tasks 730 through 748.

If the CPU was in Virtual 8086 mode when the state was saved, then CR3, LDTR, and TR could not be accessed by the Save CPU State Routine to save those values to the E000H data structure. Therefore, CR3, LDTR, and TR must be estimated, respectively, at 706, 708, and 710. In general, they are estimated by searching through the system RAM 53 for the structures to which CR3, LDTR, and TR point. For example, finding the LDT entry in the GDT allows the LDTR to be determined.

CR3 is estimated at task 706. CR3 holds the Page Directory Base Register (PDBR), which holds the page frame address of the page directory, the Page-Level Cache Disable (PCD) bit, and the Page-Level Write Through (PWT) bit. Estimation of the PDBR is done knowing that the page directory must start at a 4K boundary within system RAM 53, knowing the values for the IDTR and the GDTR, which were saved in the segment E000H data structure by the Save CPU State Routine, and assuming that the BIOS code is executing from the address space 0E0000 - 0F0000. The assumption is reasonable because the BIOS code is already shadowed into Shadow RAM for speed. If the operating system copied the BIOS code to a different area, then the estimation of CR3 would fail.

With the above knowledge and assumption, every 4K page of physical memory is tested for the presence of a page translation table corresponding to the BIOS code segments. That is, an offset of 0380H into the page would contain the values 000E0XXX, 000E1XXX, 000E2XXX, . . . 000FFXXX. Once that page is located, the system RAM 53 is searched for a page directory whose first entry corresponds to the physical address of the page table that was located above. The physical address of the page directory is a good "guess" of the value of the PDBR.

The hypothetical PDBR is then verified by ensuring that the PDBR translates the addresses for the GDTR and the IDTR correctly. That is, the PDBR is used to translate the linear address of the GDTR and the first entry of the GDT is verified to be a null (the first eight bytes of the GDT are always 00H in any CPU mode). Then the physical address that is returned is verified to be within the bounds of physical memory. To accomplish the linear to physical translation, a subroutine that mimics the CPU's translation method is used; the translated address is returned in ESI and the carry flag CF is cleared if the physical page is present in physical memory, and CF is SET if the physical page is not present in memory. Using this translation routine, the first byte of the GDT is read from memory 53. If the first entry of the GDT is a null, then the hypothetical PDBR passed its first test and is, therefore, tested once again. The PDBR is then used to translate the IDTR to find the IDT using the translation routine. Then the physical address that is returned is verified to be within the bounds of physical memory. If the first location of the IDT is present in physical memory, then the PDBR passed its second test.

If a hypothetical PDBR correctly translates into the GDTR and the IDTR, then the value is presumed to be the PDBR and is written to the CR3 area within the segment E000H data structure. If, on the other hand, the hypothetical CR3 fails either test, then the routine starts again, searching system memory for another BIOS code segment page translation table, which might lead to a valid CR3.

PCD and PWT are always assumed to be fixed at 00H for normal planar operation. These values are set to zero and written with the PDBR in the CR3 area within the segment E000H data structure.

Once CR3 has been estimated, the LDTR is estimated, at 708. The LDTR can be estimated given that CR3 has been estimated, knowing that the LDT is somewhere within the GDT, and knowing that the LDT must be present in memory. To estimate the LDTR, the GDT is searched for an LDT that is marked present. The first LDT that is present in physical memory (tested using the translation routine explained in the text accompanying task 706) and is marked present is presumed to be the table to which the LDTR points. The physical address of the start of that table is saved to the LDTR area in the segment E000H data structure.

The above method of estimating LDTR is believed to be reliable enough to be useful, even though under OS/2 more than one LDT can be marked present and present in physical memory. EMM386 is a common Virtual 8086 Mode routine and, therefore, might seemingly cause problems; however, CR3 and LDTR for EMM386 are easy to estimate because EMM386 only has one CR3 and one LDTR.

Once CR3 and LDTR have been estimated, the TR is estimated, at 710. Essentially, each task selector entry within the GDT and the LDT are searched for a task state selector with the busy bit set. The type field for each entry is tested to see if it is either a busy 80286 task state selector or a busy 80486 task state selector. The first entry with either a busy 286 TSS or a busy 486 TSS is presumed to be the address to which the TR points. The physical address of the entry with the busy 286 or 486 TSS is saved to the TR area within the segment E000H data structure. If no entry has a busy 286 or 486 TSS, then the zero is saved to the TR area within the segment E000H data structure.

Having estimated CR3, LDTR, and TR, the code continues at task 712. At 712, if the TR points to a valid TSS, then the busy bit in the TSS pointed to by the TR is cleared, at 714. Either way, the code continues at 716, where DS, ES, FS, and GS are loaded with the selector valid for the GDT. Then CR3 and CR0 are loaded with the values from the segment E000H data structure, at 718. Next, paging is enabled, at 720, so the only area for which linear addresses equal physical addresses is the area in segments E000H and F000H. Then, IDTR, GDTR, LDTR, and TR are loaded with the values stored in the segment E000H data structure, at 722.

Finally, a Virtual 8086 Interrupt Stack is created at 724 and 726 by pushing values corresponding to GS, FS, DS, ES, SS, ESP, EFLAGS (after setting the VM bit), and CS from the segment E000H data structure onto the Stack. Also, a return address corresponding to the code at task 730 is pushed onto the stack at 726. Lastly, an IRETD instruction is executed to place the CPU 40 back into Virtual 8086 Mode and transfer execution to the code corresponding to task 730.

Task 730 starts the common thread, which is used by each of the various threads in FIG. 14. At task 730, the coprocessor 44 is restored from the values saved in the segment E000H data structure. Next, the state of Address Line 20 (I/O port 92H) is popped from the Stack, at 732. Then, Shadow RAM segment C000H is made read-only again, at 734. At 736, the APM is connected to the hardware by writing 01H to the power management port, as described in the text accompanying FIG. 7. Then, Shadow RAM segments E000H and F000H are made read-only again, at 738. Finally, at 740, the Restore CPU State Routine sets a flag indicating that a normal resume occurred. Tasks 742, 744, and 746 are not executed by the Restore CPU State Routine, but are merely used to show that at some time prior to returning to the code that was interrupted by the suspend event, the eight general registers are popped off the Stack, maskable interrupts are enabled (if they were enabled when the code was interrupted), and the flags are popped off the stack. Lastly, the Restore CPU State Routine returns to the Supervisor Routine, which returns control back to the APM, which updates any stale system values and returns control back to the code that was interrupted.

Referring back now to task 704, if the CPU 40 was not in Virtual 8086 mode when it was interrupted, then the code follows a path from 750 through 792, where the code merges with the common thread of tasks 730 through 748. At 750, if the TR value in the segment E000H data structure indicates that the TR points to a valid TSS, then the busy bit in that TSS is cleared at 752. In either case, next, at 754, the GDTR and CR0 are loaded with values from the segment E000H data structure.

Then a dummy page directory table and page translation table are loaded into segment C000H, at tasks 756 through 764. First, Shadow RAM segment C000H is made read/write, at 756. Second, a new page directory table is created at address 0C0000H, at 758. Third, the first entry in that new page directory table is modified to point to 0C1000H, at 760. Fourth, a new page translation table is created at 0C1000H such that addresses 0E0000 through 0FFFFF are present and linear addresses equal physical addresses for this address range, at 762. Lastly, the page directory base register in CR3 is loaded with 0C0000H so that address translations are made through the new dummy page directory and page translation table in 0C0000H. Paging was reactivated (if applicable) when CR0 was loaded at task 754.

Next, Shadow RAM segments E000H and F000H are made read/write, at 766. Then, if the CPU 40 was executing 16-bit code when it was suspended, then it was in 16-Bit Mode and an offset pointing to a 16-bit code path is saved to the segment E000H data structure, at 770. On the other hand, if the CPU 40 was not in 16-Bit Mode, then it was in 32-Bit Mode and an offset pointing to a 32-bit code path is saved to the segment E000H data structure, at 772, instead of the 16-bit offset. In either event, these code paths are parallel and differ only in that one uses 16-bit operands and the other uses 32-bit operands. Tasks 770 and 772 merely set up the offset into either of the parallel paths. One of the paths (the one corresponding to the offset) is entered at task 782 below.

Next, at 774, the CR3 value from the segment E000H data structure is loaded into EDX, the SS value from the segment E000H data structure is loaded into CX, the ESP value from the segment E000H data structure is loaded into EBP, the TR value from the segment E000H data structure is loaded into the upper half of ESI, and the LDTR value from the segment E000H data structure is loaded into the lower half of ESI (SI). These values are shifted into their proper locations below. Then, GDTR, LDTR, and CR0 are loaded with their values from the segment E000H data structure, at 776. At 778, LDTR is loaded with the LDTR value stored in SI. Then the code far jumps to the offset placed in either task 770 or 772. The far jump is coded by directly placing the opcode into the source code and using the offset from either 770 or 772. The code then continues in either a 16-bit opcode path or a 32-bit opcode path, at 782.

Next CR3 is loaded with the CR3 value stored in EDX, SS is loaded with the SS value stored in CX, and ESP is loaded with the ESP value stored in EBP, at 784. Then GS, FS, ES, and DS are popped off the stack, at 786. At 788, if the interrupted CPU 40 was executing code in protected mode, then the TR is loaded with the TR value stored in the upper half of ESI, at 790. In either case, the code continues at task 792, where the debug registers DR0, DR1, DR2, DR3, DR6, and DR7 are popped off the Stack.

At this point, this code path merges with the common code path of tasks 730 through 748, which were explained above. At 794, the error-recovery routine also joins the common code path from task 640 of the Save CPU State Routine.

Referring now to FIG. 15, a flow chart of the Save 8259 State Routine is shown starting at 800. Saving the states of the 8259s proceeds with saving the periodic interrupt values used by the real-time clock 98, at 802, and the saving of all other readable registers, at 804, to the segment E000H data structure. The architecture of the computer system 10 requires certain 8259 read-only registers to have fixed values, as is well known in the art. These values are known and need not be determined. The 8259 values that are difficult to obtain are the 8259 base address, the 8259 slave address, and whether the two 8259s are set to show pending or in-service interrupts by the OS.

The four above items are ascertained with the remaining code in FIG. 15. At 806 the 8259 is masked leaving only the keyboard 12 and mouse 13 interrupts unmasked.

Next, the interrupt vector table is saved by copying the bottom 1K of physical memory to a segment C000H data structure, at 808. Then, at 810, a new "dummy" interrupt vector table is loaded into the bottom 1K of physical memory by loading 256 unique dummy vectors that point to 256 dummy interrupt service routines, which start in segment C800H. At 812, the 256 dummy interrupt service routines are generated in segment C800H.

Then keyboard 12 and mouse 13 interrupts are disabled at 814. Any unacknowledged keyboard 12 and mouse 13 interrupts are acknowledged, at 816.

A keyboard interrupt is then generated, at 818, and the interrupt is tested to see if the base 8259 is set to be pending or in-service, at 820. This value is then written to the segment E000H data structure. At 822, the code waits for the interrupt to be serviced. The interrupt is serviced, at 824, by calling one of the dummy service routines. Calling the dummy service routine determines the 8259 base address and determines if the 8259 was in pending or in-service mode; the base address and mode are saved to the segment E000H data structure.

A similar procedure is performed for the slave 8259 at tasks 826, 828, 830, and 832.

At 834, the interrupt vector table is restored by copying the values from the C000H data structure back to the lower 1K of physical memory. Then segment C000H is made read-only again, at 836, and all interrupts are masked, at 838, in preparation for returning to the calling program, at 840.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, as described above, a telephone ring detect circuit could be added to change the computer system 10 from the suspend state 154 to the normal operating state 150 when the attached phone line rings. Therefore, the invention in its broader aspects is not limited to the specific details, representative apparatus and method, and illustrative examples shown and described. Accordingly, departures may be made from such details without departing from the spirit or scope of the applicant's general inventive concept.

We claim:

1. A computer system capable of operating in any selected one of at least three states of power management, namely a normal operating state in which code is executed normally by said computer system, an off state and a suspend state, the system comprising:

a CPU capable of executing code;

a control unit in circuit communication with said CPU;

a switch in circuit communication with said control unit, said switch having closure events;

a flag in circuit communication with said CPU and said control unit and having associated therewith at least a first flag state and a second flag state;

a power supply in circuit communication with said CPU and said control unit and having system regulation circuitry for selectively providing system power from an external source to at least said CPU;

a failsafe timer in circuit communication with said CPU and said control unit, said failsafe timer being set to expire after the expiration of a preselected time interval, the preselected time interval being restartable responsive to said CPU, said failsafe timer causing said computer system to transition to said off state responsive to the expiration of the preselected time interval;

a video control unit in circuit communication with said switch; and a video controller in circuit communication with said CPU and said video control unit, said video controller having video generation circuitry for generating a video signal corresponding to a visual image to be displayed on a video display terminal;

said power supply operating in a selected one of a first power supply state and a second power supply state, said power supply changing between said first and second power supply states in response to said control unit;

said control unit causing said computer system to transition from said normal operating state to said off state responsive to a closure event of said switch while said flag is in said first flag state;

said control unit causing said computer system to transition from said normal operating state to said suspend state responsive to a closure event of said switch while said flag is in said second flag state;

said normal operating state being characterized in that said power supply is in said first power supply state and code is executing normally on said CPU;

said suspend state being characterized in that said power supply is in said second power supply state and the code executing on said CPU has been reversibly interrupted such that the execution of the code on said CPU may be resumed after said power supply changes to said first power supply state;

said off state being characterized in that said power supply is in said second power supply state and the code executing on said CPU has been irreversibly interrupted; and wherein said video control unit and said video controller operate such that said video signal has a first video signal state and said second video signal state, said video signal changing from the first video signal state to the second video signal state in response to a closure event of said switch, the second video signal state providing user feedback regarding a transition between two of the at least three states of power management.

2. A computer system operating in any selected one of at least three states of power management, namely a normal operating state in which code is executed normally by said computer system, an off state and a suspend state, comprising:

a CPU capable of executing code;

a switch having closure events;

a control unit for controlling transitions between the normal operating state and the off state and between the normal operating state and the suspend state;

a video control unit in circuit communication with said switch; and a video controller in circuit communication with said CPU and said video control unit, said video controller having video generation circuitry for generating a video signal corresponding to a visual image to be displayed on a video display terminal;

wherein said video control unit and said video controller operate such that said video signal has a first video signal state and said second video signal state, said video signal changing from the first video signal state to the second video signal state in response to a closure event of said switch, the second video signal state providing user feedback regarding a transition between two of the at least three states of power management.

3. The computer system according to either claim 1 or claim 2 wherein said first video signal state is characterized in that said video generation circuitry generates the video signal to the video display terminal; and further wherein said second video signal state is characterized in that said video generation circuitry interrupts the video signal to the video display terminal.

4. The computer system according to any of claims 1 or 2 wherein said switch is a momentary pushbutton switch and the closure event of said switch comprises said momentary pushbutton switch being actuated.

5. The computer system according to any of claims 1 or 2 wherein said switch is a toggle switch movable between a first switch position and a second switch position and the closure event of said switch comprises said toggle switch being moved to one of said switch positions.

6. The computer system according to claim 2 wherein said switch is a momentary pushbutton switch and the closure event of said switch comprises said momentary pushbutton switch being actuated.

7. The computer system according to claim 2 wherein said switch is a toggle switch movable between a first switch position and a second switch position and the closure event of said switch comprises said toggle switch being moved to one of said switch positions.

8. A computer system capable of operating in any selected one of at least three states of power management, namely a normal operating state in which code is executed normally by said computer system, an off state and a suspend state, the system comprising:

a CPU capable of executing code;

a control unit in circuit communication with said CPU;

a switch in circuit communication with said control unit, said switch having closure events;

a flag in circuit communication with said CPU and said control unit and having associated therewith at least a first flag state and a second flag state;

a power supply in circuit communication with said CPU and said control unit and having system regulation circuitry for selectively providing system power from an external source to at least said CPU;

a video control unit in circuit communication with said switch; and a video controller in circuit communication with said CPU and said video control unit, said video controller having video generation circuitry for generating a video signal corresponding to a visual image to be displayed on a video display terminal;

said power supply operating in a selected one of a first power supply state and a second power supply state, said power supply changing between said first and second power supply states in response to said control unit;

said control unit causing said computer system to transition from said normal operating state to said off state responsive to a closure event of said switch while said flag is in said first flag state;

said control unit causing said computer system to transition from said normal operating state to said suspend state responsive to a closure event of said switch while said flag is in said second flag state;

said normal operating state being characterized in that said power supply is in said first power supply state and code is executing normally on said CPU;

said suspend state being characterized in that said power supply is in said second power supply state and the code executing on said CPU has been reversibly interrupted such that the execution of the code on said CPU may be resumed after said power supply changes to said first power supply state said off state being characterized in that said power supply is in said second power supply state and the code executing on said CPU has been irreversibly interrupted; and wherein said video control unit and said video controller operate such that said video signal has a first video signal state and said second video signal state, said video signal changing from the first video signal state to the second video signal state in response to a closure event of said switch, the second video signal state providing user feedback regarding a transition between two of the at least three states of power management.

9. A computer system capable of operating in any selected one of at least three states of power management, namely a normal operating state in which code is executed normally by said computer system, an off state and a suspend state, the system comprising:

a CPU capable of executing code;

a control unit in circuit communication with said CPU;

a switch in circuit communication with said control unit, said switch having closure events;

a flag in circuit communication with said CPU and said control unit and having associated therewith at least a first flag state and a second flag state;

a power supply in circuit communication with said CPU and said control unit and having system regulation circuitry for selectively providing system power from an external source to at least said CPU;

a video control unit in circuit communication with said switch; and a video controller in circuit communication with said CPU and said video control unit, said video controller having video generation circuitry for selectively generating a video signal corresponding to a visual image to be displayed on a video display terminal;

said power supply operating in a selected one of a first power supply state and a second power supply state, said power supply changing between said first and second power supply states in response to said control unit;

said control unit causing said computer system to transition from said normal operating state to said off state responsive to a closure event of said switch while said flag is in said first flag state;

said control unit causing said computer system to transition from said normal operating state to said suspend state responsive to a closure event of said switch while said flag is in said second flag state;

said normal operating state being characterized in that said power supply is in said first power supply state and code is executing normally on said CPU;

said suspend state being characterized in that said power supply is in said second power supply state and the code executing on said CPU has been reversibly interrupted such that the execution of the code on said CPU may be resumed after said power supply changes to said first power supply state;

said off state being characterized in that said power supply is in said second power supply state and the code executing on said CPU has been irreversibly interrupted;

wherein said video control unit and said video controller operate such that said video signal has a first video signal state and said second video signal state, said video signal changing from the first video signal state to the second video signal state in response to a closure event of said switch, the second video signal state providing user feedback regarding a transition between two of the at least three states of power management; and wherein said first video signal state is characterized in that said video generation circuitry generates the video signal to be displayed on the video display terminal; and further wherein said second video signal state is characterized in that said video generation circuitry interrupts the video signal to the video signal terminal.

10. A computer system capable of operating in any selected one of at least three states of power management, namely a normal operating state in which code is executed normally by said computer system, an off state and a suspend state, the system comprising:

a CPU capable of executing code;

a control unit in circuit communication with said CPU;

a switch in circuit communication with said control unit, said switch having closure events;

a flag in circuit communication with said CPU and said control unit and having associated therewith at least a first flag state and a second flag state;

a power supply in circuit communication with said CPU and said control unit and having system regulation circuitry for selectively providing system power from an external source to at least said CPU;

a video control unit in circuit communication with said switch; and a video controller in circuit communication with said CPU and said video control unit, said video controller having video generation circuitry for selectively generating a video signal corresponding to a visual image to be displayed on a video display terminal;

said power supply operation in a selected one of a first power supply state and a second power supply state, said power supply changing between said first and second power supply states in response to said control units;

said control unit causing said computer system to transition from said normal operating state to said off state responsive to a closure event of said switch while said flag is in said first flag state;

said control unit causing said computer system to transition from said normal operating state to said suspend state responsive to a closure event of said switch while said flag is in said second flag state;

said normal operating state being characterized in that said power supply is in said first power supply state and code is executing normally on said CPU;

said suspend state begin characterized in that said power supply is in said second power supply state and the code executing on said CPU has been reversibly interrupted such that the execution of the code on said CPU may be resumed after said power supply changes to said first power supply state;

said off state being characterized in that said power supply is in said second power supply state and the code executing on said CPU has been irreversibly interrupted;

wherein said video control unit and said video controller operate such that said video signal has a first video signal state and said second video signal state, said video signal changing from the first video signal state to the second video signal state in response to a closure event of said switch, the second video signal state providing user feedback regarding a transition between two of the at least three states of power management;

wherein said first video signal state is characterized in that said video generation circuitry generates the video signal to be displayed on the video display terminal; and further wherein said second video signal state is characterized in that said video generation circuitry interrupts the video signal to the video display terminal; and wherein said switch is a momentary pushbutton switch and the closure vent of said switch comprises said momentary pushbutton switch being actuated.

11. The computer system according to any of claims 1, 2, 8, 9, or 10 wherein said video generation circuitry interrupts the video signal to said video display terminal immediately in response to the closure event of said switch.

12. The computer system according to claim 3 wherein said video generation circuitry interrupts the video signal to said video display terminal immediately in response to the closure event of said switch.

13. The computer system according to any of claims 1, 8, 9, or 10 wherein said video generation circuitry interrupts the video signal to said video display terminal in response to the closure event of said switch and prior to said power supply entering said second power supply state.

14. The computer system according to claim 3 wherein said video generation circuitry interrupts the video signal to said video display terminal in response to the closure event of said switch and prior to said power supply entering said second power supply state.

15. A computer system according to any of claims 1, 2, 8, 9, or 10, wherein said video control unit is integral with said video controller.

16. A computer system according to any of claims 1, 2, 8, 9, or 10, wherein said control unit is integral with said video control unit.

\* \* \* \* \*

(12) EX PARTE REEXAMINATION CERTIFICATE (7799th)
United States Patent
Clark et al.

(10) Number: US 5,513,359 C1
(45) Certificate Issued: Oct. 12, 2010

(54) DESKTOP COMPUTER HAVING A SINGLE-SWITCH SUSPEND/RESUME FUNCTION

(75) Inventors: Michael W. Clark, Lexington, KY (US); James L. Combs, Lexington, KY (US); Dwayne T. Crump, Lexington, KY (US); Jerry T. Kozel, Lexington, KY (US); Steven T. Pancoast, Lexington, KY (US)

(73) Assignee: Lenovo (Singapore) Pte Ltd., Singapore (SG)

Reexamination Request:
No. 90/010,721, Oct. 23, 2009

Reexamination Certificate for:
Patent No.: 5,513,359
Issued: Apr. 30, 1996
Appl. No.: 08/097,334
Filed: Jul. 23, 1993

(51) Int. Cl.
*G06F 1/30* (2006.01)
*G06F 1/32* (2006.01)

(52) U.S. Cl. .................................. 713/323; 345/212
(58) Field of Classification Search .............. None
See application file for complete search history.

(56) References Cited

U.S. PATENT DOCUMENTS

| | | | |
|---|---|---|---|
| 4,162,526 A | 7/1979 | Gass et al. | 364/200 |
| 4,726,024 A | 2/1988 | Guziak et al. | 371/16 |
| 5,446,904 A * | 8/1995 | Belt et al. | 713/323 |
| 5,586,334 A | 12/1996 | Miyazaki et al. | 395/750 |

OTHER PUBLICATIONS

IBM Technical Disclosure Bulletin, vol. 33, Issue 3A at pp. 438–440.

* cited by examiner

Primary Examiner—Zoila E Cabrera

(57) ABSTRACT

A computer system having a suspend/resume capability in addition to the normal operating state and the off state. Closure events of single momentary pushbutton switch control changes between the normal operating state, the suspend state, and the off state, depending on the value of a flag. If the flag is set in a certain state, closure events of the switch cause the computer system to change back and forth between the normal operating state and the off state. If the flag is set in a different state, closure events of the switch cause the computer system to change back and forth between the normal operating state and the suspend state. The switch also controls the video subsystem of the computer system such that pressing the switch blanks the video display terminal giving the user instantaneous feedback of the switch press.

At the time of issuance and publication of this certificate, the patent remains subject to pending reexamination control number 90/010,352 filed Dec. 9, 2008. The claim content of the patent may be subsequently revised in the reexamination proceeding.

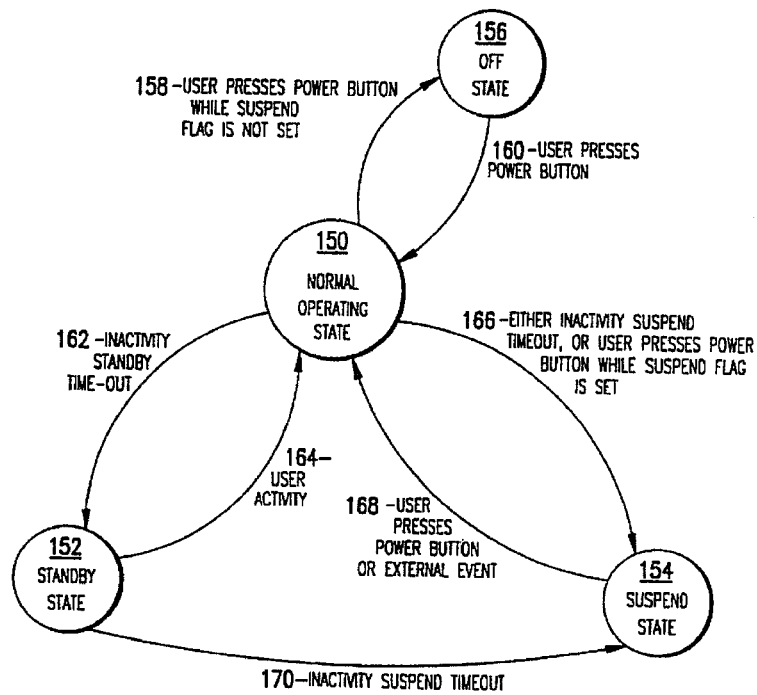

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 3/1, 4/1, 5/1, 11/1, 12/3/1, 13/1, 14/3/1, 15/1 and 16/1 is confirmed.

Claims 2, 3/2, 4/2, 5/2, 6, 7, 8, 9, 10, 11/2, 12/3/2, 14/3/2, 15/2, 16/2, 11/8, 13/8, 15/8, 16/8, 11/9, 13/9, 15/9, 16/9, 11/10, 13/10, 15/10 and 16/10 were not reexamined.

* * * * *

(12) EX PARTE REEXAMINATION CERTIFICATE (8113th)
United States Patent
Clark et al.

(10) Number: US 5,513,359 C2
(45) Certificate Issued: Mar. 22, 2011

(54) DESKTOP COMPUTER HAVING A SINGLE-SWITCH SUSPEND/RESUME FUNCTION

(75) Inventors: Michael W. Clark, Lexington, KY (US); James L. Combs, Lexington, KY (US); Dwayne T. Crump, Lexington, KY (US); Jerry T. Kozel, Lexington, KY (US); Steven T. Pancoast, Lexington, KY (US)

(73) Assignee: Lenovo (Singapore) Pte Ltd., Singapore (SG)

Reexamination Request:
No. 90/010,352, Dec. 9, 2008

Reexamination Certificate for:
Patent No.: 5,513,359
Issued: Apr. 30, 1996
Appl. No.: 08/097,334
Filed: Jul. 23, 1993

Reexamination Certificate C1 5,513,359 issued Oct. 12, 2010

(51) Int. Cl.
*G06F 1/30* (2006.01)
*G06F 1/32* (2006.01)

(52) U.S. Cl. .................................. 713/323; 345/212
(58) Field of Classification Search ................. None
See application file for complete search history.

(56) References Cited
U.S. PATENT DOCUMENTS 4,823,290 A 4/1989 Fasack et al.
5,021,983 A 6/1991 Nguyen et al.
5,446,904 A 8/1995 Belt et al.
5,586,334 A 12/1996 Miyazaki et al.

FOREIGN PATENT DOCUMENTS

EP 0 518 623 A2 12/1992
WO WO92/21081 12/1992

OTHER PUBLICATIONS

IBM Technical Disclosure Bulletin, "Self–Centering Device for Push–Button Switch Caps", Aug. 1990.*
*Advanced Power Management, The Next Generation*, http://www.ibiblio.org/pub/historic–linux/ftp–archives/tsx–11.mit.edu/OCT..., Intel Corporation, Microsoft Corporation, Version 1.0, (visited Nov. 11, 2009).

* cited by examiner

*Primary Examiner*—Zoila E Cabrera

(57) ABSTRACT

A computer system having a suspend/resume capability in addition to the normal operating state and the off state. Closure events of single momentary pushbutton switch control changes between the normal operating state, the suspend state, and the off state, depending on the value of a flag. If the flag is set in a certain state, closure events of the switch cause the computer system to change back and forth between the normal operating state and the off state. If the flag is set in a different state, closure events of the switch cause the computer system to change back and forth between the normal operating state and the suspend state. The switch also controls the video subsystem of the computer system such that pressing the switch blanks the video display terminal giving the user instantaneous feedback of the switch press.

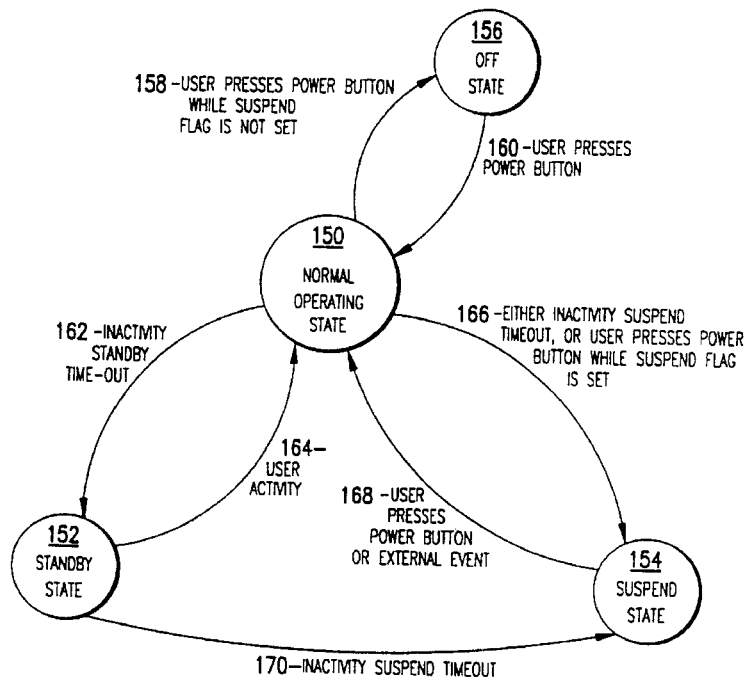

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 8-10 and 12-14 is confirmed.

Claims 2, 6 and 7 are cancelled.

Claims 3-5, 11 and 15-16 are determined to be patentable as amended.

New claims 17-22 are added and determined to be patentable.

3. The computer system according to [either] claim 1 [or claim 2] wherein said first video signal state is characterized in that said video generation circuitry generates the video signal to the video display terminal; and further wherein said second video signal state is characterized in that said video generation circuitry interrupts the video signal to the video display terminal.

4. The computer system according to [any of claims 1 or 2] *claim 1* wherein said switch is a momentary pushbutton switch and the closure event of said switch comprises said momentary pushbutton switch being actuated.

5. The computer system according to [any of claims 1 or 2] *claim 1* wherein said switch is a toggle switch movable between a first switch position and a second switch position and the closure event of said switch comprises said toggle switch being moved to one of said switch positions.

11. The computer system according to any of claims 1, [2,] 8, 9, or 10 wherein said video generation circuitry interrupts the video signal to said video display terminal immediately in response to the closure event of said switch.

15. A computer system according to any of claims 1, [2,] 8, 9, or 10, wherein said video control unit is integral with said video controller.

16. A computer system according to any of claims 1, [2,] 8, 9, or 10 wherein said control unit is integral with said video control unit.

*17. A computer system capable of operating in any selected one of four states of power management, namely a normal operating state in which code is executed normally by said computer system, a standby state, an off state, and a suspend state, the system comprising:*

*a CPU capable of executing code;*

*a control unit in circuit communication with said CPU;*

*a switch in circuit communication with said control unit, said switch having closure events;*

*a flag in circuit communication with said CPU and said control unit and having associated therewith at least a first flag state and a second flag state;*

*a power supply in circuit communication with said CPU and said control unit and having system regulation circuitry for selectively providing system power from an external source to at least said CPU;*

*a video control unit in circuit communication with said switch; and*

*a video controller in circuit communcation with said CPU and said video control unit, said video controller having video generation circuitry for generating a video signal corresponding to a visual image to be displayed on a video display terminal;*

*said power supply operating in a selected one of a first power supply state and a second power supply state in each of which power is supplied to one or more circuits, said power supply changing between said first and second power supply states in response to said control unit;*

*said control unit causing said computer system to transition from said normal operating state to said off state responsive to a closure event of said switch while said flag is in said first flag state;*

*said control unit causing said computer system to transition from said normal operating state to said suspend state responsive to a closure event of said switch while said flag is in said second flag state;*

*said normal operating state being characterized in that said power supply is in said first power supply state and code is executing normally on said CPU;*

*said standby state being characterized in that power consumption is intermediate power consumption of the normal state and power consumption of the suspend state;*

*said suspend state being characterized in that said power supply is in said second power supply state and the code executing on said CPU has been reversibly interrupted such that the execution of the code on said CPU may be resumed after said power supply changes to said first power supply state;*

*said off state being characterized in that said power supply is in said second power supply state and the code executing on said CPU has been irreversibly interrupted; and*

*wherein said video control unit and said video controller operate such that said video signal has a first video signal state and a second video signal state, said video signal changing from the first video signal state to the second video signal state in response to a closure event of said switch, the second video signal state providing user feedback regarding a transition between two of the four states of power management.*

*18. A computer system capable of operating in any selected one of four states of power management, namely a normal operating state in which code is executed normally by said computer system, a standby state, an off state, and a suspend state, the system comprising:*

*a CPU capable of executing code;*

*a control unit in circuit communication with said CPU;*

*a switch in circuit communication with said control unit, said switch having closure events;*

*a flag in circuit communication with said CPU and said control unit and having associated therewith at least a first flag state and a second flag state;*

*a power supply in circuit communication with said CPU and said control unit and having system regulating circuitry for selectively providing system power from an external source to at least said CPU;* a video control unit in circuit communication with said switch; and a video controller in circuit communication with said CPU and said video signal unit, said video controller having video generation circuitry for generating a video signal corresponding to a visual image to be displayed on a video display terminal;

said power supply operating in a selected one of a first power supply state and a second power supply state, said power supply changing between said first and second power supply states in response to said control unit;

said control unit causing said computer system to transition from said normal operating state to said off state responsive to a closure event of said switch while said flag is in said first flag state;

said control unit causing said computer system to transition from said normal operating state to said suspend state responsive to a closure event of said switch while said flag is in said second flag state;

said normal operating state being characterized in that said power supply is in said first power supply state and code is executing normally on said CPU;

said standby state being characterized in that less power is consumed than in said normal operating state;

said suspend state being characterized in that said power supply is in said second power supply state and the code executing on said CPU has been reversibly interrupted such that the execution of the code on said CPU may be resumed after said power supply changes to said first power supply state;

said off state being characterized in that said power supply is in said second power supply state and the code executing on said CPU has been irreversibly interrupted; and wherein said video control unit and said video controller operate such that said video signal has a first video signal state and a second video signal state, said video signal changing from the first video signal state to the second video signal state in response to a closure event of said switch, the second video signal state providing user feedback regarding a transition between two of the four states of power management.

19. A computer system capable of operating in any selected one of four states of power management, namely a normal operating state in which code is executed normally by said computer system, a standby state, an off state, and a suspend state, the system comprising:

a CPU capable of executing code;

a control unit in circuit communication with said CPU;

a switch in circuit communication with said control unit, said switch having closure events;

a flag in circuit communication with said CPU and said control unit and having associated therewith at least a first flag state and a second flag state;

a power supply in circuit communication with said CPU and said control unit and having system regulation circuitry for selectively providing system power from an external source to at least said CPU;

a video control unit in circuit communication with said switch; and a video controller in circuit communication with said CPU and said video control unit, said video controller having video generation circuitry for selectively generating a video signal corresponding to a visual image to be displayed on a video display terminal;

said power supply operating in a selected one of a first power supply state and a second power supply state in each of which power is supplied to one or more circuits, said power supply changing between said first and second power supply states in response to said control unit;

said control unit causing said computer system to transition from said normal operating state to said off state responsive to a closure event of said switch while said flag is in said first flag state;

said control unit causing said computer system to transition from said normal operating state to said suspend state responsive to a closure event of said switch while said flag is in said second flag state;

said normal operating state being characterized in that said power supply is in said first power supply state and code is executing normally on said CPU;

said standby state being characterized in that power consumption is intermediate power consumption of the normal state and power consumption of the suspend state;

said suspend state being characterized in that said power supply is in said second power supply state and the code executing on said CPU has been reversibly interrupted such that the execution of the code on said CPU may be resumed after said power supply changes to said first power supply state;

said off state being characterized in that said power supply is in said second power supply state and the code executing on said CPU has been irreversibly interrupted;

wherein said video control unit and said video controller operate such that said video signal has a first video signal state and a second video signal state, said video signal changing from the first video signal state to the second video signal state in response to a closure event of said switch, the second video signal state providing user feedback regarding a transition between two of the four states of power management; and wherein said first video signal state is characterized in that said video generation circuitry generates the video signal to be displayed on the video display terminal; and further wherein said second video signal state is characterized in that said video generation circuitry interrupts the video signal to the video signal terminal.

20. A computer system capable of operating in any selected one of four states of power management, namely a normal operating state in which code is executed normally by said computer system, a standby state, an off state, and a suspend state, the system comprising:

a CPU capable of executing code;

a control unit in circuit communication with said CPU;

a switch in circuit communication with said control unit, said switch having closure events;

a flag in circuit communication with said CPU and said control unit and having associated therewith at least a first flag state and a second flag state;

a power supply in circuit communication with said CPU and said control unit and having system regulation circuitry for selectively providing system power from an external source to at least said CPU;

a video control unit in circuit communication with said switch; and a video controller in circuit communication with said
CPU and said video control unit, said video controller
having video generation circuitry for selectively generating a video signal corresponding to a visual image to
be displayed on a video display terminal;

said power supply operating in a selected one of a first
power supply state and a second power supply state,
said power supply changing between first and second
power supply states in response to said control unit;

said control unit causing said computer system to transition from said normal operating state to said off state
responsive to a closure event of said switch while said
flag is in said first flag state;

said control unit causing said computer system to transition from said normal operating state to said suspend
state responsive to a closure event of said switch while
said flag is in said second flag state;

said normal operating state being characterized in that
said power supply is in said first power supply state and
code is executing normally on said CPU;

said standby state being characterized in that less power
is consumed than in said normal operating state;

said suspend state being characterized in that said power
supply is in said second power supply state and the
code executing on said CPU has been reversibly interrupted such that the execution of the code on said CPU
may be resumed after said power supply changes to
said first power supply state;

said off state being characterized in that said power supply is in said second power supply state and the code
executing on said CPU has been irreversibly interrupted;

wherein said video control unit and said video controller
operate such that said video signal has a first video
signal state and a second video signal state, said video
signal changing from the first video signal state to the
second video signal state in response to a closure event
of said switch, the second video signal state providing
user feedback regarding a transistion between two of
the four states of power management; and wherein said first video signal state is characterized in
that said video generation circuitry generates the video
signal to be displayed on the video display terminal;
and further wherein said second video signal state is
characterized in that said video generation circuitry
interrpts the video signal to the video signal terminal.

21. A computer system capable of operating in any
selected one of four states of power management, namely a
normal operating state in which code is executed normally
by said computer system, a standby state, an off state, and a
suspend state, the system comprising:

a CPU capable of executing code;

a control unit in circuit communication with said CPU;

a switch in circuit communication with said control unit,
said switch having closure events;

a flag in circuit communication with said CPU and said
control unit and having associated therewith at least a
first flag state and a second flag state;

a power supply in circuit communication with said CPU
and said control unit and having system regulation circuitry for selectively providing system power from an
external source to at least said CPU;

a video control unit in circuit communication with said
switch; and a video controller in circuit communcation with said CPU
and said video control unit, said video controller having video generation circuitry for selectively generating
a video signal corresponding to a visual image to be
displayed on a video display terminal;

said power supply operating in a selected one of a first
power supply state and a second power supply state in
each of which power is supplied to one or more circuits,
said power supply changing between said first and second power supply states in response to said control
unit;

said control unit causing said computer system to transition from said normal operating state to said off state
responsive to a closure event of said switch while said
flag is in said first flag state;

said control unit causing said computer system to transition from said normal operating state to said suspend
state responsive to a closure event of said switch while
said flag is in said second flag state;

said normal operating state being characterized in that
said power supply is in said first power supply state and
code is executing normally on said CPU;

said standby state being characterized in that power consumption is intermediate power consumption of the
normal state and power consumption of the suspend
state;

said suspend state being characterized in that said power
supply is in said second power supply state and the
code executing on said CPU has been reversibly interrupted such that the execution of the code on said CPU
may be resumed after said power supply changes to
said first power supply state;

said off state being characterized in that said power supply is in said second power supply state and the code
executing on said CPU has been irreversibly interrupted;

wherein said video control unit and said video controller
operate such that said video signal has a first video
signal state and a second video signal state, said video
signal changing from the first video signal state to the
second video signal state in response to a closure event
of said switch, the second video signal state providing
user feedback regarding a transition between two of the
four states of power management;

wherein said first video signal state is characterized in
that said video generation circuitry generates the video
signal to be displayed on the video display terminal;
and further wherein said second video signal state is
characterized in that said video generation circuitry
interrupts the video signal to the video display terminal; and wherein said switch is a momentary pushbutton switch
and the closure event of said switch comprises said
momentary pushbutton switch being actuated.

22. A computer system capable of operating in any
selected one of four states of power management, namely a
normal operating state in which code is executed normally
by said computer system, a standby state, an off state, and a
suspend state, the system comprising:

a CPU capable of executing code;

a control unit in circuit communication with said CPU;

a switch in circuit communication with said control unit,
said switch having closure events;

a flag in circuit communication with said CPU and said
control unit and having associated therewith at least a
first flag state and a second flag state;

a power supply in circuit communication with said CPU and said control unit and having system regulation circuitry for selectively providing system power from an external source to at least said CPU;

a video control unit in circuit communcation with said switch; and a video controller in circuit communication with said CPU and said video control unit, said video controller having video generation circuitry for selectively generating a video signal corresponding to a visual image to be displayed on a video display terminal;

said power supply operating in a selected one of a first power supply state and a second power supply state, said power supply changing between said first and second power supply states in response to said control unit;

said control unit causing said computer system to transition from said normal operating state to said off state responsive to a closure event of said switch while said flag is in said first flag state;

said control unit causing said computer system to transition from said normal operating state to said suspend state responsive to a closure event of said switch while said flag is in said second flag state;

said normal operating state being characterized in that said power supply is in said first power supply state and code is executing normally on said CPU;

said standby state being characterized in that less power is consumed than in the normal operating state;

said suspend state being characterized in that said power supply is in said second power supply state and the code executing on said CPU has been reversibly interrupted such that the execution of the code on said CPU may be resumed after said power supply changes to said first power supply state;

said off state being characterized in that said power supply is in said second power supply state and the code executing on said CPU has been irreversibly interrupted;

wherein said video control unit and said video controller operate such that said video signal has a first video signal state and a second video signal state, said video signal changing from the first video signal state to the second video signal state in response to a closure event of said switch, the second video signal state providing user feedback regarding a transition between two of the four states of power mangement;

wherein said first video signal state is characterized in that said video generation circuitry generates the video signal to be displayed on the video display terminal; and further wherein said second video signal state is characterized in that said video generation circuitry interrupts the video signal to the video display terminal; and wherein said switch is a momentary pushbutton switch and the closure event of said switch comprises said momentary pushbutton switch being actuated.

\* \* \* \* \*